US012236468B2

United States Patent
Renaud

(10) Patent No.: US 12,236,468 B2
(45) Date of Patent: *Feb. 25, 2025

(54) METHOD AND APPARATUS FOR GUIDING CONTENT SELECTION WITHIN AN INFORMATION DISTRIBUTION SYSTEM BASED ON MODELLING USER BEHAVIOR

(71) Applicant: Audiense Global Holdings Limited, London (GB)

(72) Inventor: Philip Joseph Renaud, Toronto (CA)

(73) Assignee: AUDIENSE GLOBAL HOLDINGS LIMITED., London (GB)

( * ) Notice: Subject to any disclaimer, the term of this patent is extended or adjusted under 35 U.S.C. 154(b) by 336 days.

This patent is subject to a terminal disclaimer.

(21) Appl. No.: 17/718,012

(22) Filed: Apr. 11, 2022

(65) Prior Publication Data

US 2022/0245711 A1     Aug. 4, 2022

Related U.S. Application Data

(63) Continuation of application No. 16/304,838, filed as application No. PCT/CA2017/000144 on Jun. 13, 2017, now Pat. No. 11,301,915.

(Continued)

(51) Int. Cl.
*G06Q 30/00*     (2023.01)
*G06F 16/9535*   (2019.01)
(Continued)

(52) U.S. Cl.
CPC ..... *G06Q 30/0631* (2013.01); *G06F 16/9535* (2019.01); *G06F 16/9536* (2019.01);
(Continued)

(58) Field of Classification Search
CPC .......... G06Q 30/0631; G06Q 30/0201; G06Q 50/01; G06F 16/9535; G06F 16/9537; G06F 16/9536; G06F 18/24137
See application file for complete search history.

(56) References Cited

U.S. PATENT DOCUMENTS 6,263,334 B1   7/2001   Fayyad
6,438,579 B1   8/2002   Hosken
(Continued)

FOREIGN PATENT DOCUMENTS

WO    0106398      1/2001
WO    2010085874   8/2010
(Continued)

OTHER PUBLICATIONS

Fred et al., "Learning Pairwise Similarity for Data Clustering", 18th International Conference on Pattern Recognition (ICPR'06), 2006, vol. 1, pp. 925-928.
(Continued)

*Primary Examiner* — Robert M Pond
(74) *Attorney, Agent, or Firm* — Klarquist Sparkman, LLP

(57) ABSTRACT

Method and apparatus for measuring and influencing article selection in a social network are disclosed. A learning-and-guiding module tracks access to articles by users of the social network and determines patterns of users' attraction to articles based on contents of articles and attributes of users. The module utilizes learned user-articles characteristics to influence article selection through communicating with users through the social network. The module relies on historical usage data characterizing user's affinity to articles. To guard against usage data obsolescence due to shifting interests, usage data are frequently adjusted to place more emphasis on recent usage patterns.

20 Claims, 41 Drawing Sheets

Related U.S. Application Data

(60) Provisional application No. 62/349,268, filed on Jun. 13, 2016.

(51) Int. Cl.
  *G06F 16/9536* (2019.01)
  *G06F 16/9537* (2019.01)
  *G06F 18/2413* (2023.01)
  *G06Q 30/0201* (2023.01)
  *G06Q 30/0601* (2023.01)
  *G06Q 50/00* (2012.01)

(52) U.S. Cl.
  CPC .... *G06F 16/9537* (2019.01); *G06F 18/24137* (2023.01); *G06Q 30/0201* (2013.01); *G06Q 50/01* (2013.01)

(56) References Cited

U.S. PATENT DOCUMENTS

| | | | |
|---|---|---|---|
| 8,385,662 | B1 | 2/2013 | Yoon et al. |
| 8,489,515 | B2 | 7/2013 | Mathur |
| 8,712,929 | B1 | 4/2014 | Bickford |
| 9,183,285 | B1 | 11/2015 | Brown et al. |
| 9,286,391 | B1 | 3/2016 | Dykstra et al. |
| 9,348,886 | B2 | 5/2016 | Arnoux et al. |
| 9,454,726 | B1 | 9/2016 | Yao et al. |
| 9,684,656 | B2 * | 6/2017 | Ning .............. G06F 16/4387 |
| 9,760,619 | B1 | 9/2017 | Lattanzi et al. |
| 9,792,332 | B2 | 10/2017 | Spiegel |
| 9,886,676 | B1 | 2/2018 | Bos et al. |
| 9,984,392 | B2 | 5/2018 | Kendall et al. |
| 10,095,771 | B1 | 10/2018 | Dykstra et al. |
| 10,152,549 | B1 | 12/2018 | Vanderwater et al. |
| 10,325,289 | B2 | 6/2019 | Koran |
| 10,600,072 | B2 | 3/2020 | Lamontagne et al. |
| 10,607,302 | B1 | 3/2020 | Garcia-Martinez et al. |
| 10,614,504 | B2 | 4/2020 | Wilkinson et al. |
| 10,657,544 | B2 | 5/2020 | Cecchi et al. |
| 10,657,559 | B2 | 5/2020 | Sinha et al. |
| 11,301,915 | B2 | 4/2022 | Renaud et al. |
| 2002/0194058 | A1 | 12/2002 | Eldering |
| 2003/0074369 | A1 | 4/2003 | Schuetze et al. |
| 2004/0249774 | A1 | 12/2004 | Caid et al. |
| 2005/0159996 | A1 | 7/2005 | Lazarus et al. |
| 2006/0020662 | A1 | 1/2006 | Robinson |
| 2006/0112098 | A1 | 5/2006 | Renshaw |
| 2007/0217676 | A1 | 9/2007 | Grauman et al. |
| 2010/0138452 | A1 | 6/2010 | Henkin |
| 2011/0010307 | A1 * | 1/2011 | Bates .............. G06Q 30/02 705/26.7 |
| 2011/0196733 | A1 | 8/2011 | Li |
| 2011/0208709 | A1 | 8/2011 | Holthausen |
| 2012/0254184 | A1 | 10/2012 | Choudhary et al. |
| 2013/0024415 | A1 | 1/2013 | Herzog |
| 2013/0046772 | A1 | 2/2013 | Gu et al. |
| 2013/0124298 | A1 | 5/2013 | Li et al. |
| 2013/0262465 | A1 | 10/2013 | Galle et al. |
| 2014/0089048 | A1 | 3/2014 | Bruich |
| 2014/0257990 | A1 | 9/2014 | Cudgma |
| 2014/0278799 | A1 | 9/2014 | McLean |
| 2014/0278930 | A1 | 9/2014 | Brixius et al. |
| 2014/0354649 | A1 | 12/2014 | Asku et al. |
| 2015/0039620 | A1 | 2/2015 | Ning |
| 2015/0100587 | A1 | 4/2015 | Walkingshaw et al. |
| 2015/0106444 | A1 | 4/2015 | Schneider et al. |
| 2016/0012485 | A1 | 1/2016 | Dong |
| 2016/0042375 | A1 | 2/2016 | Herman et al. |
| 2016/0071162 | A1 | 3/2016 | Ogawa et al. |
| 2016/0076908 | A1 | 3/2016 | Pang et al. |
| 2016/0140623 | A1 | 5/2016 | Gupta et al. |
| 2016/0156945 | A1 | 6/2016 | Romrell et al. |
| 2016/0328748 | A1 | 11/2016 | Koran |
| 2017/0091471 | A1 | 3/2017 | Su et al. |
| 2017/0142481 | A1 | 5/2017 | Caruana et al. |
| 2017/0213242 | A1 | 7/2017 | Sundaram et al. |
| 2019/0146981 | A1 | 5/2019 | Hankinson |
| 2020/0265450 | A1 | 8/2020 | Hankinson |

FOREIGN PATENT DOCUMENTS

| | | |
|---|---|---|
| WO | PCT/CA2017/000144 | 6/2017 |
| WO | 2017214703 | 12/2017 |

OTHER PUBLICATIONS

Burke, "Hybrid Recommender Systems: Survey and Experiments", User Modeling and User-Adapted Interaction, Nov. 2002 (Nov. 2002), vol. 12(4), pp. 331-370.

Lindsay Kolowich, "How the News Feed Algorithms Work on Facebook, Twitter & Instagram". Apr. 14, 2016 (Apr. 14, 2016), <https://web.archive.org/web/20161118231817/http://blog.hubspot.com:80/marketing/how-algorithm-works-facebook-twitter-instagram#sm.000009mhet3y28f32ugb612o3096a>.

"A model-based music recommendation system for individual users and implicit user groups," Hu, Yajie. University of Miami. ProQuest Dissertations Publishing, 2014; Dialog #1557780169 116pgs. (Year: 2014).

"Innovative Content Tech Continues Hot Streak with $4M Investment in Affinio," Business Wire Nov. 3, 2015, Dialog #1729009642 3pgs. (Year: 2015).

"Leveraging multiviews of trust and similarity to enhance clustering-based recommender systems," Guo et al., Knowledge-Based Systems, 15pgs. (Year: 2015).

Beel et al., "Mr. DLib: Recommendations-as-a-Service (RaaS) for Academia", 978-1-5386-3861-3/17/$31.00, 2017, IEEE.

Jang et al., "DBSCAN++: Towards fast and scalable density clustering," archive of Cornell University: arXiv:1810.13105 [cs.LG] Oct. 2018 <https://arxiv.org/abs/1810.13105>.

Roughgarden et al., "The Complexity of the k-means Method," 24th Annual European Symposium on Algorithms (ESA 2016), Dagstuhl Research Online Publication Server citation: 10.4230/LIPIcs.ESA.2016.78 <https://drops.dagstuhl.de/opus/volltexte/2016/6419/pdf/LIPIcs-ESA-2016-78.pdf>, Aug. 2016, article No. 78, pp. 78:1-78:14.

Beel et al., "Mr. DLib: Recommendations-as-a-Service (RaaS) for Academia", 978-1-5386-3861-3/17/$31.00, Jun. 2017, IEEE.

* cited by examiner

3100 Gravitation matrix

| Index of current article → | 0 | 1 | 2 | 3 | 4 | 5 | 6 | 7 | Number of article successions |
|---|---|---|---|---|---|---|---|---|---|
| 0 | × | 0.166 | 0.333 | 0 | 0.25 | 0 | 0.25 | 0 | 12 |
| 1 | 0.286 | × | 0 | 0.214 | 0 | 0.143 | 0.357 | 0 | 14 |
| 2 | 0.35 | 0 | × | 0 | 0.45 | 0 | 0.2 | 0 | 20 |
| 3 | 0.091 | 0 | 0 | × | 0.5 | 0 | 0 | 0.409 | 22 |
| 4 | 0.454 | 0 | 0.364 | 0 | × | 0 | 0.182 | 0 | 11 |
| 5 | 0 | 0.111 | 0 | 0 | 0.055 | × | 0.444 | 0.444 | 9 |
| 6 | 0.278 | 0.167 | 0.111 | 0 | 0.048 | 0.111 | × | 0.278 | 18 |
| 7 | 0.095 | 0 | 0 | 0.381 | 0 | 0.190 | 0.286 | × | 21 |

Index of succeeding article

1620

3150 proportion of transitions from article 7 to article 5

Article-gravitation data.
Table 3302

| Data age (Days) | Index of succeeding article | | | | | | | Number of article successions |
|---|---|---|---|---|---|---|---|---|
| | 0 | 1 | 2 | 3 | 4 | 5 | 6 | 7 | |
| 100 | 62 | 32 | 58 | 60 | 22 | × | 12 | 180 | 426 |
| 120 | 66 | 36 | 85 | 90 | 30 | × | 15 | 200 | 522 |
| 140 | 74 | 47 | 95 | 140 | 35 | × | 23 | 207 | 621 |
| 160 | 89 | 52 | 123 | (180) | 39 | × | 25 | (212) | 720 |

Article-gravitation data – periodic reset
Table 3304

| Data age (Days) | Index of succeeding article | | | | | | | | Number of article successions |
|---|---|---|---|---|---|---|---|---|---|
| | 0 | 1 | 2 | 3 | 4 | 5 | 6 | 7 | |
| 100 | 31 | 16 | 29 | 30 | 11 | × | 6 | 90 | 213 |
| 120 | 35 | 20 | 56 | 60 | 19 | × | 9 | 110 | 309 |
| 140 | 43 | 31 | 66 | 110 | 24 | × | 17 | 117 | 408 |
| 160 | 58 | 36 | 94 | (150) | 28 | × | 19 | (122) | 507 |

*FIG. 33*

Article-gravitation data: Table 3402

| Data age (Days) | Index of succeeding article | | | | | | | | Number of article successions |
|---|---|---|---|---|---|---|---|---|---|
| | 0 | 1 | 2 | 3 | 4 | 5 | 6 | 7 | |
| 100 | 0.146 | 0.075 | 0.136 | 0.141 | 0.052 | x | 0.028 | 0.422 | 426 |
| 120 | 0.126 | 0.069 | 0.163 | 0.172 | 0.057 | x | 0.029 | 0.383 | 522 |
| 140 | 0.119 | 0.076 | 0.153 | 0.225 | 0.056 | x | 0.037 | 0.333 | 621 |
| 160 | 0.124 | 0.072 | 0.171 | 0.250 | 0.054 | x | 0.035 | 0.294 | 720 |

Article-gravitation data – periodic reset Table 3404

| Data age (Days) | Index of succeeding article | | | | | | | | Number of article successions |
|---|---|---|---|---|---|---|---|---|---|
| | 0 | 1 | 2 | 3 | 4 | 5 | 6 | 7 | |
| 100 | 0.146 | 0.075 | 0.136 | 0.141 | 0.052 | x | 0.028 | 0.422 | 213 |
| 120 | 0.113 | 0.065 | 0.181 | 0.194 | 0.061 | x | 0.029 | 0.356 | 309 |
| 140 | 0.105 | 0.076 | 0.162 | 0.269 | 0.059 | x | 0.042 | 0.287 | 408 |
| 160 | 0.114 | 0.071 | 0.185 | 0.296 | 0.055 | x | 0.037 | 0.241 | 507 |

*FIG. 34*

METHOD AND APPARATUS FOR GUIDING CONTENT SELECTION WITHIN AN INFORMATION DISTRIBUTION SYSTEM BASED ON MODELLING USER BEHAVIOR

CROSS REFERENCE TO RELATED APPLICATIONS

The present application is a Continuation of U.S. patent application Ser. No. 16/304,838 filed Nov. 27, 2018, now U.S. Pat. No. 11,301,915, which is a U.S. National Stage of International Application No. PCT/CA2017/000144 filed Jun. 13, 2017, which claims the benefit from the U.S. provisional application 62/349,268 filed Jun. 13, 2016, the entire contents of the above noted applications being incorporated herein by reference.

FIELD OF THE INVENTION

The present invention relates to social networks and information distribution systems. In particular, the invention is directed to frequent adjustment of data relevant to users' selection of articles through a social network.

BACKGROUND OF THE INVENTION

A content provider may wish to persuade a person who just finished inspection of an article to access a new article which may be relevant to the mission or business of the content provider.

In one approach, a person currently inspecting a specific article may be directed to another article having a significant content similarity to the content of the specific article as determined by a Natural-Language-Processing algorithm, or any other means.

In another approach, a recommended new article may be based on usage data. If a large proportion of all persons who inspected a specific article also inspected a particular other article, a person currently inspecting the specific article may be persuaded to access the particular other article.

Adopting the two approaches independently may result in different recommendations. A recommendation based only on content similarity may miss a very popular article. A recommendation based only on usage data would miss a new article which may be of significant interest to a person inspecting a current article. There is a need therefore for exploring new comprehensive methods which attempt to provide a balanced recommendation based on considering different aspects of information processing.

SUMMARY

The object of the present invention is to provide improved methods and apparatuses for interaction with a social network (also simply referenced as a "network").

In accordance with an aspect, the invention provides a method of modelling user behaviour in a network. The method is implemented by a computing device and comprises processes of characterizing a plurality of articles accessible through the network, acquiring usage data relevant to users' access to the articles, and periodically adjusting accumulated usage data. A cyclic timer is accessed for this purpose. Pairwise content similarities of the plurality of articles may be acquired from external sources or determined from acquired characteristics of the articles.

Upon detecting access to a particular article by a particular user, a preferred article to succeed the particular article is determined according to the pairwise content similarities and prior usage measures of article-access transitions for all directed article pairs emanating from the particular article. An identifier of the preferred article is then communicated to the particular user.

Upon detecting a transition from the particular article to a subsequent article, the prior usage measure is updated according to the transition. The current usage measures for directed article pairs emanating from the particular article may be attenuated if a total usage measure for the particular article exceeds a predefined lower bound and a cyclic time exceeds a predefined duration. The current usage measure may be attenuated at any time if the total usage measure exceeds a predefined upper bound. Attenuating usage measures may be effected by reducing a current measure according to a predefined multiplier or according to a function of a value of a current measure.

In order to account for users' characteristics, a plurality of users of the network is segmented into a number of user clusters. Thus, each user would be associated with one of the user clusters. Furthermore, a level of proximity of a user of the plurality of users to a centroid of a cluster to which each user belongs is determined and a weight is assigned to the user according to a respective level of proximity.

The prior usage measure may be a global usage measure determined as a count of the article-access transitions effected by a plurality of users of the network. The prior usage measure may also be a cluster-specific usage measure determined as a count of the article-access transitions effected by a cluster to which the particular user belongs. Preferably, a cluster-specific usage measure is determined as a summation of weights assigned to users effecting the article-access transitions and belonging to a cluster to which the particular user belongs.

In accordance with an embodiment, the prior usage measure comprises both a global usage measure and a cluster-specific usage measure. The global usage measure is determined as a count of the article-access transitions effected by a plurality of users of the network while the cluster-specific usage measure is determined as a summation of weights assigned to users effecting the article-access transitions and belonging to a cluster to which the particular user belongs.

According to an embodiment, characteristics of the plurality of articles are acquired and the predefined duration after which attenuation may be applied may be selected to depend on characteristics of an article under consideration.

The pairwise content similarities may be determined by obtaining contents of the plurality of articles, formulating word vectors, and performing pairwise comparisons of the word vectors. Each word vector characterizes content of a respective article of the plurality of articles.

In accordance with one aspect, the invention provides an apparatus for recommending a new article following inspection of a current article. The apparatus comprises a pool of hardware processors, memory devices holding article data, user data, and usage data, and memory devices holding modules of software instructions.

The article data includes a collection of articles and corresponding word vectors which may be used to generate content-similarity levels for each pair of articles. The user data includes users' grouping data according to predefined criteria. The usage data includes an overall score of the number of transitions to each other article as well as a group-specific score of the number of transitions to each other article for each user group.

The software instructions cause the pool of processors to determine for each article an appropriate succeeding article and update the overall score and the group-specific score upon detecting a transition from one article to another article within the collection of articles.

In accordance with another aspect, the present invention provides a method of interacting with an information distribution system. The method is implemented at a computing device and comprises processes of acquiring information characterizing a plurality of articles and information characterizing a plurality of users accessing the articles. Inter-article affinity levels are determined accordingly.

A plurality of users of the information system is tracked to identify pairwise article successions, wherein a pairwise article succession comprises two articles accessed by a same user. Composite pairwise affinity levels of said plurality of articles are determined according to respective inter-article content similarity, types of tracked users effecting the pairwise article successions, and pairwise frequency of article successions. A preferred article to succeed a designated article is determined according to the composite pairwise affinity levels. Subsequently, an identifier of the preferred succeeding article is communicated to a user accessing the designated article.

The plurality of users may be segmented into a plurality of clusters according to a predefined criterion and the types of tracked users are determined as identifiers of respective clusters to which said tracked user belong.

For a finer characterization of the users, in addition to associating each tracked user with a respective group of users, a level of significance of a user within a respective group of users may be taken into account. Thus, a type of a tracked user may be defined according to a group of users to which the tracked user belongs and a respective level of significance within the group of users.

In order to evaluate the effectiveness of recommending succeeding articles to users, according to one embodiment, the method implements a process of detecting access transitions to subsequent articles following communicating recommendations to users, and updating a measure of effective recommendations based on the proportion of article transitions that follow respective recommendations.

In accordance with another embodiment, the method evaluates the effectiveness of recommendations by detecting an access transition to a subsequent article following a recommendation. A first composite affinity level of a designated article to a preferred succeeding article, and a second composite affinity level of the designated article to the subsequent article are determined. Discrepancy statistics may then be determined based on comparing the first composite affinity level and the second composite affinity level.

Determining the preferred succeeding article may be based on determining a set of candidate succeeding articles and selecting an article from the set. Directed article pairs originating from a designated article are ranked according to composite pairwise affinity levels and the set of candidate succeeding article is selected based on the result of ranking. The preferred succeeding article may be selected using a randomly sequenced round robin process weighted according to composite pairwise affinity levels of the candidate directed article pairs. In general, a directed article pair of inter-article content similarity, exceeding a predefined threshold, may be excluded from the set of candidate succeeding articles.

The process of determining pairwise inter-article content similarity may be based on formulating word vectors, each word vector characterizing content of a respective article of said plurality of articles and performing pairwise comparisons of word vectors of different articles. A memory device coupled to the computing device stores composite pairwise affinity levels exceeding a predefined lower bound.

In accordance with a further aspect, the present invention provides a method of interacting with an information system comprising tracking a plurality of users accessing a plurality of articles, determining for each tracked user a respective user type, a currently accessed article, and article-access transition if any. For each article-access transition, where a particular user accesses a first article then a second article, a global measure and a user-type measure of transitions from the first article to the second article are updated. A composite measure is then determined as a function of the global measure and the user-type measure. A first target article to succeed the currently accessed article is determined according to composite measures of directed article pairs originating from said currently accessed article. The first target article is communicated to a respective user.

The method implements a process of acquiring contents of the plurality of articles and determining pairwise content similarities of said plurality of articles. A composite affinity level for each directed pair of articles is determined as a function of at least one of a respective content similarity, a respective global measure, and/or a respective user-type measure. A second target article to succeed the currently accessed article may be determined according to composite affinity levels of directed article pairs originating from the currently accessed article. The second target article may also be communicated to a respective user.

According to an embodiment, the method implements a process of acquiring characteristics of the plurality of users and clustering the plurality of users into a number of clusters according to the characteristics and a predefined criterion. The user type may be determined as an identifier of a cluster to which the tracked user belongs.

For a finer determination of the user type, centroids of the plurality of clusters are determined and a centroid-proximity measure of a user is determined according to proximity of the user to a respective centroid.

The global measure and user-type measure of transitions are updated following each article-access transition.

In accordance with a further aspect, the present invention provides an apparatus for interacting with an information system. The apparatus comprises a process and memory devices storing processor executable instructions organized in a number of modules.

A tracking module tracks a plurality of users accessing a plurality of articles to acquire contents of the plurality of articles, characteristics of said plurality of users, and pairwise article successions.

A module characterizing the articles determines pairwise content-similarity levels of the articles.

A module characterizing the users divides the plurality of users into clusters according to the users' characteristics;

A module characterizing usage accumulates for each directed article pair of said pairwise article successions a gravitation measure based on a respective succession count and an attraction measure for each cluster of users indicating a respective cluster-specific weight.

A recommendation module determines for a reference article an identifier of a preferred succeeding article according to pairwise content-similarity levels, gravitation measure, and said attraction measure. The module communicates the identifier to a user accessing the reference article. The recommendation module is further configured to determine an affinity level for each directed article pair according to respective content-similarity level, gravitation measure, and attraction measure. The directed article pairs originating from each article are sorted into ranks according to respective affinity levels. The preferred succeeding article is then determined according to ranks of directed article pairs originating from the reference article.

The apparatus further comprises a module, stored in one of the memory devices, configured to detect a subsequent article accessed by a user and report discrepancies of content-similarity, gravitation measure, and attraction measure between transition to the subsequent article and a transition to a preferred succeeding article communicated to the user.

Thus, an improved methods and apparatuses for interaction with information distribution system have been provided.

BRIEF DESCRIPTION OF THE DRAWINGS

Embodiments of the present invention will be further described with reference to the accompanying exemplary drawings, in which:

FIG. 31 illustrates normalized levels of article-succession gravitation corresponding to the table of FIG. 30;

FIG. 33 illustrates article-gravitation scores adjusted according to data age and the effect of adjusting the article-gravitation scores on determining a preferred succeeding article, in accordance with an embodiment of the present invention;

FIG. 34 illustrates normalized values of the article-gravitation levels of FIG. 33;

TERMINOLOGY

Figure 1:
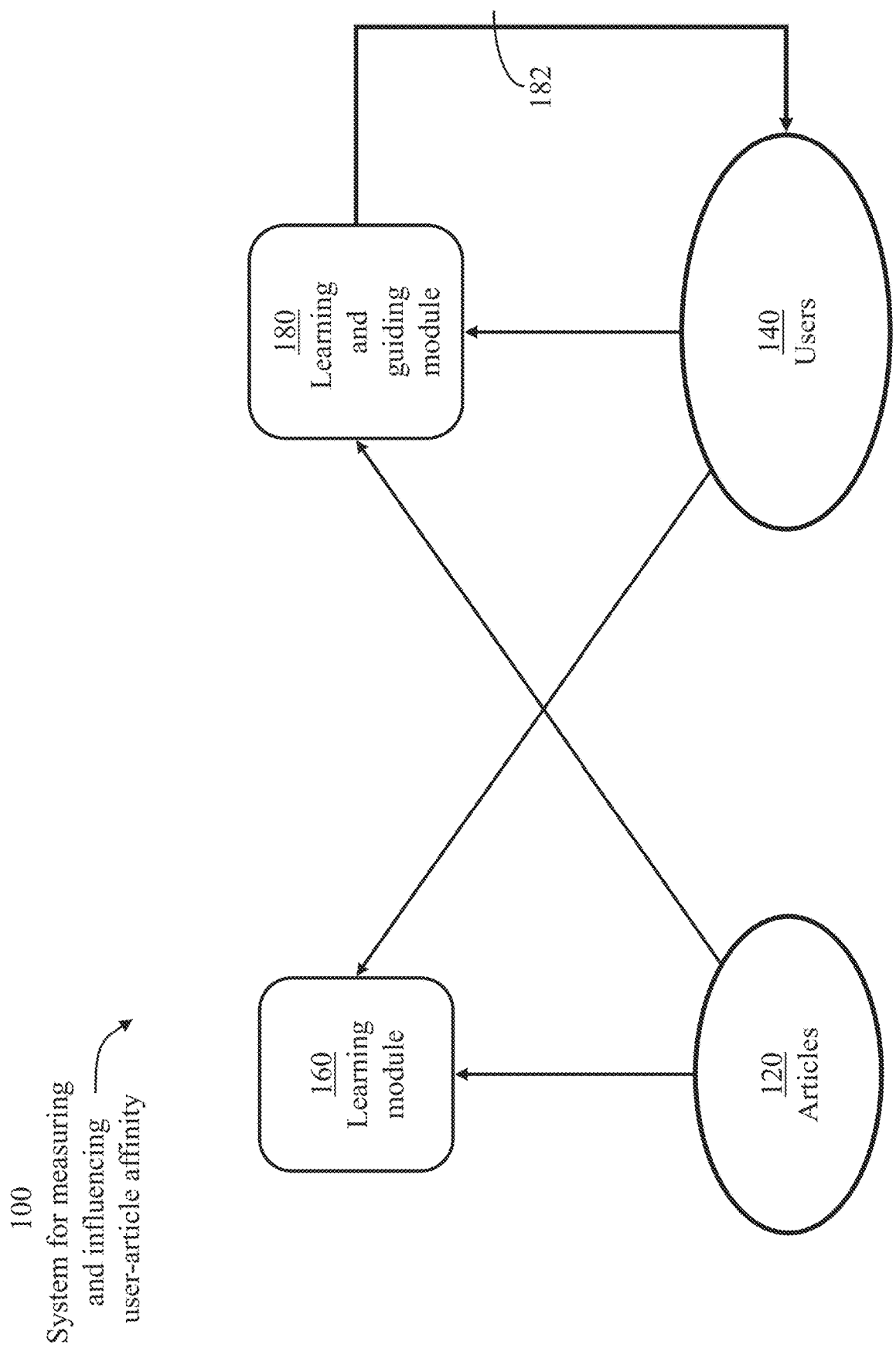
FIG. 1 illustrates a system 100 for measuring and influencing article selection, in accordance with an embodiment of the present invention.

Article: Information stored in a medium in the form of text, image, audio signal, and/or video signal is referenced as an article.

Article inspection: The act of reading, viewing, or listening to an article is referenced as "article inspection".

Directed article pair: When a user visits article "X" then article "Y", "X" and "Y" are said to form a directed article pair. The transition rates from "X" to "Y" may differ from the transition rate from "Y" to "X".

Article transition: The act of successively accessing two articles within a predefined interval of time is referenced as "article transition".

Article succession: An article succession comprises two articles accessed by a same user Frequency of article successions: The term refers to incidence (numbers) of article sections Pairwise frequency of article successions: The term refers to incidence of article successions for each directed article pair.

Content similarity: A level of similarity of two articles may be based on comparing contents of the two articles.

Pairwise inter-article content similarity: The term refers to values of content similarity for each directed article pair.

Composite pairwise affinity levels: The term refers to values composite affinity levels for each directed article pair.

Inter-article global measure of successions: The term refers to any measure relevant to article successions independent of users causing the successions.

User-type measure: The term refers to any measure relevant to article successions for a specific type of users.

Inter-article gravitation measure: The term refers to a measure of inter-article gravitation based, for example, on a count (score) of the number of transitions from one article to another, or some other criterion, a gravitation measure is independent of the types of users effecting the transitions. An inter-article gravitation measure is a global measure.

Inter-article gravitation level: The term refers to a ratio of an inter-article gravitation measure from a first article to a second article to the total number of transitions from the first article to all other articles.

Inter-article attraction measure: The term refers to a measure based on a summation of levels of significance of users of a same user group (same user cluster) effecting transitions from one article to another. An inter-article attraction measure is a user-type measure.

Inter-article attraction level: The term refers to a ratio of an inter-article attraction measure from a first article to a second article to the total number of transitions from the first article to all other articles effected by users of a same cluster.

A level of significance: A value associated with a user relevant to the user's position within a respective group of users.

User type: A user type may be defined in terms of a user's association with a group of users as well as the user's level of significance within the group.

Clustering: A process of grouping users based on descriptors of the users is referenced as "clustering". The descriptors of the users may relate to several aspects such as income, education, interest, and social activities. A user may be characterized according to a vector of descriptors.

Centroid: A hypothetical user whose vector of descriptors is a mean value of the vectors of descriptors of a set of users is referenced as a "centroid". The mean value is not necessarily an arithmetic mean.

Centroid-proximity measure (or centroid-proximity coefficient): A user's distance (such as a normalized Euclidean distance) from a centroid of a cluster to which the user belongs may be used as a level of significance of the user.

Usage data: Usage data includes an overall score of the number of transitions from a reference article to each other article, and a cluster-specific score of the number of transitions to each other article for each user cluster.

Cyclic age: Usage data may be frequently adjusted to place more emphasis on more recent usage patterns. The period between the time of a previous adjustment and a current observation time is referenced as "cyclic age".

Measure of effective recommendations: The term refers to a value indicating effectiveness of recommendations, such as a proportion of transitions obeying recommendations or a (positive) change in mean value of a composite measure of affinity.

Randomly sequenced round robin process: The term refers to selecting items from different sets in a random order.

NOTATION

ρ: Number of article ranks

T(y): Number of transitions to an article y from a reference article

R(y): Rank of article y (with respect to a reference article)

U(r): Index of an article of rank r, $0 < r \le \rho$

χ: Number of clusters of users c: Index of a cluster of users $C_j$: Cluster of index j, $0 \le j < \chi$ Θ(x,y): Similarity level of articles y and x (Θ(x,y)=Θ(y,x))

G(x,y): Score of any users selecting article y after inspecting article x (G(y,x) is not necessarily equal to G(x,y))

Γ(x,y,c): Score of users of a specific cluster of users selecting article y after inspecting article x (Γ(y,x,c) is not necessarily equal to Γ(x,y,c))

Φ(x,y,c): A composite coefficient of affinity of article y to article x (Φ(x,y,c) is not necessarily equal to Φ(y,x,c))

τ: Data-age threshold $\Sigma_{min}$: Lower bound of gravitation score (for the entire population of users)

$\Sigma_{min}$: Upper bound of gravitation score (for the entire population of users)

$S_{min}$: Lower bound of attraction score (for a specific cluster of users)

$S_{max}$: Upper bound of attraction score (for a specific cluster of users)

REFERENCE NUMERALS

100: System for measuring and influencing article selection

120: A plurality of articles
140: A plurality of users
160: A learning module
180: A learning-and-guiding module
182: Communication path from a learning-and-guiding module to a plurality of users
200: Components of module 160 and module 180
220: Information Distribution System (also referenced as "Information System")
241: Process of acquiring article-access data
242: Process of determining article-succession patterns
263: Process of recommending article succession
264: Process of measuring effect of recommendation
300: Article-succession selection system
302: Processes relevant to articles
304: Processes relevant to usage and users
310: Process of acquiring a plurality of articles from the Information Distribution System
320: Process of characterizing the plurality of articles
330: Process of determining mutual article-content similarity
340: Process of tracking users of the Information Distribution System
350: Process of selecting a plurality of users of interest
360: Process of characterizing the plurality of users of interest
370: Process of characterizing usage of articles
380: Process of correlating article succession to content similarity and usage statistics
390: Process of determining preferred article successions and informing respective users
400: A learning system
410: Article-characterization data
420: User-characterization data
430: User-tracking data
440: Memory device storing affinity data
441: Article content-similarity data
442: Usage statistics
446: User-independent inter-article gravitation data
448: User-specific inter-article attraction data
460: Parameters of an affinity-determination expression
500: Learning and guiding system
510: Module for recommending a successor article
520: Module for measuring effect of recommending
580: Recommendations sent to users
600: Visualization of a plurality of users
602: User representation
610: A cluster $C_0$ of users
611: A cluster $C_1$ of users
612: A cluster $C_2$ of users
613: A cluster $C_3$ of users
620: Centroid of Cluster $C_0$
621: Centroid of Cluster $C_1$
622: Centroid of Cluster $C_2$
623: Centroid of Cluster $C_3$
700: Visualization of categorizing users belonging to a cluster into strata according to centroid proximity
720: Centroid representation
800: Process of affinity-data formation
810: Users' indices
812: Cluster to which a user belongs
814: Centroid-proximity coefficient
820: Articles' indices
840: Array of content similarity of an article to each other article
860: Array of gravitation score from an article to each other article
880: Arrays of attraction score from an article to each other article for different clusters of users where the attraction score is independent of users proximity to respective centroids
900: Affinity coefficient (affinity level) computation
910: Array of article-content similarity levels with respect to a specific article
912: A similarity level below a predefined lower bound
914: A similarity level exceeding a predefined upper bound
920: Array of gravitation scores with respect to a specific article, $G(x,y)$, $x=8$, $0 \leq y < M$, $y \neq x$, $M=20$
930: Array F of attraction scores with respect to a specific article (of index 8) for users of a specific proximity to the centroid of a cluster of users ($\Gamma(x,y,c)$, $x=8$, $0 \leq y < M$, $y \neq x$, $M=20$)
940: Array $\Phi$ of composite affinity coefficients (composite affinity levels) of articles with respect to a specific article, $\Phi(x,y,c)$, $x=8$, $0 \leq y < M$, $y \neq x$, $M=20$
950: An exemplary composite affinity coefficient (level)
1000: Details of learning module 160
1010: Step of initializing a gravitation matrix and attraction matrices
1020: Process of tracking users
1030: Process of detecting article-access succession
1040: Process of determining user index and indices of detected successive articles
1050: Process of determining a cluster to which the user belongs and level of proximity to centroid
1060: Process of updating the gravitation matrix and attraction matrices
1100: Learning and guiding module
1110: Process of detecting access to an article
1120: Process of determining index of user and index of the accessed article
1130: Process of determining the cluster to which the user belongs and corresponding centroid-proximity coefficient
1140: Process of determining a preferred successor article and recommending the preferred successor to the user
1150: Process of detecting user's access to a new article within a specified interval
1152: Process of selecting a succeeding process according to a result of detecting
1160: Process of determining the index of a new article
1170: Process of updating the gravitation matrix and attraction matrices
1180: Process of measuring the effect of recommendations
1190: Process of communicating measurements for further processing
1200: Matrices of affinity data
1220: User-independent inter-article affinity
1222: Similarity matrix
1224: Gravitation matrix
1240: User-dependent inter-article affinity
1242: Attraction matrices
1300: Criterion for selecting a candidate article (1300A) and processes of selecting a candidate article (1300B)
1310: Affinity data corresponding to a cluster of users
1340: Process of detecting access to an article
1350: Process of determining index of an article and cluster to which a user belongs
1360: Process of generating a random integer
1370: Process of selecting an article corresponding to a generated integer 1380: Process of communicating article information to a user
1400: Illustration of weighted random selection of candidate articles
1420: Rank of a candidate article
1440: Start of an integer band
1450: An integer band
1500: Apparatus for article recommendation
1502: Currently accessed article
1504: Recommended subsequent article
1506: An article selected following a current article
1510: Tracking module
1520: Pool of processors
1530: Memory device storing articles 120 (FIG. 1)
1540: Memory device storing users' cluster data
1550: Memory device storing article-similarity levels
1560: Memory device storing article gravitation scores
1570: Memory device storing article attraction scores
1580: Storage of software instructions
1581: Memory device storing software instructions relevant to succeeding-article recommendation
1582: Memory device storing software instructions relevant to measuring effect of recommendation
1584: Memory device storing software instructions relevant to similarity-data update
1586: Memory device storing software instructions relevant to gravitation-data update
1588: Memory device storing software instructions relevant to attraction-data update
1600: Exemplary article-content similarity levels and gravitation levels
1610: Article-content similarity levels with respect to a selected article
1620: Gravitation levels with respect to a selected article
1700: Exemplary attraction levels
1730: Exemplary attraction levels with respect to a selected article where users belonging to a specific cluster are given a same weight
1740: Exemplary attraction levels with respect to a selected article where a user belonging to a specific cluster is given a weight dependent on the user's proximity to the centroid of the cluster
1800: Sorted articles
1810: Sorted articles according to article-content similarity levels
1820: Sorted articles according to gravitation levels
1830: Sorted articles according to attraction levels
1900: Ranked articles
1910: Indices of sorted article-content similarity levels 410
1920: Indices of sorted gravitation levels 420
1930: Indices of sorted attraction levels 430
2000: Process of merging similarity levels, gravitation levels, and attraction levels of respective subsets of articles
2010: A set of articles of significant article-content similarity levels with respect to a specific article
2011: Indices of articles of set 2010
2012: Article-content similarity levels
2020: A set of articles of significant gravitation levels with respect to the specific article
2021: Indices of articles of set 2020
2022: Gravitation levels
2030: A set of articles of significant attraction levels with respect to the specific article
2031: Indices of articles of set 2030
2032: Attraction levels
2040: set containing merged sets 2010 and 2030
2041: Indices of articles of combined set 2040
2042: Normalized article-content similarity levels corresponding to set 2040
2043: Normalized gravitation levels corresponding to set 2040
2050: set containing merged sets 2010, 2020, and 2020
2051: Indices of articles of set 2050
2052: Normalized article-content similarity levels corresponding to set 2050
2053: Normalized gravitation levels corresponding to set 2050
2054: Normalized attraction levels corresponding to set 2050
2100: Process of merging similarity levels, gravitation scores, and attraction scores of respective subsets of articles
2120: A set of articles of significant gravitation scores with respect to the specific article
2121: Indices of articles of set 2120
2122: Gravitation scores
2130: A set of articles of significant attraction scores with respect to the specific article
2131: Indices of articles of set 2130
2132: Attraction scores
2140: set containing merged sets 2010 and 2130
2141: Indices of articles of combined set 2140
2142: Normalized article-content similarity levels corresponding to set 2140
2143: Gravitation scores corresponding to set 2040
2150: set containing merged sets 2010, 2120, and 2130
2151: Indices of articles of set 2150
2152: Normalized article-content similarity levels corresponding to set 2150
2153: Gravitation scores corresponding to set 2150
2154: Attraction scores corresponding to set 2150
2200: Processes of computation of content similarity coefficients
2210: Initializing index "j" of a reference article to equal 0
2220: Acquiring content of article j; for example a set of words W(j)
2230: Initializing index "k" of a target article to equal (j+1)
2240: Acquiring content of article k; for example a set of words W(k)
2250: Determining article-content similarity level $\alpha(j, k)$ of the articles of indices j and k
2260: Selecting next target article of index (k+1)
2264: Determining if all target articles with respect to the reference article of index j have been considered
2270: Selecting next reference article (of index j+1)
2280: Determining if all reference articles have been considered
2290: Completion message indicating availability of all mutual article-content similarity levels
2300: Article-content similarity data
2310: Indices of articles
2320: Matrix of article-content similarity levels for all pairs of articles (using, for example, a set of words W(j) of an article of index j. $0 \leq j < M$; M being the number of articles under consideration)
2325: Mutual article-content similarity level $\alpha(j, k)$, $\alpha(k, j) = \alpha(j, k)$, $0 \leq j < (M-1)$, $k > j$; $\alpha(x, x) = 1.0$, $0 \leq j < M$
2330: Indices of mutual article-content similarity levels in array 2340
2340: Array of article-content similarity level

2430: Matrix of mutual article-content similarity levels

2440: Mutual article-content similarity level

2441: Content-similarity to a target article that is below a predefined lower bound, rendering transition to the target article less likely

2442: Content similarity to a target article that is above a predefined upper bound, rendering transition to the target article less likely

2500: Sorted articles according to similarity levels

2510 Index of a reference article (current article)

2520: Index of a target article

2530: Content similarity table

2540: Content-similarity levels

2550: Table of sorted significant mutual article-content levels

2560: Indices of target articles of significant mutual content-similarity levels with respect to a reference article

2600: Table of sets of candidate successor articles, for each reference article, according to article-content similarity data

2610: Index of a reference article

2620: Indices of succeeding articles sorted in descending order according to content-similarity levels excluding articles of content-similarity levels to the reference article below a predefined lower bound or above a predefined upper bound.

2630: Mutual article-content similarity level

2700: Processes of creating, updating, and sorting numbers of transitions from a selected article to other articles of a collection of articles

2705: Initializing $\rho$, array T, array Y, and array U to zero; $\rho$ denotes the number of article ranks, T(y) denotes the number of transitions to an article y, R(y) denotes a rank of article y, and U(r) denotes an index of an article of rank r, $0 < r \leq \rho$

2710: Process of detecting a user accessing an article of index y following visiting an article of index x

2712: Process of determining whether article y has been accessed following article x

2720: Process of updating array T to count an additional visit of article y following article x

2722: Process of revisiting process 2710 if the rank of article y is 1 (hence article y cannot be promoted)

2730: Next better rank

2740: Process of identifying an article w of a rank better than the rank h of article y

2750: Process of determining whether article y has realized a better score than article w, i.e., whether T(y) is now greater than T(w); this condition is only reached if T(y)=T(w)+1

2755: Process of visiting process 2780 if article w is of rank 1

2760: Selecting another better rank (this would be needed if there are more than two articles having the same score as determined from array T)

2770: Process of determining whether to maintain current article ranks and return to process 2710 or promote article y to a better rank (process 2780)

2775: Revising rank of new article to be promoted

2780: Process of exchanging ranks of article y and article w

2800: Exemplary results of Processes 2700 (presented in FIG. 28 as 2800A and in FIG. 29 as 2800B)

2820: Largest rank $\rho$ of an article inspected after article x

2830: Article rank, index of array U storing indices of ranked articles; U(r) is the index of an article of rank r

2840: Indices of articles

2850: Array T storing a score of each article y selected after article x; T(y) is the number of users selecting article y after article x

2860: Array R storing a rank of each article y selected after article x; R(y) is the rank of article y; $R(y) \leq \beta$

3000: Exemplary table indicating numbers of transitions from each article of a collection of articles to each other article of the collection of articles

3010: Index of a reference article (current article)

3020: Index of a succeeding article

3030: Number of transitions from an article x to an article y (i.e., number of users selecting article y after inspecting article x); $0 \leq x < M$; $0 \leq y < M$, $y \neq x$, M being the number of articles under consideration

3040: Total number of transitions from each article

3100: Table of normalized article-succession scores

3150: Proportion of transitions from an article x to an article y (i.e., ratio of the number of users selecting article y after inspecting article x to the total number 3040 of users selecting an article belonging to a specified collection of articles); $0 \leq x < M$; $0 \leq y < M$; $y \neq x$

3200: Data structures for a large-scale system

3210: Plurality of selected articles

3220: Indices of reference articles

3240: Successor articles of significant similarity to respective reference articles

3242: Index of target article

3245: Similarity level

3250: Successor articles of significant gravitation to respective reference articles

3255: Gravitation level

3260: Successor articles of significant attraction to respective reference articles

3265: Attraction level

3300: Gravitation scores adjusted according to data age

3302: Table of article-gravitation score

3304: Table of article-gravitation score with an adjustment

3310: Data age in arbitrary units (days for example)

3320: Index of an article y succeeding a reference article x

3330: Number of users accessing article y after accessing reference article x

3340: Total number of users selecting an article from a specified collection of articles after inspecting reference article x

3350: Age-adjusted number of users accessing article y after accessing reference article x

3360: Age-adjusted total number of users selecting an article from a specified collection of articles after accessing reference article x

3402: Table of normalized article-gravitation score

3404: Table of normalized article-gravitation score with an adjustment

3430: Ratio of number of users accessing article y after accessing reference article x to the total number 3240 of users selecting an article from a specified collection of articles after inspecting reference article x

3450: Ratio of the age-adjusted number of users accessing article y after accessing reference article x to the age-adjusted total number 3260 of users selecting an article from a specified collection of articles after accessing reference article x 3510: Normalized previous gravitation levels of articles with respect to a reference article
3520: Normalized Incremental gravitation levels of articles with respect to a reference article
3530: Normalized Cumulative gravitation levels of articles with respect to a reference article
3540: Normalized age-adjusted gravitation levels of articles with respect to a reference article
3550: Index of target article succeeding reference article
3600: A procedure of adjusting article-gravitation data and article-attraction data according to data age and article-transition score
3610: A process of detecting user selection of a new article following a specific (reference) article
3620: A process of updating gravitation data and attraction data relevant to the reference article to account for selection of the new article
3622: Action based on comparing size of gravitation data for a specific article with a predefined lower bound $\Sigma_{min}$
3624: comparing age of gravitation data with a predefined age threshold and branching to other processes accordingly
3626: Comparing size of gravitation data for a specific article with a predefined upper bound $\Sigma_{max}$ and branching to other processes accordingly
3630: A process of adjusting gravitation vector of the reference article
3640: Comparing size of attraction data for the specific article with a lower bound $S_{min}$ defined for a cluster to which the user belongs and branching to other processes accordingly
3642: Comparing age of attraction data with a respective predefined age threshold and branching to other processes accordingly
3650: A process of adjusting attraction vector of the reference article
3652: Comparing size of attraction data for the specific article with an upper bound $S_{max}$ defined for the cluster to which the user belongs and branching to other processes accordingly
3710: Article-transitions score at age τ, exceeding $\Sigma_{min}$
3720: Adjusted article-transitions score at age τ, with an adjustment coefficient of 0.5
3730: Article-transitions score exceeding $\Sigma_{min}$ at cyclic age r
3740: Adjusted article-transitions score at cyclic age τ, with an adjustment coefficient of 0.5
3750: Article-transitions score of $\Sigma_{max}$ at cyclic age less than τ
3760: Adjusted article-transitions score with an adjustment coefficient of 0.5 at a cyclic age less than τ
3820: Adjusted article-transitions score at age τ, with an adjustment coefficient of 0.8
3830: Article-transitions score of $\Sigma_{max}$ at cyclic age less than τ
3840: Adjusted article-transitions score with an adjustment coefficient of 0.8 at a cyclic age less than τ
3850: Article-transitions score of $\Sigma_{max}$ at cyclic age much less than τ
3860: Adjusted article-transitions score with an adjustment coefficient of 0.8 at a cyclic age much less than t
3900: A module for determining a preferred article to succeed a current article based on age-weighted score of article successions
3910: Process of accessing a cyclic timer providing cyclic-time indications
3920: Process of detecting article succession where a user accesses a subsequent article following a current article
3922: Process of identifying type of a user effecting the article succession
3924: Process of updating gravitation scores and attraction scores to account for the detected succession
3926: Process of acquiring a total gravitation score $\Sigma_1$ of the source article of the succession
3928: Step of branching to other processes based on comparing $\Sigma_1$ with a predefined lower bound $\Sigma_{min}$
3930: Process of comparing a current cyclic time indication with a predefined period (50 days for example)
3940: Process of attenuating gravitation scores of a reference article; multiplying each pairwise gravitation score of a directed article pair by a predefined value; 0.8 for example
3950: Process of acquiring a total attraction score $S_1$ of the source article of the succession based on user type
3952: Step of branching to other processes based on comparing $S_1$ with a predefined lower bound $S_{min}$
3960: Process of attenuating attraction scores of a reference article (multiplying each pairwise attraction score of a directed article pair by a predefined values which may be user-type specific
3980: Processes of determining a preferred succeeding article based on accumulated scores which may be age weighted
4000: Another module for determining a preferred article to succeed a current article based on global age-weighted scores of article successions
4010: Reading a current time indication
4020: Detecting article access
4030: Determining and communicating a preferred succeeding article
4040: Detecting article succession
4050: Updating global data (gravitation data)
4060: Determining total global score (gravitation score) of first article of a succession
4061: Comparing total gravitation score to a predefined lower bound
4062: Comparing cyclic time to a predefined duration
4063: Comparing total gravitation score to a predefined upper bound
4070: Attenuating global scores (gravitation scores)
4100: Module for determining a preferred article to succeed a current article based on user-dependent age-weighted scores of article successions
4130: Determining user-type
4150: Updating global data (gravitation data) and user-dependent data (attraction data)
4160: Determining total attraction score of first article of a succession
4180: Attenuating attraction scores

DETAILED DESCRIPTION OF EMBODIMENTS

FIG. 1 illustrates a system 100 for measuring and influencing article selection. Any user of plurality of users 140 may gain access to any article of a plurality of articles 120 through a network (not illustrated). In accordance with an embodiment of the present invention, a learning module 160 may be devised to track users' access to articles and determine patterns of users' attraction to articles based on articles' contents and users' attributes. The learning module 160 may be upgraded to learning and guiding module 180 which exploits learned users-articles characteristics to influence a user's article selection through communicating with users over a communication path 182. In accordance with one approach, the learning and guiding module 180 may identify a target successor to a current article according to content similarity of the two articles, historical data relevant to incidences of users' access transition from the current article to the target successor, and historical data relevant to incidences of transition from the current article to the target successor for a specific class of users to which a target user is perceived to belong.

Figure 2:
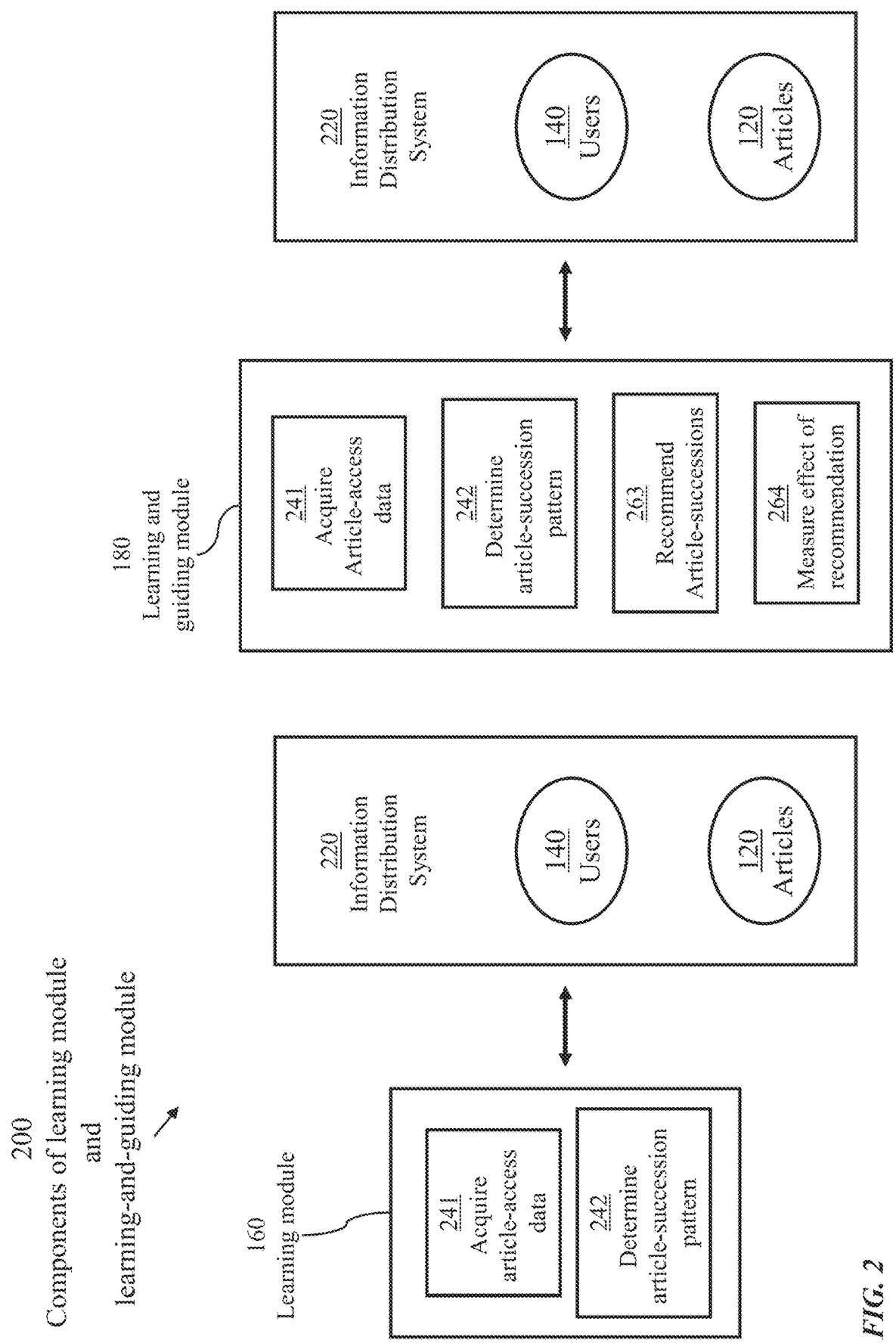
FIG. 2 illustrates components 200 of a learning module and a learning-and-guiding module, in accordance with an embodiment of the present invention.

FIG. 2 illustrates components 200 of module 160 and module 180. The plurality of articles 120 are accessible through an Information Distribution System (Information System) 220, and the plurality of users 140 may be tracked through the Information Distribution System 220. The learning module 160 implements two main processes: a process 241 which observes users to acquire article-access data, and a process 242 of determining users' successive article-selection patterns. The learning-and-guiding module 180 also implements two main processes 241 and 242 in addition to a process 263 of determining a preferred successor to a currently accessed article and recommending the preferred successor to a target user. A process 264 measures effect of recommendation and communicates the measurements to a system administrator which may be a person or an automaton.

Figure 3:
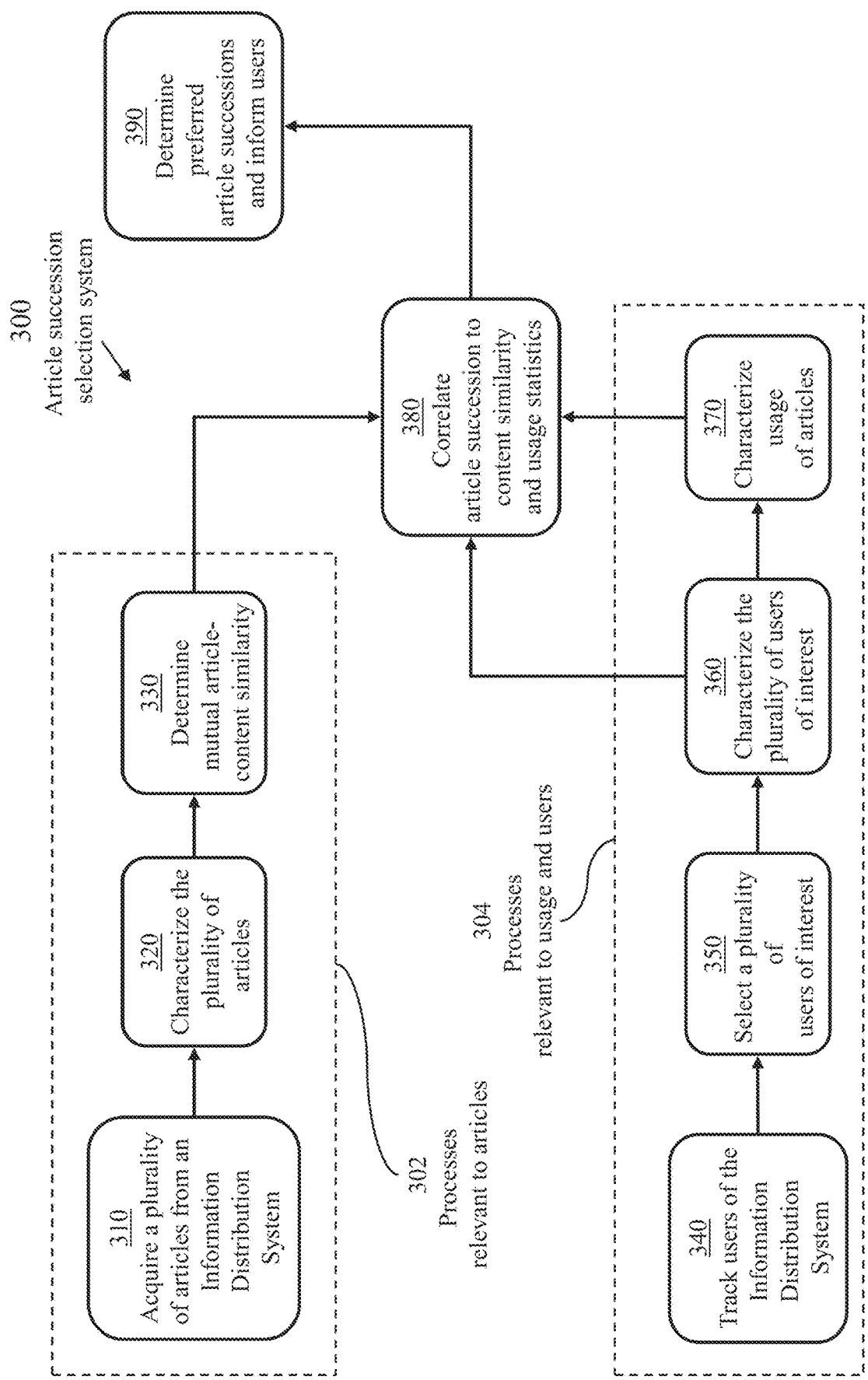
FIG. 3 illustrates a system for article-succession selection, in accordance with an embodiment of the present invention.

FIG. 3 illustrates a system 300 for article-succession selection. The system implements processes 302 relevant to articles and processes 304 relevant to usage and users.

Processes 302 comprise:
process 310 of acquiring a plurality of articles from the Information Distribution System;
process 320 of characterizing the plurality of articles; and
process 330 of determining mutual article-content similarity.

Processes 304 comprise:
process 340 of tracking users of the Information Distribution System;
process 350 of selecting a plurality of users of interest;
process 360 of characterizing the plurality of users of interest; and
process 370 of characterizing usage of articles.

A process 380 correlates article succession to content similarity and usage statistics. A process 390 determines preferred article successions and informs respective users.

Figure 4:
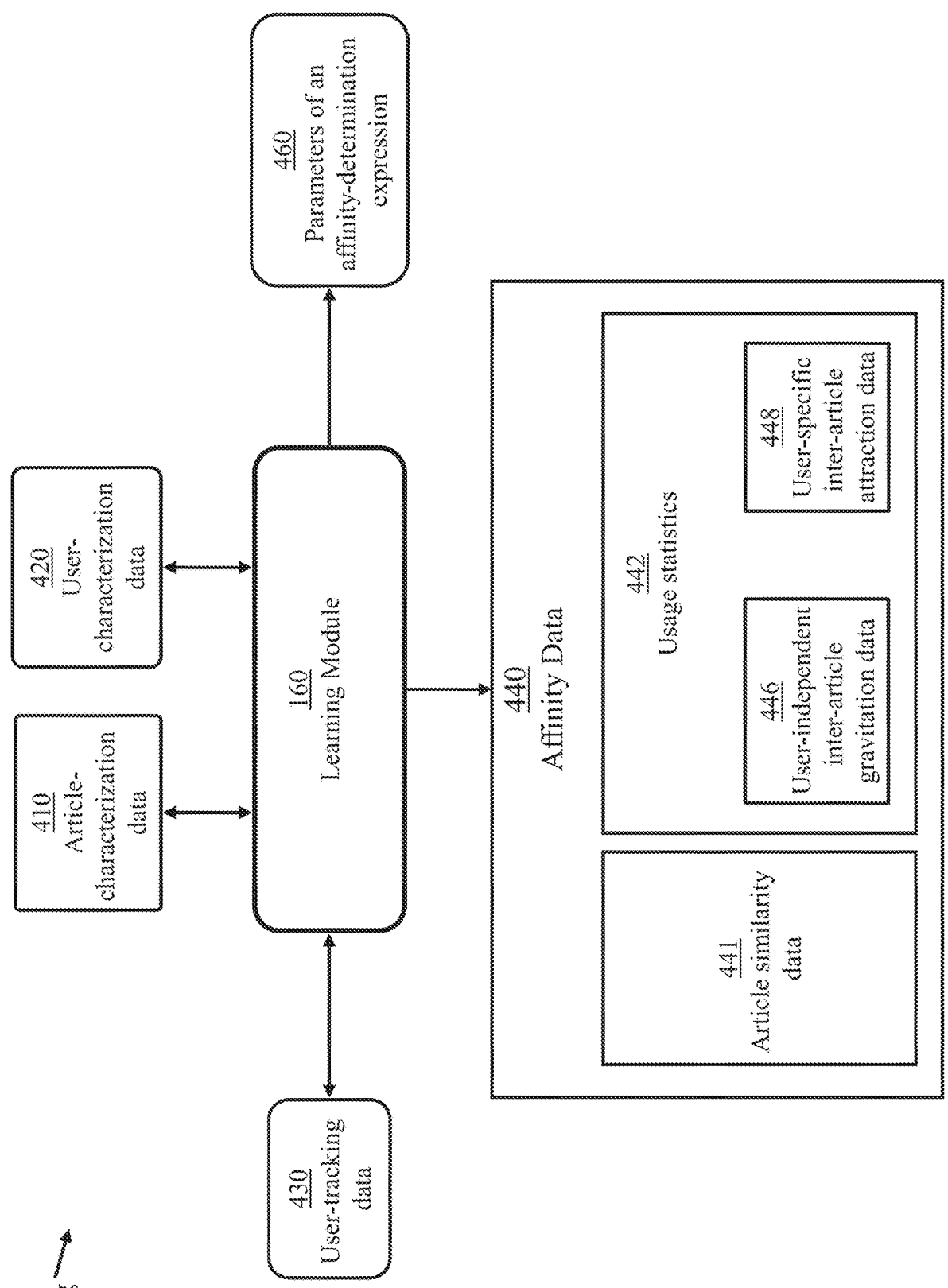
FIG. 4 illustrates a learning system based on the learning module of FIG. 2, in accordance with an embodiment of the present invention.

FIG. 4 illustrates a learning system 400 based on learning module 160. Learning module 160 uses article-characterization data 410, user-characterization data 420, and user-tracking data 430 to generate affinity data 440. The affinity data comprises article content-similarity data 441 and usage statistics 442. The usage statistics comprise user-independent inter-article gravitation data 446 and user-specific inter-article attraction data 448. Learning module 160 also determines parameters 460 of an affinity-determination expression to be described below.

Figure 5:
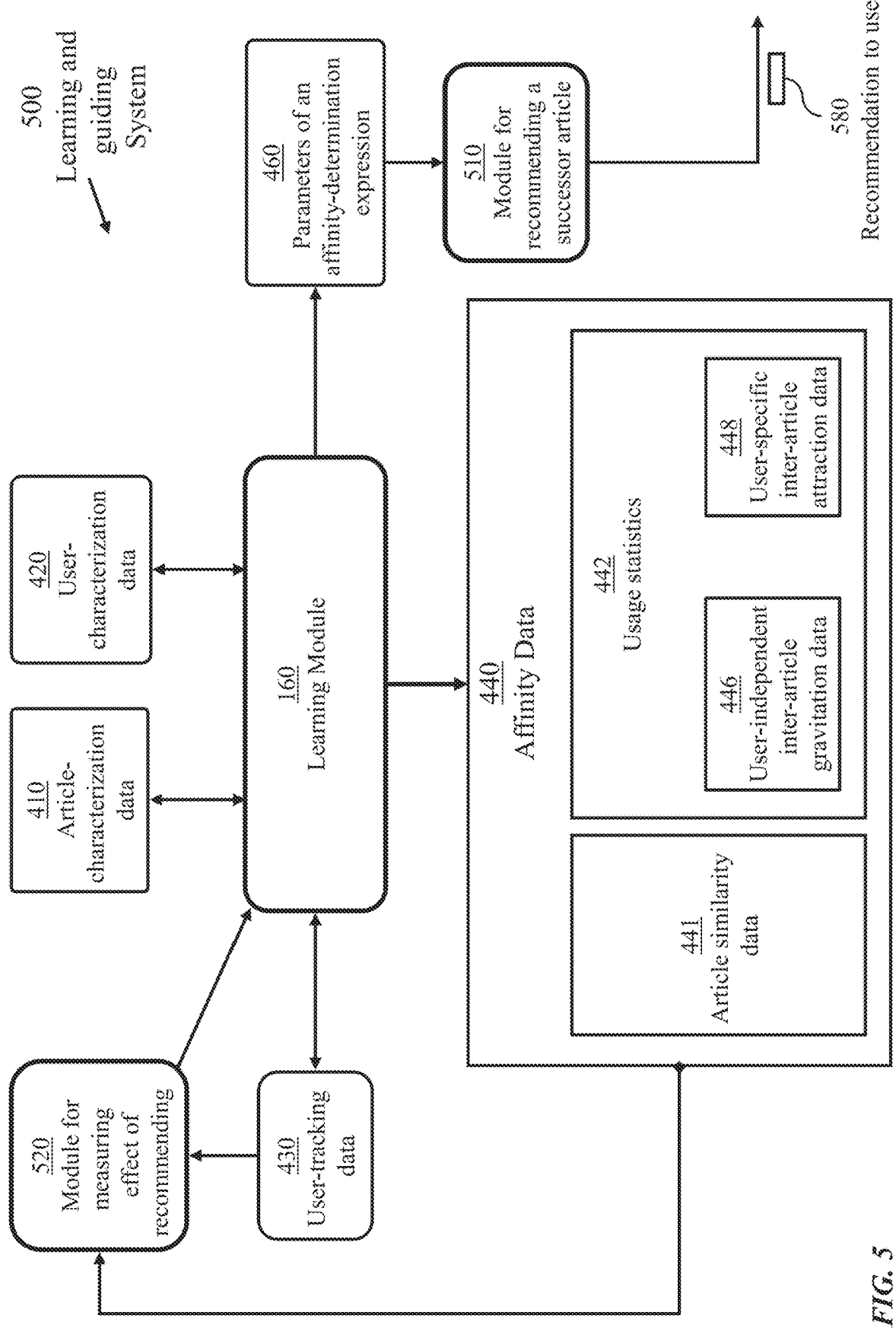
FIG. 5 illustrates a learning-and-guiding system based on the learning-and-guiding module of FIG. 2, in accordance with an embodiment of the present invention.

FIG. 5 illustrates learning and guiding system 500 which comprises:
learning system 400;
a module 510 for determining a preferred article to follow a specific article and sending a recommendation 580 to a user accessing the specific article; and
a module 520 for measuring effect of recommending articles to users.

Figure 6:
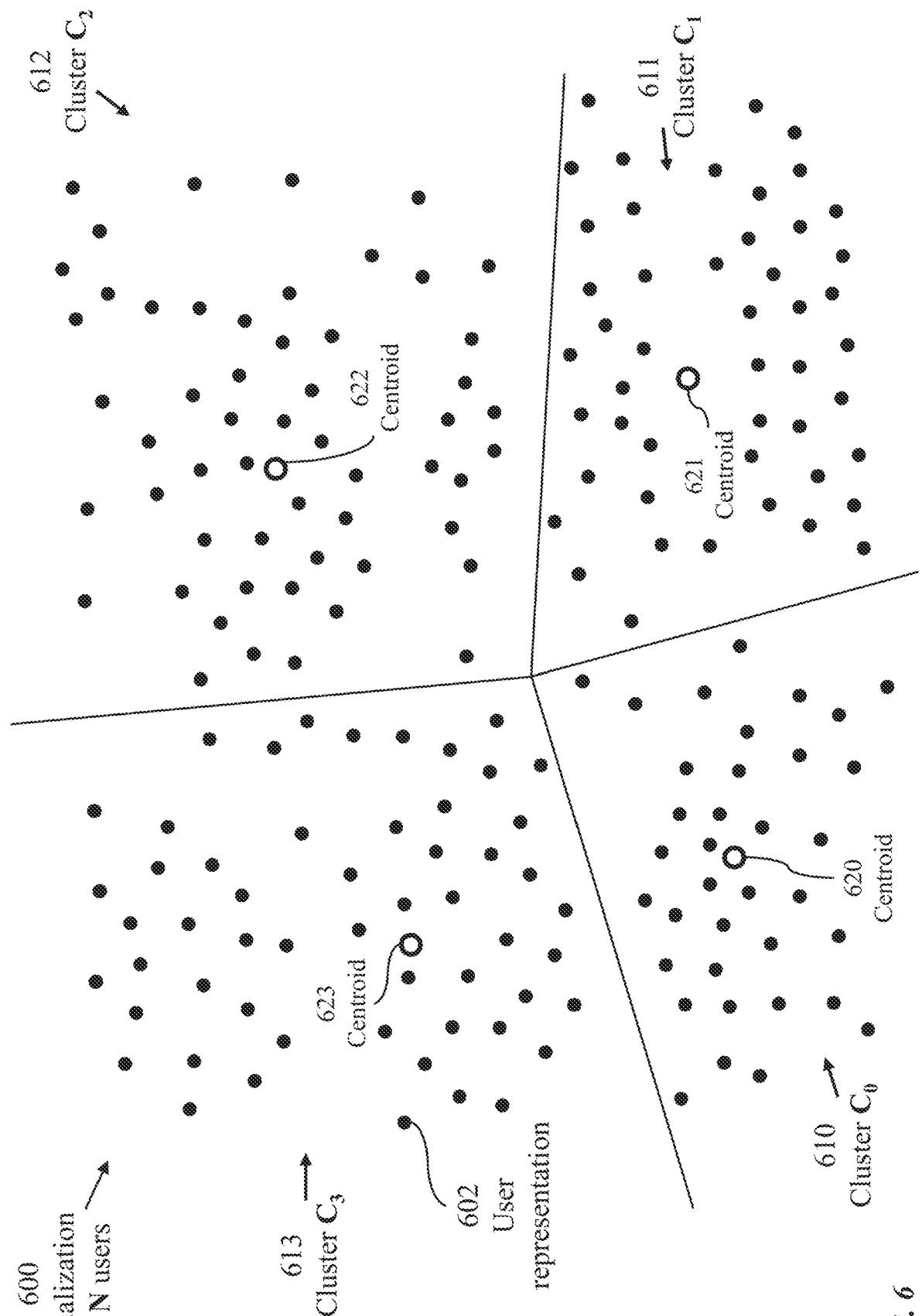
FIG. 6 illustrates visualization of a plurality of users clustered according to some criterion.

FIG. 6 illustrates visualization 600 of a plurality of users 602 clustered according to some criterion. The figure illustrates four clusters labelled $C_0$, $C_1$, $C_2$, and $C_3$, with corresponding reference numerals of 610, 611, 612, and 613. The centroids of the four clusters are referenced as 620, 621, 622, and 623, respectively.

Figure 7:
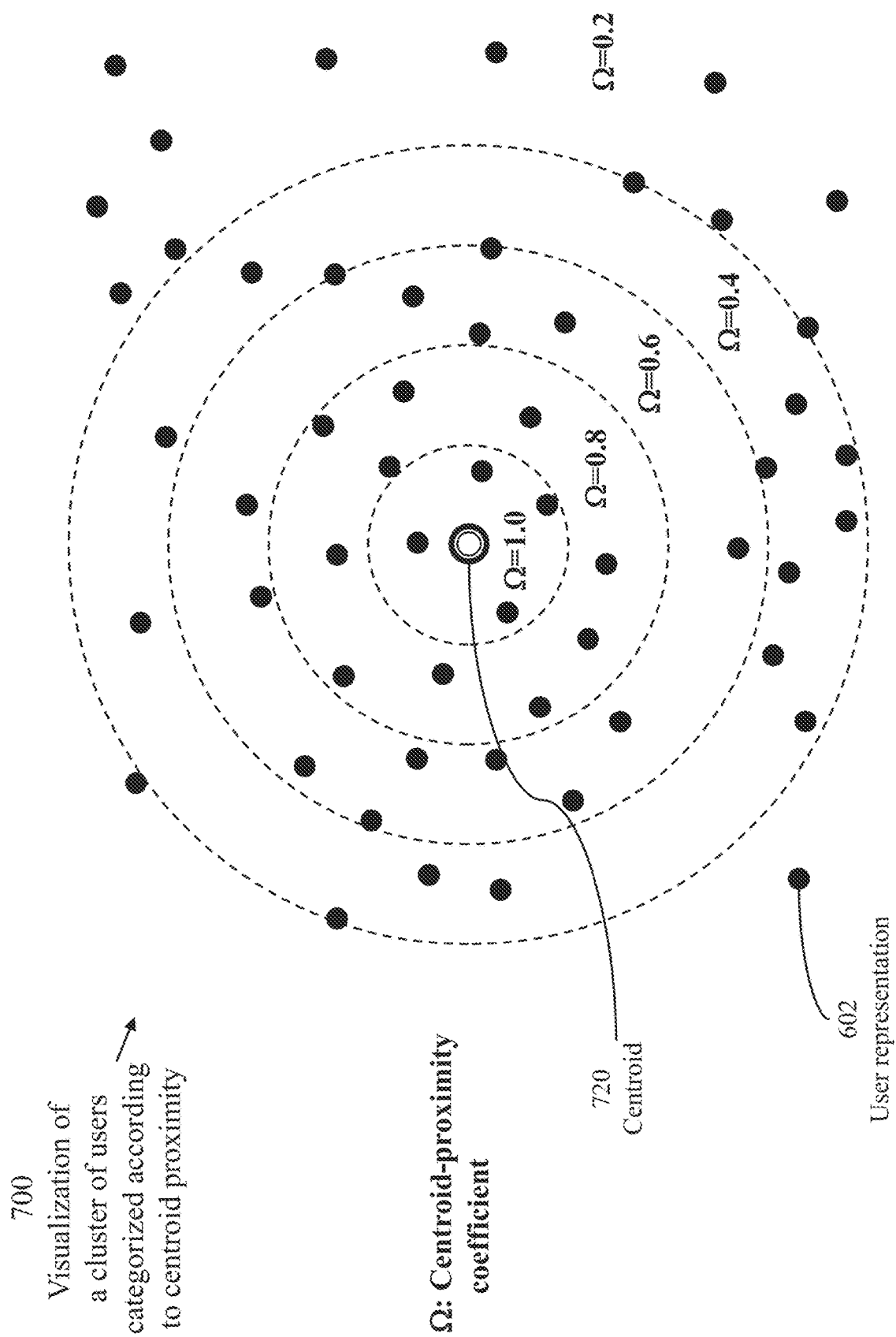
FIG. 7 illustrates dividing users belonging to a specific cluster of users into multiple strata according to proximity to the centroid of the cluster of users, for use in an embodiment of the present invention.

FIG. 7 illustrates visualization 700 of a specific cluster of users 602 and dividing users belonging to the specific cluster into multiple strata according to proximity to the centroid of the specific cluster. The strata are defined according to user proximity to the centroid 720 of the cluster. The users 602 within each stratum are given a same weight, denoted "Ω". The weight Ω for a user within the inner stratum may be given a weight of 1.0 while a user within the outer stratum may be given a weight of 0.2. Thus, when a user selects an article of index y after inspection of an article of index x, the entry of index x of the attraction vector of article y is increased by a value Ω that depends on the stratum to which the user belongs.

Figure 8:
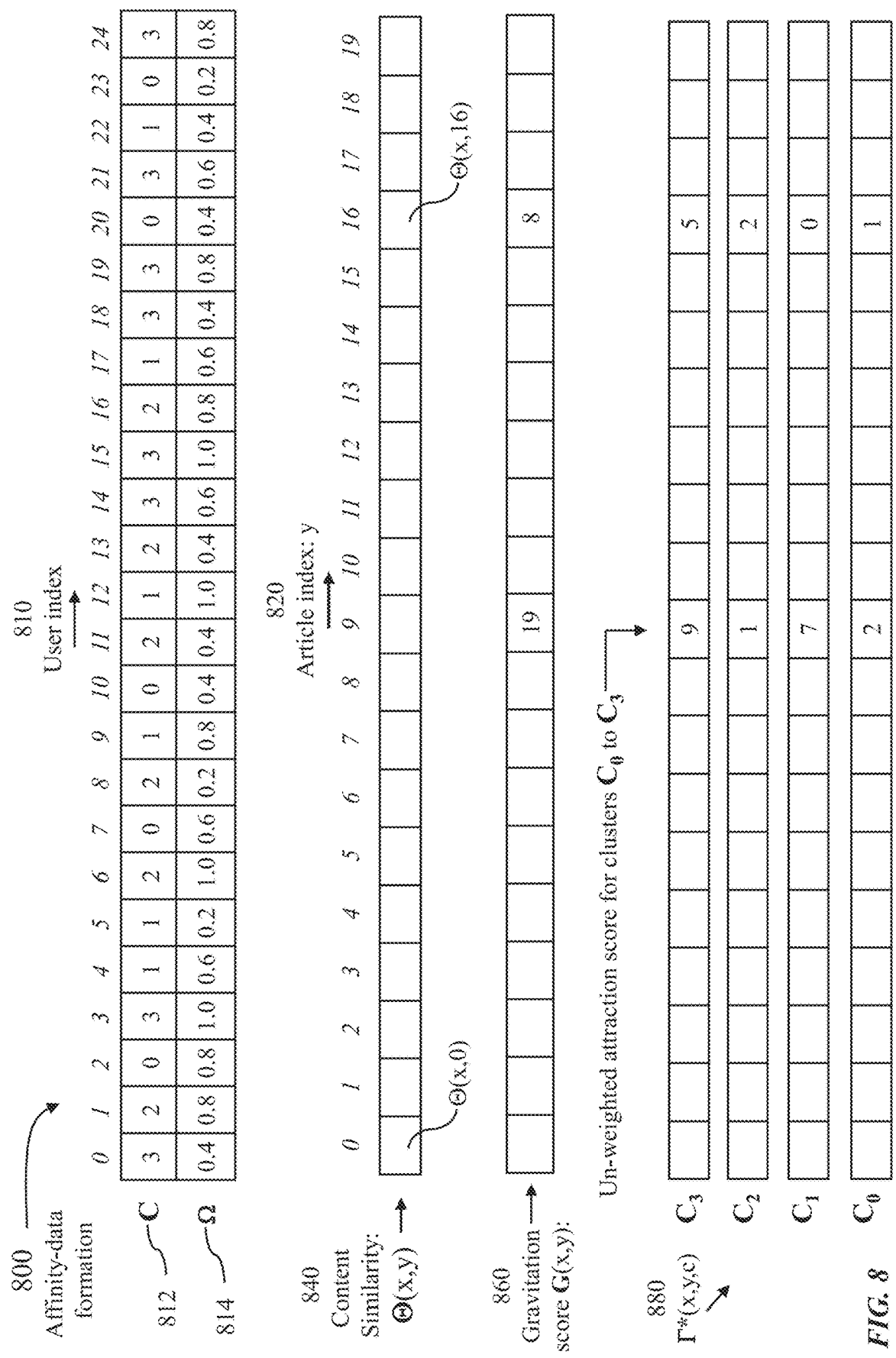
FIG. 8 illustrates a process of affinity-data formation in accordance with an embodiment of the present invention.

FIG. 8 illustrates a process 800 of affinity-data formation. Each user of a plurality of users comprising N users, N>1, is characterized according to cluster membership 812 and centroid-proximity coefficient 814. Each article of a plurality of articles comprising M articles, M>1, is characterized according to content similarities to other articles. In the example of FIG. 8, N=25 with each user identified by a respective index 810 of indices 0 to 24, and M=20, with each article identified by a respective index 820. An array 840 holds a similarity level $\Theta(x, y)$ of content similarity of an article y to a reference article x, $0 \leq x < M$, and $0 \leq y < M$. An array 860 holds a gravitation score of reference article x to each other article y. Four arrays 880 hold attraction scores to reference article x of each other article y. Each array 880 corresponds to one of χ clusters of users, χ>1, denoted $C_0$, $C_1$, ... $C_{(\chi-1)}$; χ=4 in the example of FIG. 8.

The scores in arrays 880 of attraction score are selected to be independent of user's proximity to respective centroids for ease of illustration. The total gravitation score (number of transitions) from the reference article if index x to the article of index 9 is 19 of which two transitions are effected by users of cluster $C_0$, seven transitions are effected by users of cluster $C_1$, one transition is effected by a user of cluster $C_2$, and nine transitions are effected by a user of cluster $C_3$. In a preferred implementation, centroid proximity is considered, hence arrays 880 hold real numbers rather than integers.

Figure 9:
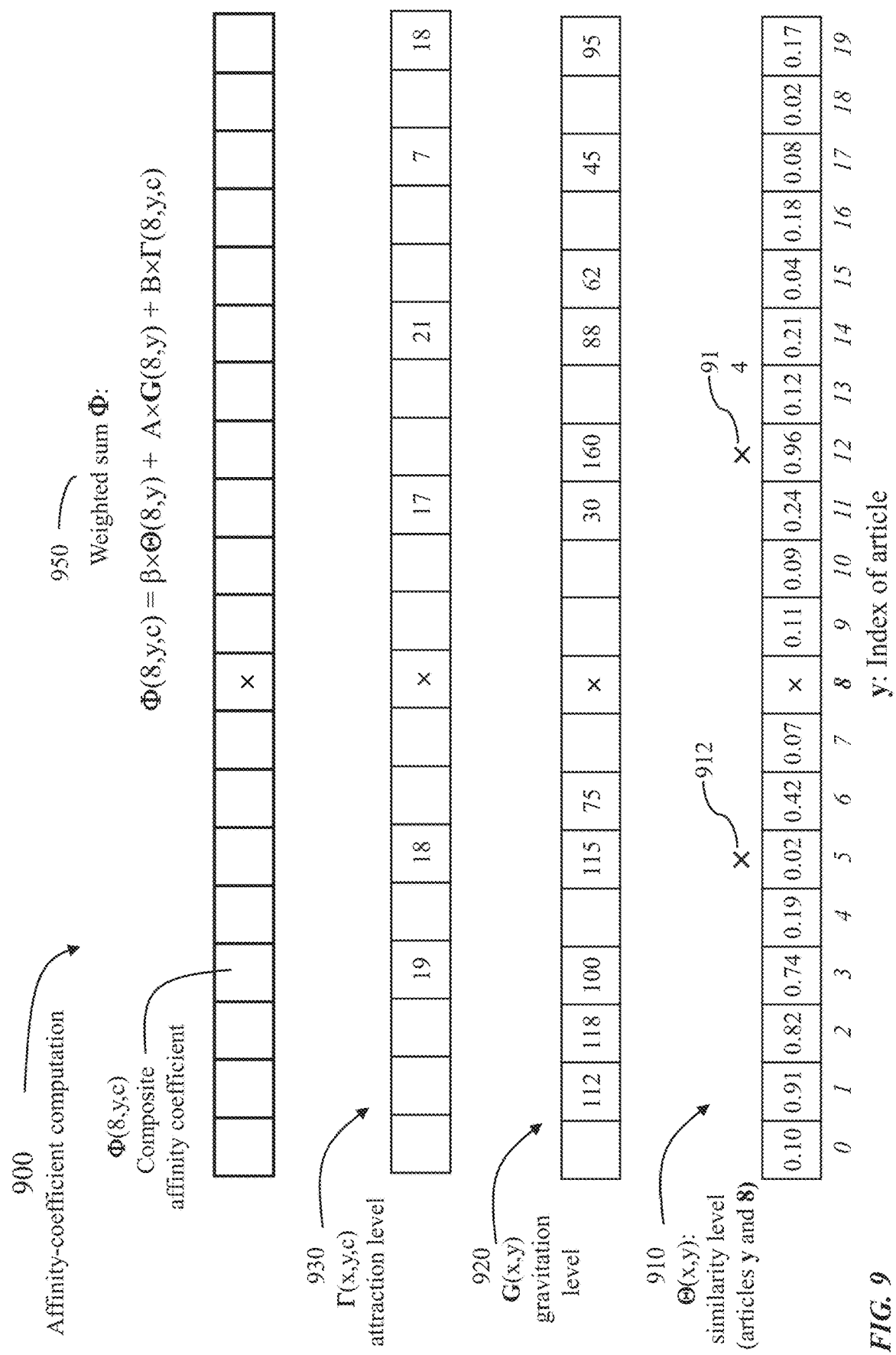
FIG. 9 illustrates determining, for a selected article, a composite affinity level of each other article of a collection of articles, in accordance with an embodiment of the present invention.

FIG. 9 illustrates a process 900 of determining a composite affinity level $\Phi(x, y, c)$ of a reference article x to each other article y, for each user cluster c, $0 \leq x < M$, $0 \leq y < M$, and $0 \leq c < \chi$.

The figure illustrates:
an array 910 of article-content similarity levels $\Theta(x,y)$ with respect to reference article x (χ=8);
an array 920 of gravitation scores, each denoted $G(x,y)$, of a specific article x to each other article y, for x=8, $0 \leq y < M$, y≠x, M=20;
an array 930, of attraction scores, each denoted $F(x,y,c)$, of a specific article (of index 8) to each other article y, for users of a specific proximity to the centroid of a cluster of users; x=8, $0 \leq y < M$, y≠x, M=20);
an array 940, denoted $\Phi(x,y,c)$, of composite affinity levels of article x to each other article y; x=8, $0 \leq y < M$, y≠x, M=20); and
an exemplary composite affinity expression 950.

An article content-similarity level is a normalized variable with $0.0 < \Theta(x,y) \leq 1.0$. However, the gravitation score $G(x,y)$ rather than the normalized gravitation level $g(x,y)$, where $0.0 \leq g(x,y) \leq 1.0$, is used because the gravitation score is updated frequently since each article transition cause an update. Thus, it is more computationally efficient to use the gravitation score a respective coefficient in the expression Φ(x,y,c). Likewise, the attraction score F(x,y,c) rather than the normalized attraction level $\mathcal{Y}$(x,y,c) is used in the expression Φ(x,y,c).

The process 900 determines, for a selected reference article x, a composite affinity level to each other article of the M articles indexed as articles 0 to (M−1). Each entry of an array 910 indicates an article-content similarity level for an article of index y with respect to an article of index x; x=8 in the example of FIG. 9. The article similarity level is denoted Θ(x,y). Any entry 912 in array 910 of a value below a predefined lower bound (0.05, for example) may be excluded as being indicative of an article y that is too dissimilar to article x and, hence, would likely be of no interest to a user who inspected article x. Any entry 914 in array 910 of a value exceeding a predefined upper bound may be excluded as being indicative of an article y that is too similar to article x and, hence, would not provide significant new information to a user who inspected article x.

Each entry of an array 920 indicates a gravitation score G(x,y) for an article of index y with respect to an article of index x. The gravitation level G(x,y,c) of the article of index x to the article of index y is not necessarily equal to the reciprocal gravitation level G(y,x,c).

Each entry of an array 930 indicates attraction score of an article of index x to an article of index y. The attraction scores are determined taking into consideration proximity of users to the centroid of a respective cluster; hence the attraction scores are generally real numbers. The attraction score Γ(x,y,c) of the article of index x to the article of index y is not necessarily equal to the attraction score Γ(y,x,c) of article y to article x even within the same cluster c, 0≤c<χ.

Each entry of an array 940 indicates a composite affinity level of an article of index x to an article of index y. The composite affinity level is denoted Φ(x,y,c) and may be determined according to expression 950 as: Φ(x,y,c)=Φ(x,y)+A×G(x,y)+B×Γ(x,y,c), where parameters A and B may be judicially selected or preferably determined from historical data.

The composite affinity level Φ(x,y,c) of the article of index x to the article of index y is not necessarily equal to composite affinity level Φ(y,x,c) of the article of index y to the article of index x.

Figure 10:
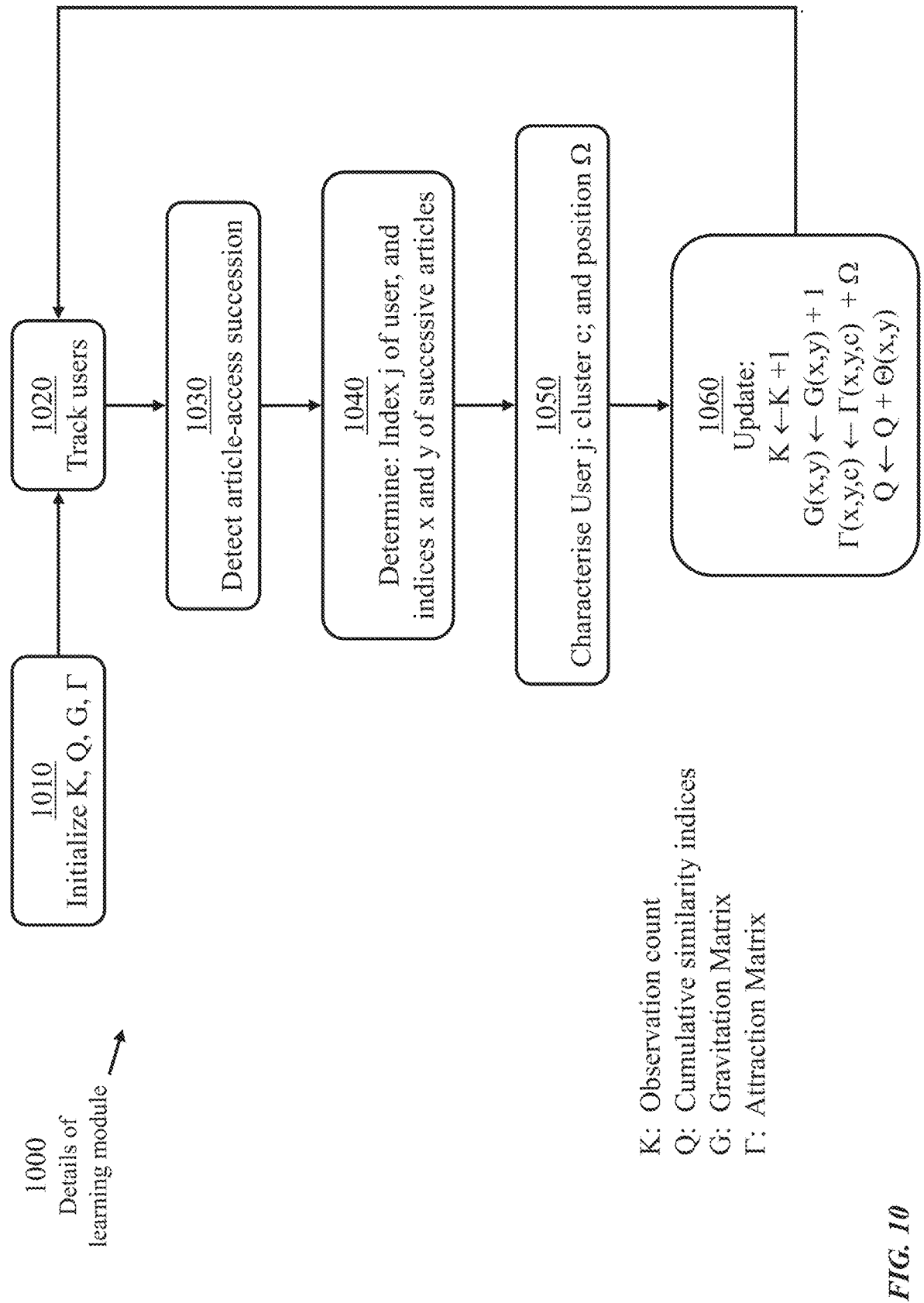
FIG. 10 illustrates processes of a learning module in accordance with an embodiment of the present invention.

FIG. 10 illustrates processes 1000 performed by learning module 160. A gravitation matrix G(x,y), 0≤x<M, 0≤y<M and χ attraction matrices Γ(x,y,c),), 0≤x<M, 0≤y<M, 0≤c<χ, are initialized in process 1010 to contain zero entries. An integer K denotes a count of article transitions and a real number Q denotes cumulative similarity indices so that Q/K is a moving mean value of similarity indices. Process 1020 tracks users to detect users' initial article access and subsequent article selections, if any. Process 1030 detects article-access succession. Process 1040 determines index j of a user accessing a current article, index x of the current article, and index y of a detected successive article; 0≤j<N, 0≤x<M, 0≤y<M. Process 1050 identifies a cluster c to which user j belongs and level Ω of user proximity to the centroid of cluster c, 0≤c<x. Process 1060 updates the gravitation matrix and attraction matrices. After each transition from an article of index x to an article of index y, the integer K is increased by 1, the cumulative content-similarity level is increased by Θ(x,y), the entry (x,y) of the gravitation score G(x,y) is increased by 1 and the entry (x,y,c) of the attraction score corresponding to a user's cluster c is increased by a respective centroid proximity Ω.

Figure 11:
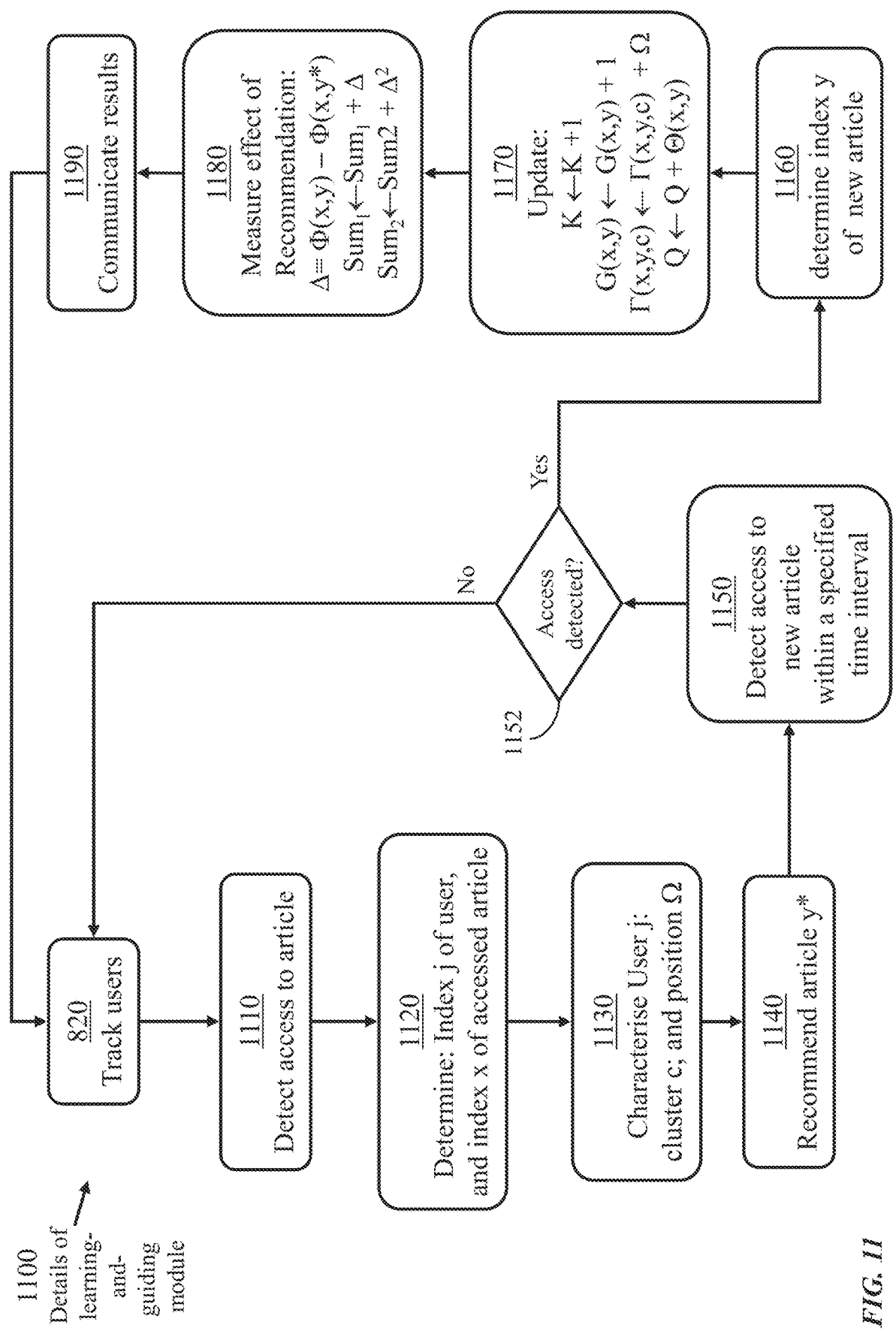
FIG. 11 illustrates processes 1100 of a learning-and-guiding module, in accordance with an embodiment of the present invention.

FIG. 11 illustrates processes 1100 of Learning-and-guiding module 180. As in the learning system 1000, a gravitation score matrix and χ attraction score matrices are initialized to contain zero entries and process 1020 tracks users to detect users' initial article access and subsequent article selections, if any.

Process 1110 detects access to an article. Process 1120 determines index x of the accessed article and index j of the user accessing the article. Process 1130 identifies the cluster c to which the user belongs and corresponding centroid-proximity coefficient Ω. Process 1140 determines a preferred successor article and recommends the preferred successor to the user. Process 1150 detects user's access to a subsequent article within a specified interval of time. Process 1152 determines whether the user selected a subsequent article. Process 1160 determines the index of the subsequent article, if any. Process 1170 updates the gravitation score matrix and attraction score matrices according to the subsequent article, if any. Process 1180 measures the effect of recommendations. The discrepancy Δ between the composite affinity level Φ(x,y,c) of article x to article y actually selected by the user accessing article x and the affinity level Φ(x,y*,c) corresponding to the recommended article y* may serve as an indicator of the accuracy of modelling users' behaviour. The first two moments of the discrepancy Δ may be determined for further processing (the first moment being $Sum_1/K$ and the second moment being $Sum_2/K$). Of course, the most informative indicator of effectiveness of subsequent-article selection is a proportion of transitions that obeyed respective recommendations. Counting complying transitions may be performed within process 1180 (not illustrated in FIG. 11).

Process 1190 communicates measurements to other processes for potential adjustment of the affinity expression 950.

Figure 12:
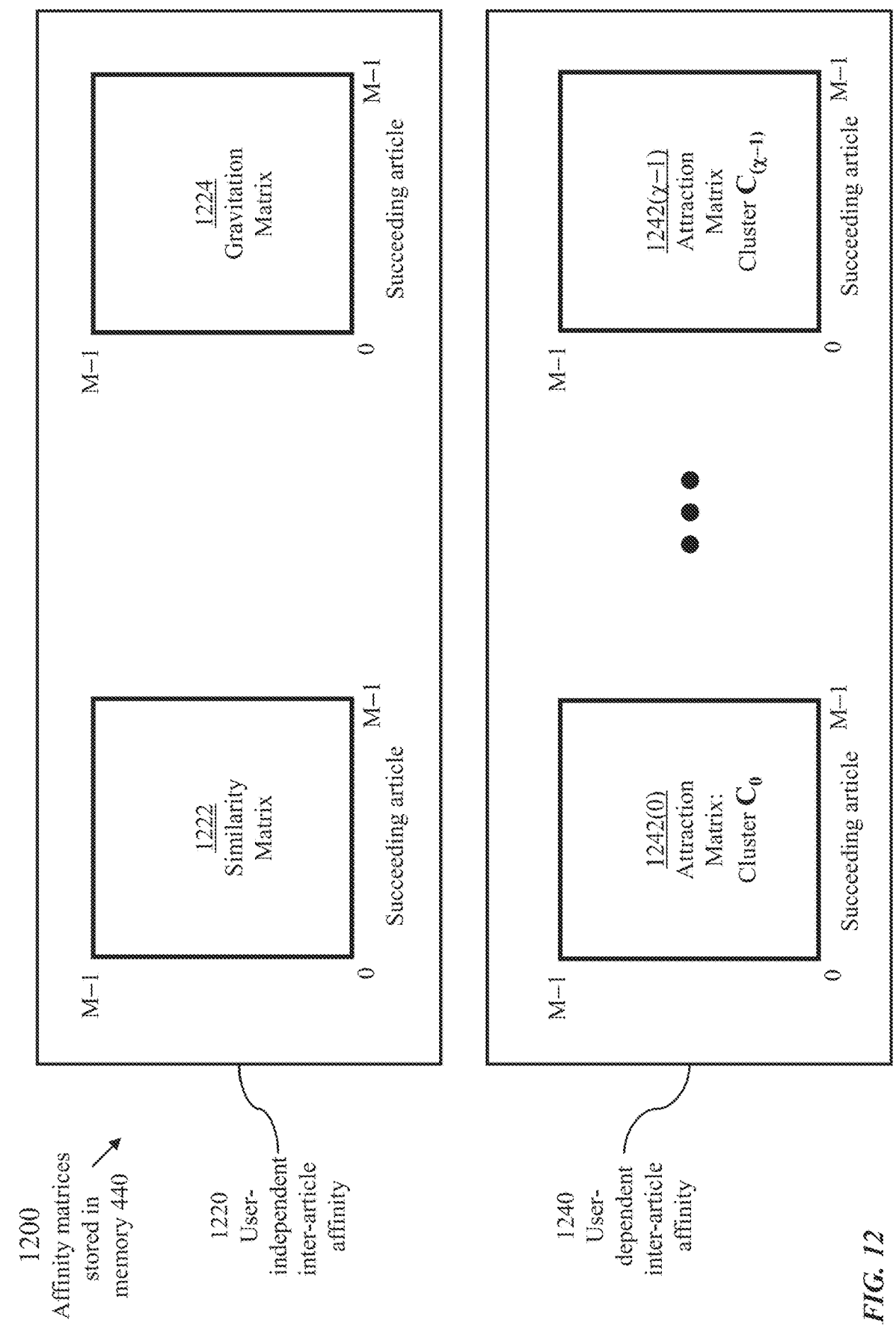
FIG. 12 illustrates affinity matrices generated by the learning module, or the learning-and-guiding module, in accordance with an embodiment of the present invention.

FIG. 12 illustrates affinity matrices 1200 generated at the learning module or the learning-and-guiding module. The affinity matrices 1200 comprise user-independent matrices 1220 and user-cluster-specific matrices 1240. The user-independent affinity matrices 1200 comprise a content-similarity matrix 1222 and a gravitation-score matrix 1224. The user-cluster-specific matrices 1240 comprise χ, χ>1, attraction-score matrices 1242 each of which corresponding to a respective cluster of users and further identified as 1242(c), 0≤c<χ. The gravitation score matrix 1224 holds a score of transitions from each article to each other article regardless of the identity of the user making a transition. Thus, both matrices 1222 and 1224 may be considered user independent despite the fact that the latter is generated by users' actions.

Figure 13:
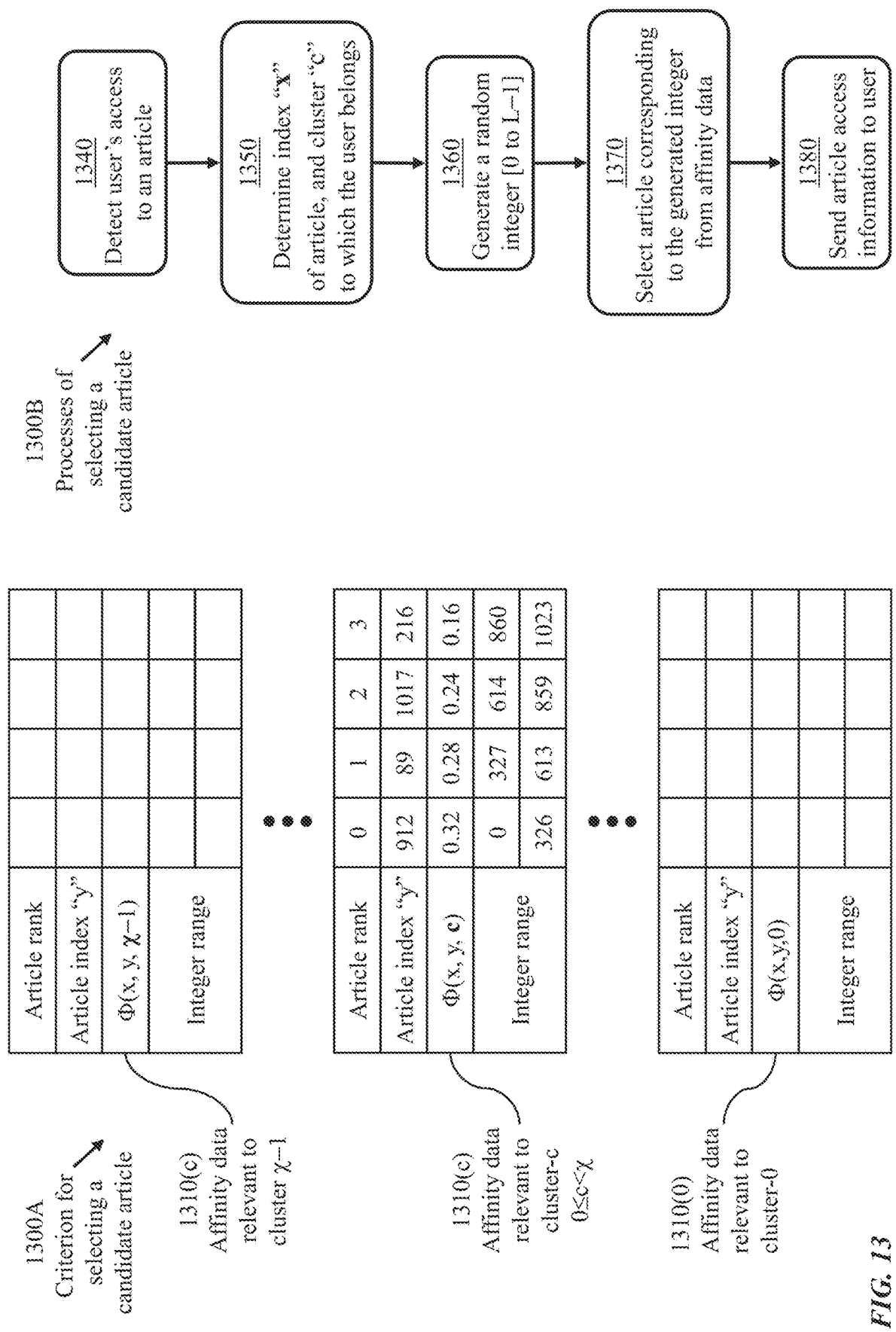
FIG. 13 illustrates a method of selecting a candidate article based on cluster-specific affinity data, in accordance with an embodiment of the present invention.

FIG. 13 illustrates a criterion 1300A for selecting a candidate article to follow a reference article x, 0≤x<M. Each of χ cluster, indexed as 0 to (χ−1), χ>1, is associated with respective affinity data 1410. Affinity data 1410(c) for a cluster c is illustrated.

Four candidate articles of indices 912, 89, 1017, and 216 with composite normalized affinity levels of 0.32, 0.28, 0.24, and 0.16, respectively, are considered. Based on the affinity levels of the reference article to the candidate articles, articles 912, 89, 1017, and 216 are ranked as 0, 1, 2, and 3. Article 912 of the highest affinity level may be the most favourite article to succeed the reference article. However, it is conjectured that randomly considering each candidate article would increase the likelihood that a user accesses a recommended article. Preferably, the candidate articles would be selected in proportion to respective affinity levels. To select candidate articles according to affinity levels, each candidate article may be associate with a respective proportionate integer band between integers 0 and (L−1), L>>1, and a candidate article is selected according to a generated random integer between 0 and (L−1) in a manner well known in the art. The integer bands are non-overlapping. For example, with the normalized affinity levels of 0.32, 0.28, 0.24, and 0.16, and selecting the integer L to equal 1024, the candidate articles would be associated with integer bands {0-326}, {327-613}, {614-849}, and {860-1023}. A generated random integer of 500 selects article 89, a generated random integer of 900 selects article 216, etc.

FIG. 13 also illustrates processes 1300B for selecting a candidate article to succeed a current article. Process 1340 detects a user's access to an article. Process 1350 determines the index "x" of the article and the cluster "c" to which the user belongs. A weighted random selection of a candidate article is performed in processes 1360 and 1370. Process 1360 generates a random integer in the range 0 and (L−1). Process 1370 selects a candidate article corresponding to the generated integer. Process 1380 communicates particulars of the selected article, such as an access link, to a user.

Figure 14:
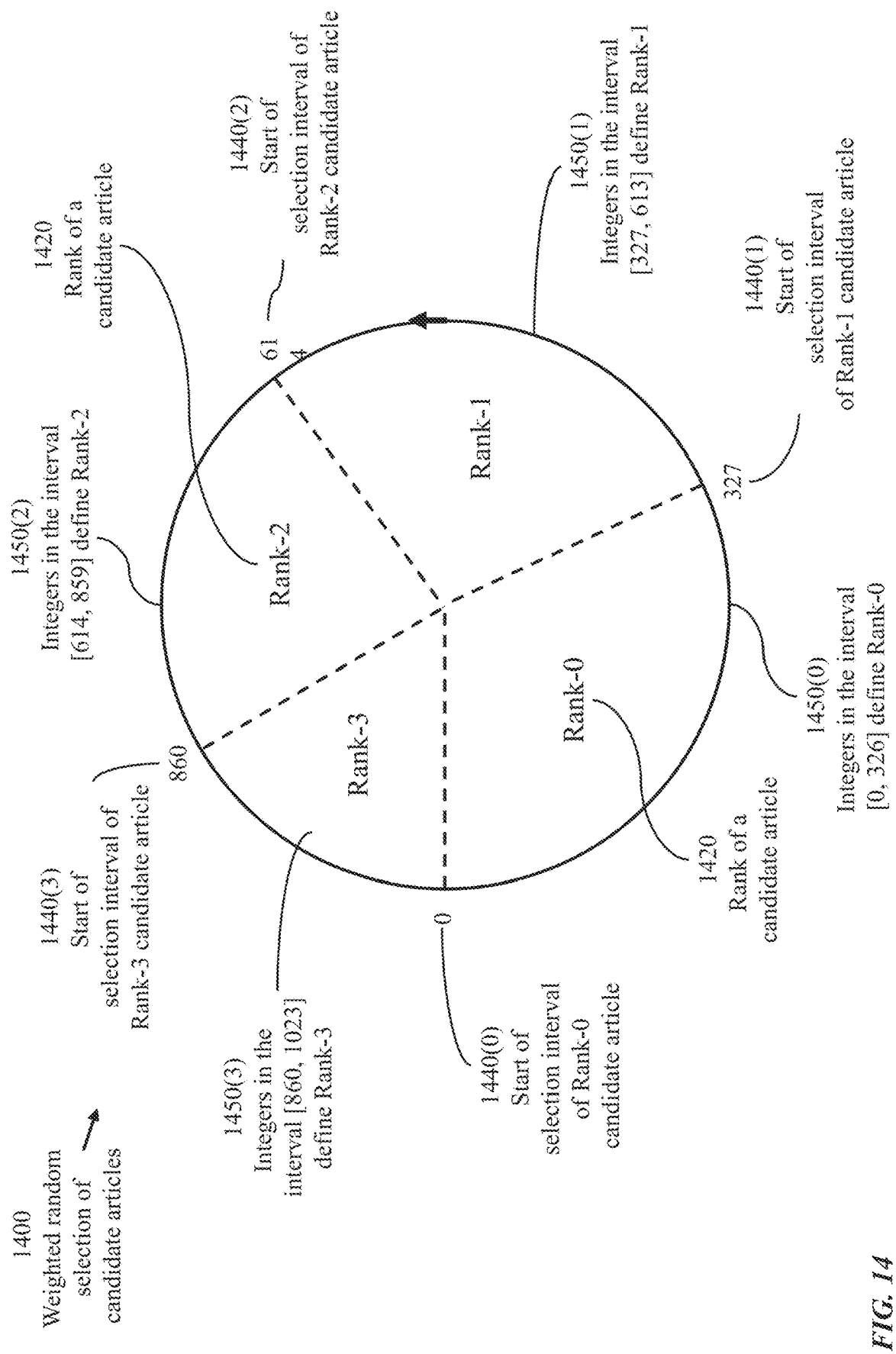
FIG. 14 illustrates a criterion for selecting a candidate article, in accordance with an embodiment of the present invention.

FIG. 14 provides a visualization of a weighted random selection 1400 of a candidate article performed in processes 1360 and 1370. The four candidate articles indicated in affinity data 1310(c) are allocated respective integer bands within the inclusive range [0-1023] proportionate to their affinity levels with respect to the reference article. FIG. 14 illustrates the rank 1420 of each of the four candidate articles and the first integer 1440 of an integer band 1450. A random integer between 0 and 1023, inclusive, is generated upon detection of access to an article and is used to point to one of the four candidate articles.

Several other methods of implementing weighted random selection may be devised. For example, an array may be populated with randomly sequenced candidate articles, with each candidate article occupying a number of scattered entries proportionate to a corresponding affinity level. The entries of the array may then be read sequentially to determine a recommended article.

Figure 15:
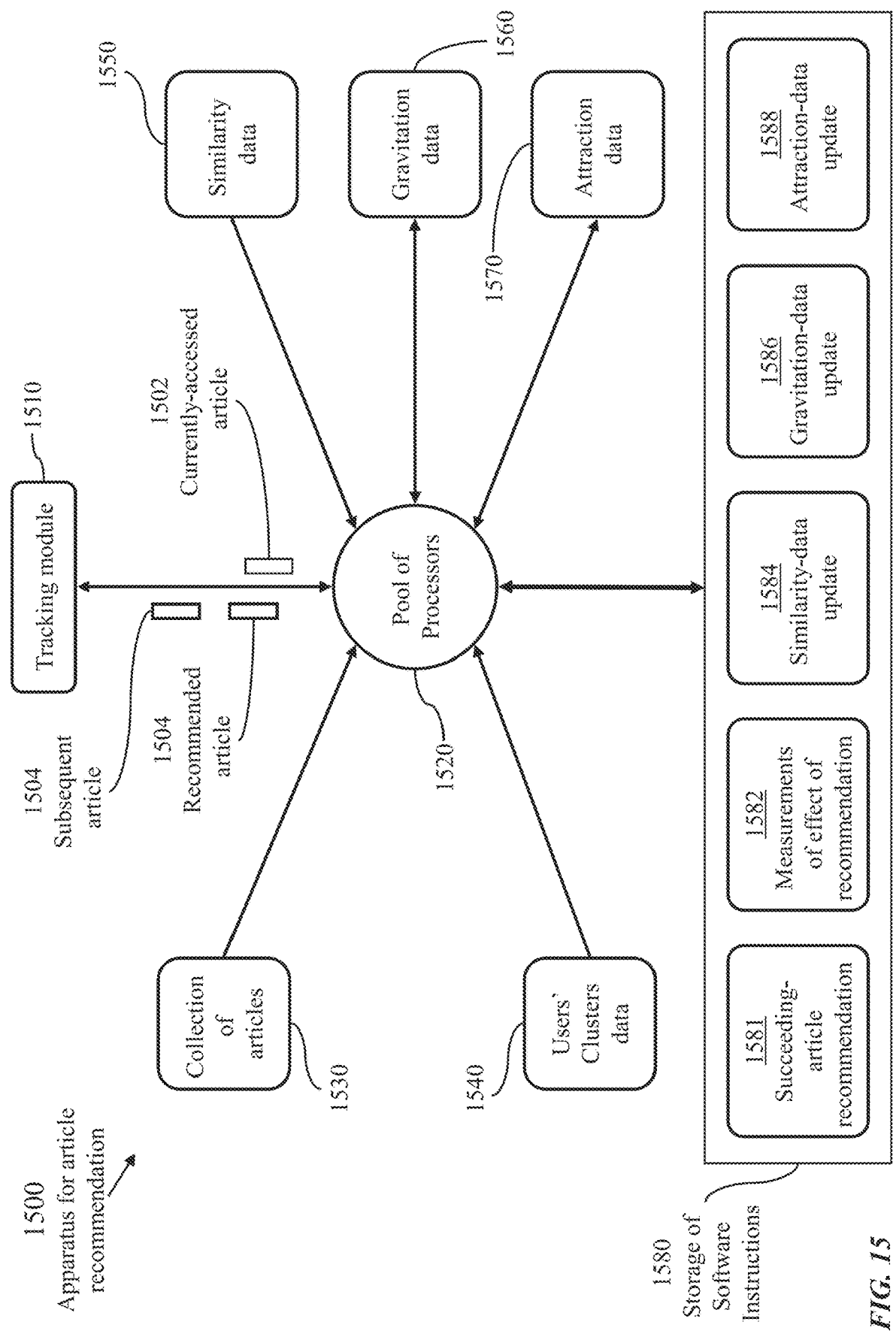
FIG. 15 illustrates an apparatus for article recommendation, in accordance with an embodiment of the present invention.

FIG. 15 illustrates an apparatus 1500 for tracking users, identifying a user's access to an article 1502, and recommending to the user a subsequent article 1504 to consider following a user's inspection of the current article 1502. The apparatus comprises a tracking module 1510 coupled to a network interface (the network interface is not illustrated) for receiving users' data, communicating recommendations to users, and receiving updated information relevant to articles of interest and users' characterization. The apparatus employs a pool of processors 1520, memory devices storing basic data relevant to articles and users, memory devices storing data-analysis results, and memory devices storing software instructions.

A memory device 1530 stores the plurality of articles 120 (FIG. 1) and corresponding word vectors. A memory device 1540 stores users' clusters data (FIG. 6 and FIG. 7) which may be generated externally or generated within apparatus 1500 using acquired user characterization data and specific software modules (not illustrated in FIG. 15). Memory device 1550 stores article similarity levels which may be determined externally and updated as users access new articles not currently present in the plurality of articles. The similarity data may be generated externally or within apparatus 1500 based on acquired article characteristics. Memory device 1560 stores a gravitation vector for each article based on identifiers 1506 of articles selected by any user following each current article. Memory device 1570 stores an attraction vector for each article for each user cluster based on identifiers 1506 of articles selected following each current article. The processes of generating gravitation vectors and attraction vectors are interwoven.

Memory devices 1580 store software modules. A memory device 1581 stores software module 510 (FIG. 5) containing instructions for determining an appropriate article to follow a current article. A memory device 1582 stores software module 520 (FIG. 5) containing instructions for determining measurements of effect of recommendation (process 1180, FIG. 11). A memory device 1584 stores a software module containing instructions for determining similarity of an article to each other article of the plurality of articles. The software module causes processor 1520 to compute similarity data of each new article to each existing article. A memory device 1586 stores a software module containing instructions for determining, for each article of the collection of articles, gravitation data to each other article based on users' selections regardless of the users' characteristics. A memory device 1588 stores a software module containing instructions for determining, for each article of the collection of articles, attraction data of each other article, which is specific to a user-cluster.

Figure 16:
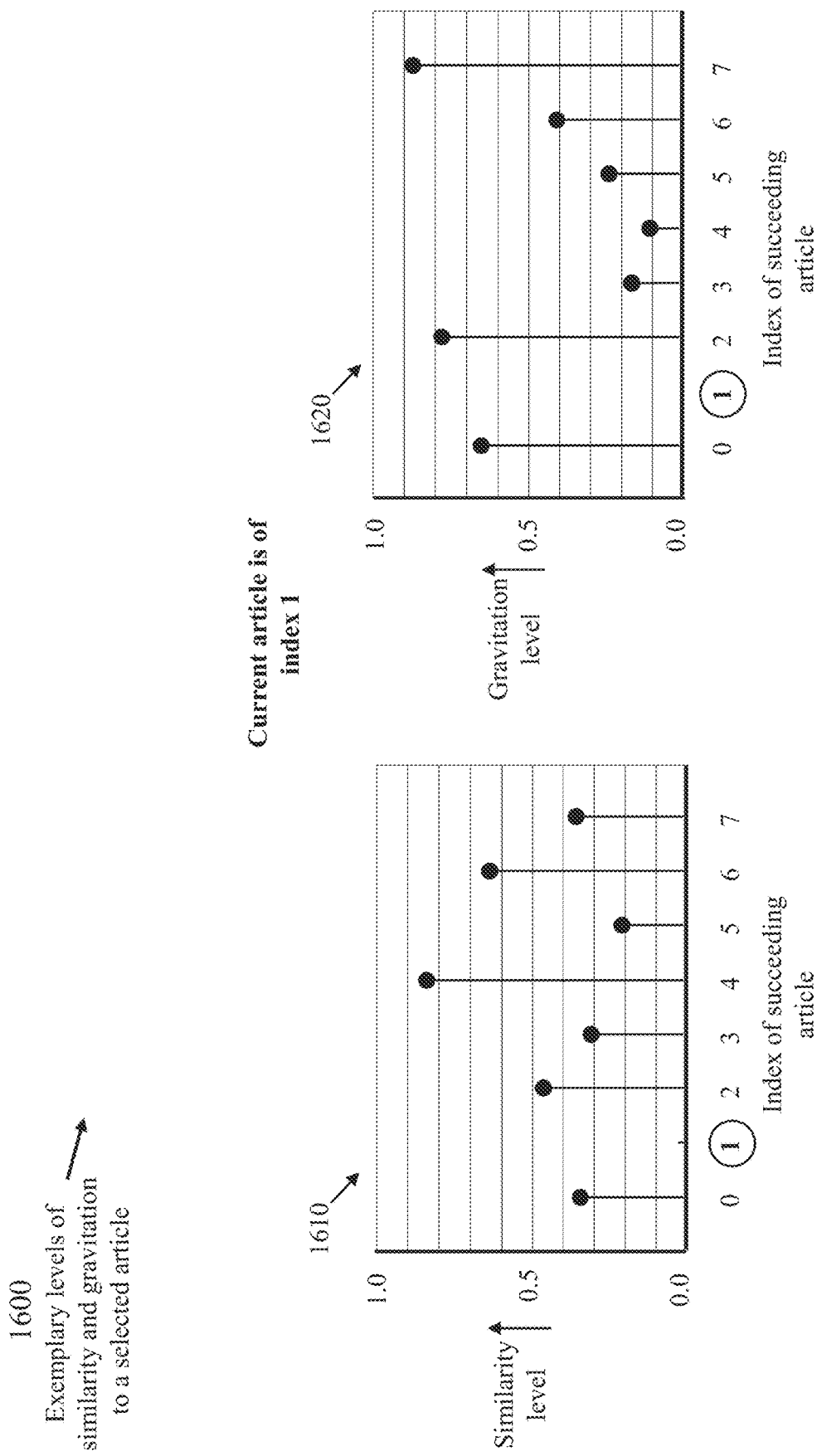
FIG. 16 illustrates, for a selected article, exemplary levels of content similarity and gravitation to each other article of a collection of articles.

FIG. 16 illustrates, for a selected article, exemplary levels of content similarity and gravitation to each other article of a collection of eight articles indexed as articles 0 to 7. An affinity level may be based on different definitions, such as content-similarity and users' preference. Selecting article-1 as a reference article, normalized similarity levels of the remaining articles to article-1 are as indicated in set 1610. The normalized gravitation levels of the remaining seven articles based on user selection following article-1 are as indicated in set 1620. According to set 1610 of similarity levels, article-4 has the highest affinity to article-1 with a normalized similarity level of 0.85. According to set 1620 of gravitation levels, article-7 has the highest affinity to article-1 with a normalized gravitation level of 0.88. Generally, the affinity levels of articles according to content similarity and users' preference are not necessarily correlated. Thus, a blended affinity measure need be used to take into consideration different affinity aspects.

Figure 17:
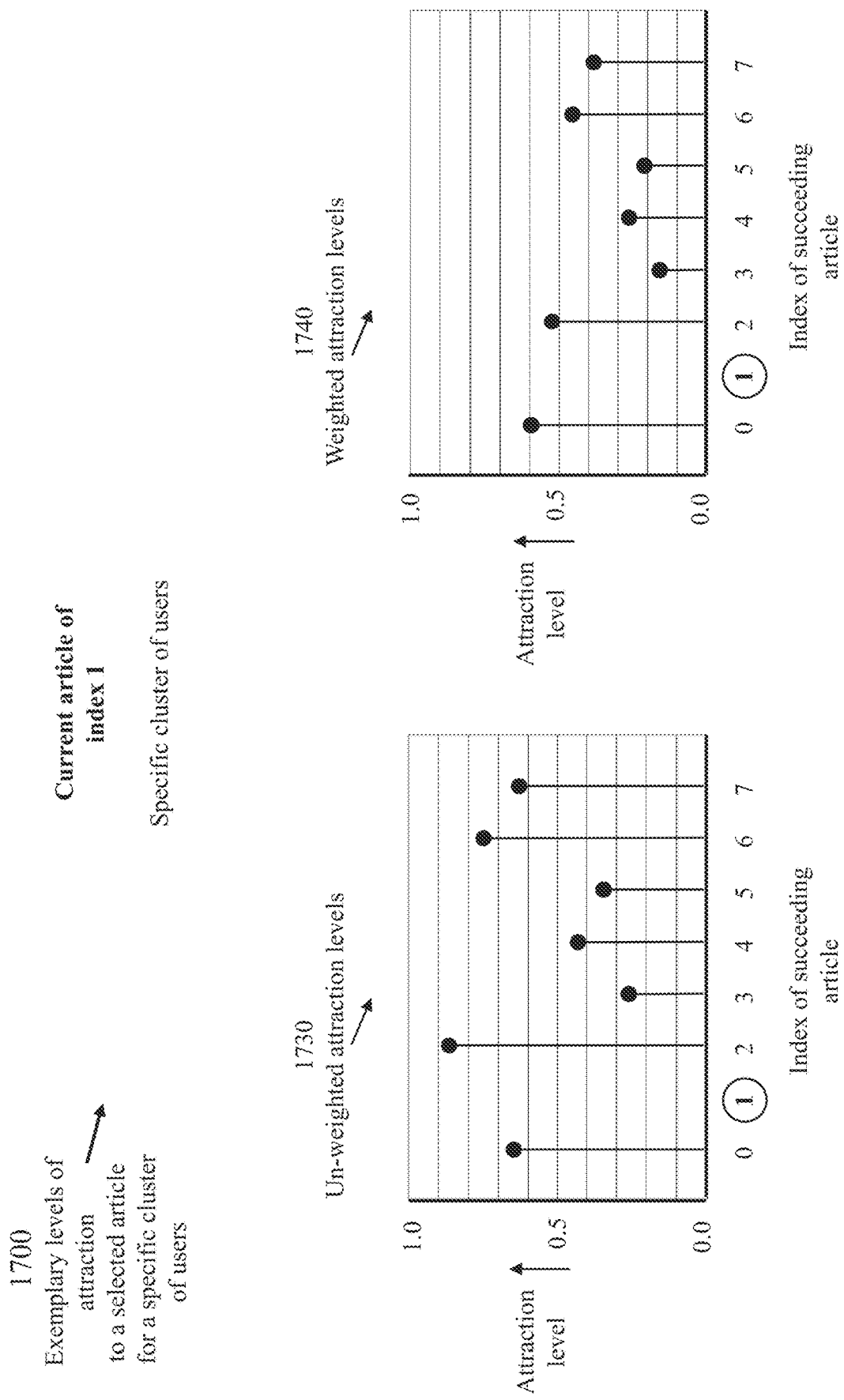
FIG. 17 illustrates, for a selected article and a specific cluster of users, exemplary levels of attraction to each other article of a collection of articles, in accordance with an embodiment of the present invention.

FIG. 17 illustrates, for a selected article and a specific cluster of users, exemplary levels of attraction to each other article of a collection of articles. According to set 1730 of attraction levels, article-2 has the highest affinity to article-1 with a normalized cluster-specific attraction level of 0.87. Set 1730 of attraction levels is determined based on assigning a same weight (of 1.0 for example) to each user belonging to a specific cluster selecting an article following inspection of article-1. Set 1740 of attraction levels is determined based on assigning different weights to users of the specific cluster where a user close to the centroid of the cluster is given a higher weight in comparison with a distant user, as illustrated in FIG. 7. For example, a user within a first proximity stratum may be given a weight of 1.0; a user within a second proximity stratum may be given a weight of 0.8, and so on. According to set 1740 of attraction levels, article-0 has the highest affinity to article-1 with a normalized cluster-specific attraction level of 0.6.

Figure 18:
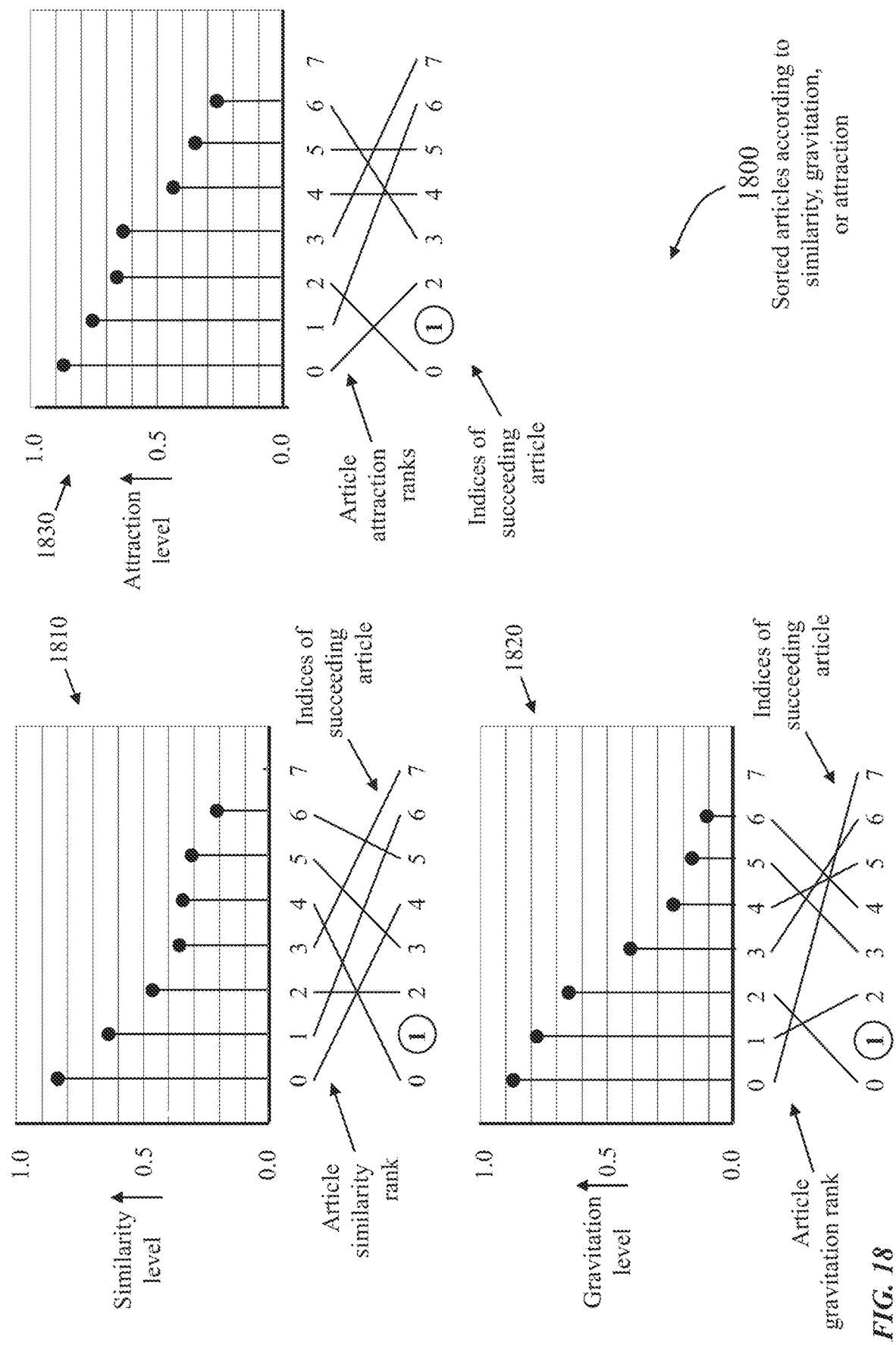
FIG. 18 illustrates sorting articles according to levels of content similarity, gravitation, and attraction with respect to a selected article, in accordance with an embodiment of the present invention.

FIG. 18 illustrates sorting articles according to levels of content similarity, gravitation, and attraction with respect to a selected article. The similarity levels of set 1610 (FIG. 16) are sorted in descending order of similarity levels to yield set 1810. Likewise, the gravitation levels of set 1620 (FIG. 16) are sorted in descending order to yield set 1820 and the attraction levels of set 1730 (FIG. 17) are sorted in descending order to yield set 1830. With respect to reference article-1, article-4 has the highest similarity level, article 7 has the highest gravitation level, and article-2 has the highest attraction level.

Figure 19:
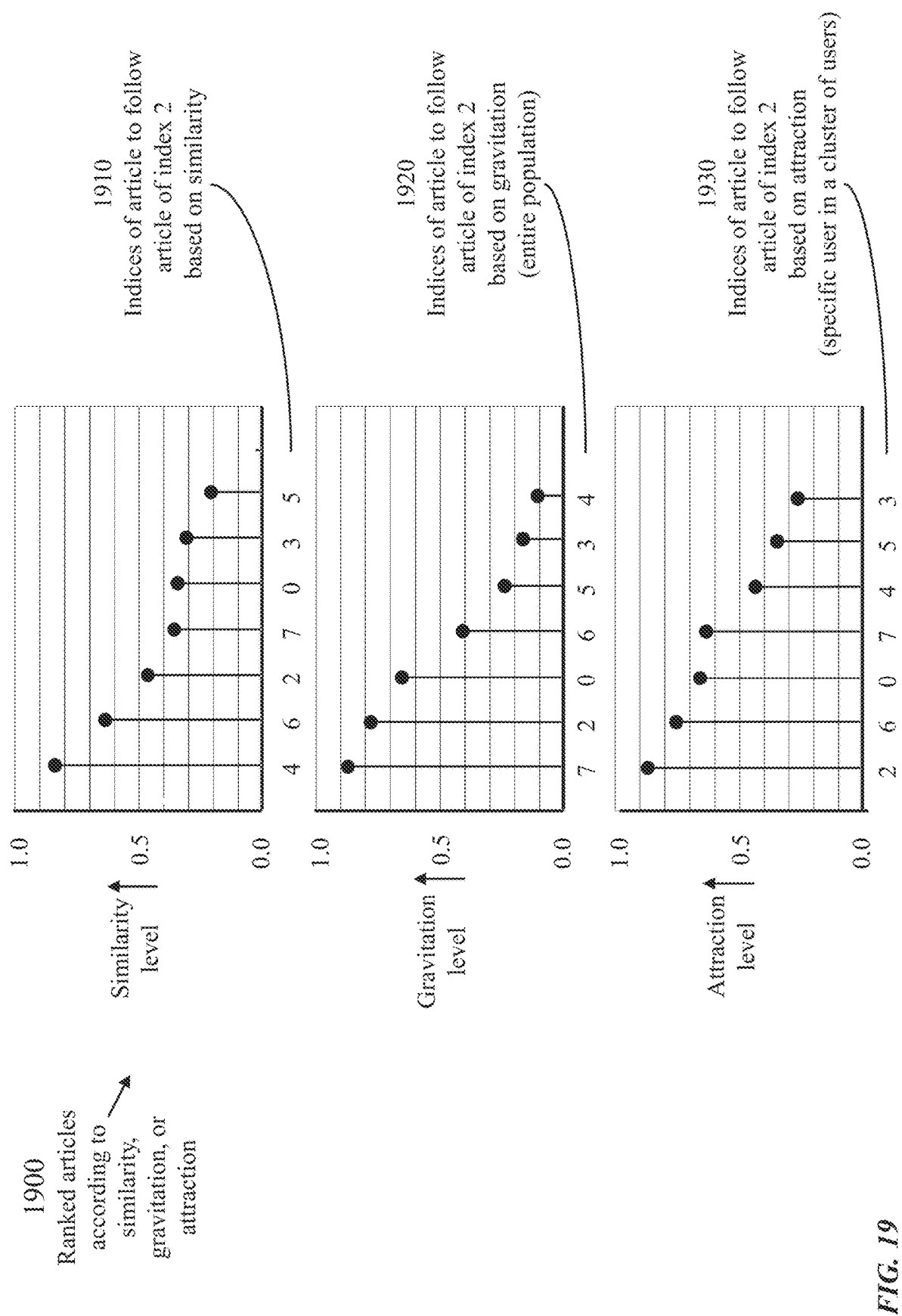
FIG. 19 illustrates indices of articles that may be considered to succeed a selected article according to different definitions of affinity, in accordance with an embodiment of the present invention.

FIG. 19 illustrates article ranks 1900 according to different affinity definitions with respect to reference article-1. Sets 1910, 1920, and 1930 correspond to sets 1810, 1820, and 1830, respectively.

Figure 20:
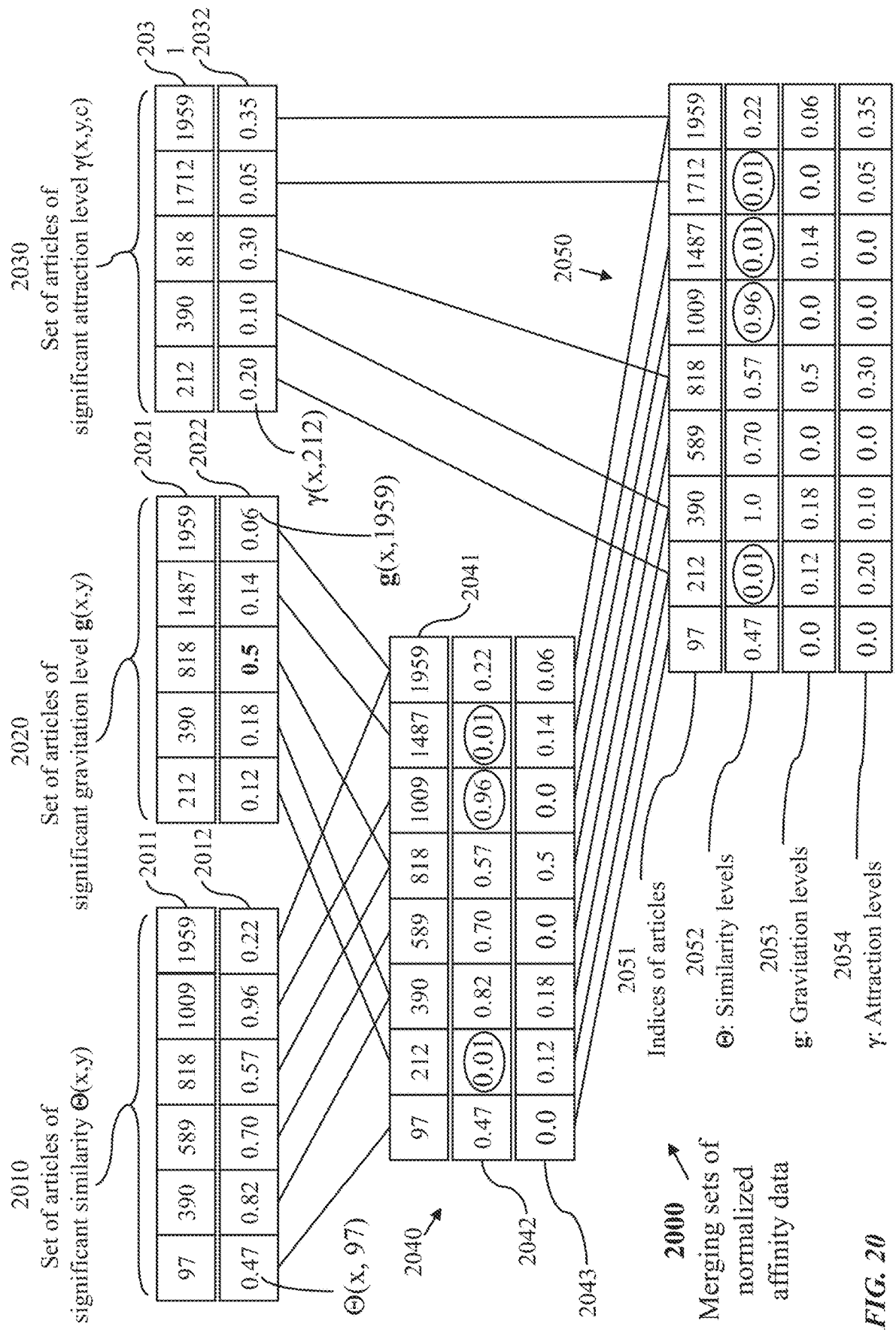
FIG. 20 illustrates processes of merging a first set of articles of significant content similarity to a reference article, a second set of articles to which the reference article has significant gravitation levels, and third set of articles to which the reference article has significant attraction levels for users of a specific cluster, in accordance with an embodiment of the present invention.

FIG. 20 illustrates processes 2000 of merging a first set of articles of significant content similarity to a reference article, a second set of articles to which the reference article has significant gravitation levels, and third set of articles to which the reference article has significant attraction levels for users of a specific cluster. For a specific reference article, a set 2010 of articles of significant article-content similarity levels, a set 2020 of articles of significant gravitation levels, and a set 2030 of articles of significant attraction levels are created. Set 2010 includes 6 articles 2011 of indices {97, 390, 589, 818, 1009, 1959} with corresponding content-similarity levels 2012. Set 2020 includes 5 articles 2021 of indices {212, 390, 818, 1487, 1959} with corresponding gravitation levels 2022. Set 2030 includes 5 articles 2031 of indices {212, 390, 818, 1712, 1959} with corresponding attraction levels 2032.

Sets 2010 and 2020 are merged into combined set 2040 which has 8 articles 2041 (the union of the set of articles 2011 and the set of articles 2021) with corresponding article-content normalized similarity levels 2042 and normalized gravitation levels 2043. Set 2040 and set 2030 are merged into combined set 2050 which has 9 articles 2051 (the union of the set of articles 2011, 2021, and 2031) with corresponding normalized article-content similarity levels 2052, normalized gravitation levels 2053, and normalized attraction levels 2054. The composite affinity levels $\Phi(x,y,c)$, $0 \leq x < M$, $0 \leq y < M$, and $0 \leq c < \chi$, may then be determined for the 9 articles, with invalid entries (marked "X") set to equal zero as depicted in Table-I below.

The highest value for $\Theta(x,y)$, $g(x,y)$, or $\gamma(x,y,c)$, for $0 \leq x < M$, $0 \leq y < M$, $0 \leq c < \chi$ is unity. Thus, with the composite affinity level defined as:

$$\Phi(x,y,c) = \beta \times \Theta(x,y) + A \times g(x,y) + B \times \gamma(x,y,c),$$

the highest affinity level is (1+A+B), which may be realized only if there is a target article y* for which $\Theta(x,y^*) = g(x,y^*) = \gamma(x,y^*,c) = 1.0$. The affinity levels indicated in Table-I are based on selecting the coefficients A and B to equal 1.5 and 2.5, respectively, so that the affinity level would be bounded between 0 and 5.0. The parameter $\beta$ assumes a value of 0.0 if content-similarity is to be ignored (for experimentation) and a value of 1.0 otherwise.

As mentioned above in the description of FIG. 9, it is more computationally efficient to use the gravitation score $G(x,y)$ and the attraction score $\Gamma(x,y,c)$ instead of the normalized gravitation level $g(x,y)$ and attraction level $\gamma(x,y,c)$ in determining the composite affinity level $\Phi(x,y,c)$ following each detection of article access. Thus, the composite affinity level may be expressed as:

$$\Phi(x,y,c) = \beta \times \Theta(x,y) + A^* \times G(x,y) + B^* \times \Gamma(x,y,c),$$

with $A^* = A/S_1(x)$ and $B^* = B/S_2(x,c)$, where $Z_1(x)$ is a running sum of gravitation scores, and $Z_2(x,c)$ is a running sum of attraction scores for user-cluster c, of reference article x.

Generally, the composite affinity level may be expressed as other functions of $\Theta(x,y)$, $G(x,y)$, and $\Gamma(x,y,c)$.

Figure 22:
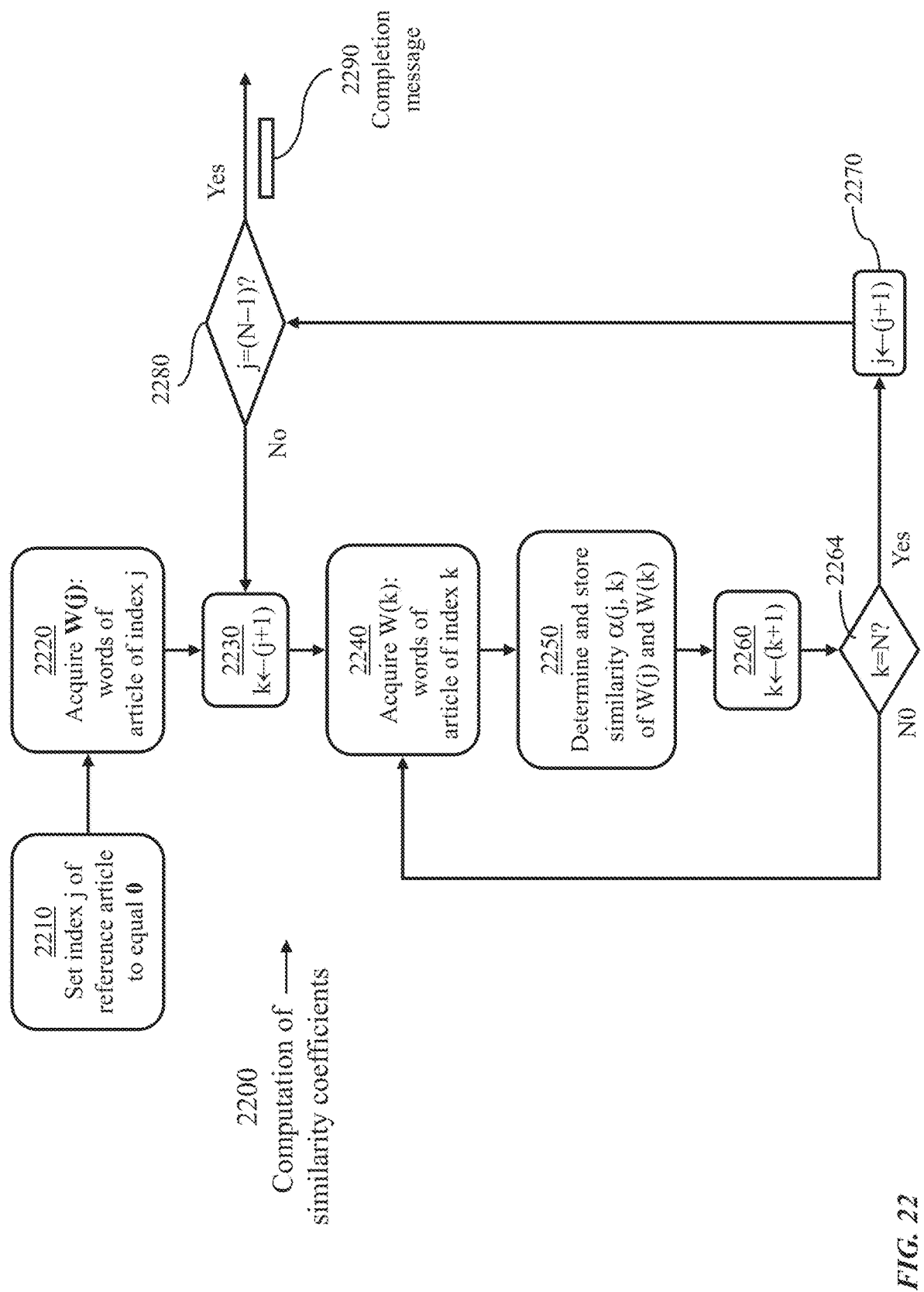
FIG. 22 illustrates processes of determining, for each article, affinity levels to each other article based on content similarity, in accordance with an embodiment of the present invention.

FIG. 22 illustrates a module 2200 of determining, for each article, content-similarity levels to each other article. In step 2210, an index "j" of a reference article is initialized to equal 0. The content of article-j, in some form, is acquired in step 2220. The content may be represented, for example, as a set of words, W(j). In step 2230, an index "k" of a target article is initialized to equal (j+1). The content of article k is acquired in step 2240. The content of article-k should be of the same type as the content of article-j; for example a set of

TABLE I

Affinity levels for a set of target articles each having at least one of: a significant similarity level, a significant gravitation level, and a significant attraction level with respect to a reference article

| Index "y" of target article | 97 | 212 | 390 | 589 | 818 | 1009 | 1487 | 1712 | 1959 |
|---|---|---|---|---|---|---|---|---|---|
| Normalized similarity levels: $\Theta(x,y)$ | 0.47 | (0.01) | 0.82 | 0.70 | 0.57 | [0.96] | (0.01) | (0.01) | 0.22 |
| Normalized gravitation levels $g(x, y)$ | X | 0.12 | 0.18 | X | 0.5 | X | 0.14 | X | 0.06 |
| Normalized attraction levels $\gamma(x, y, c)$ | X | 0.20 | 0.10 | X | 0.30 | X | X | 0.05 | 0.35 |
| Affinity level $\Phi(x, y, c)$ | 0.47 | 0.68 | 1.34 | 0.70 | 2.07 | — | 0.21 | 0.13 | 1.19 |

Figure 21:
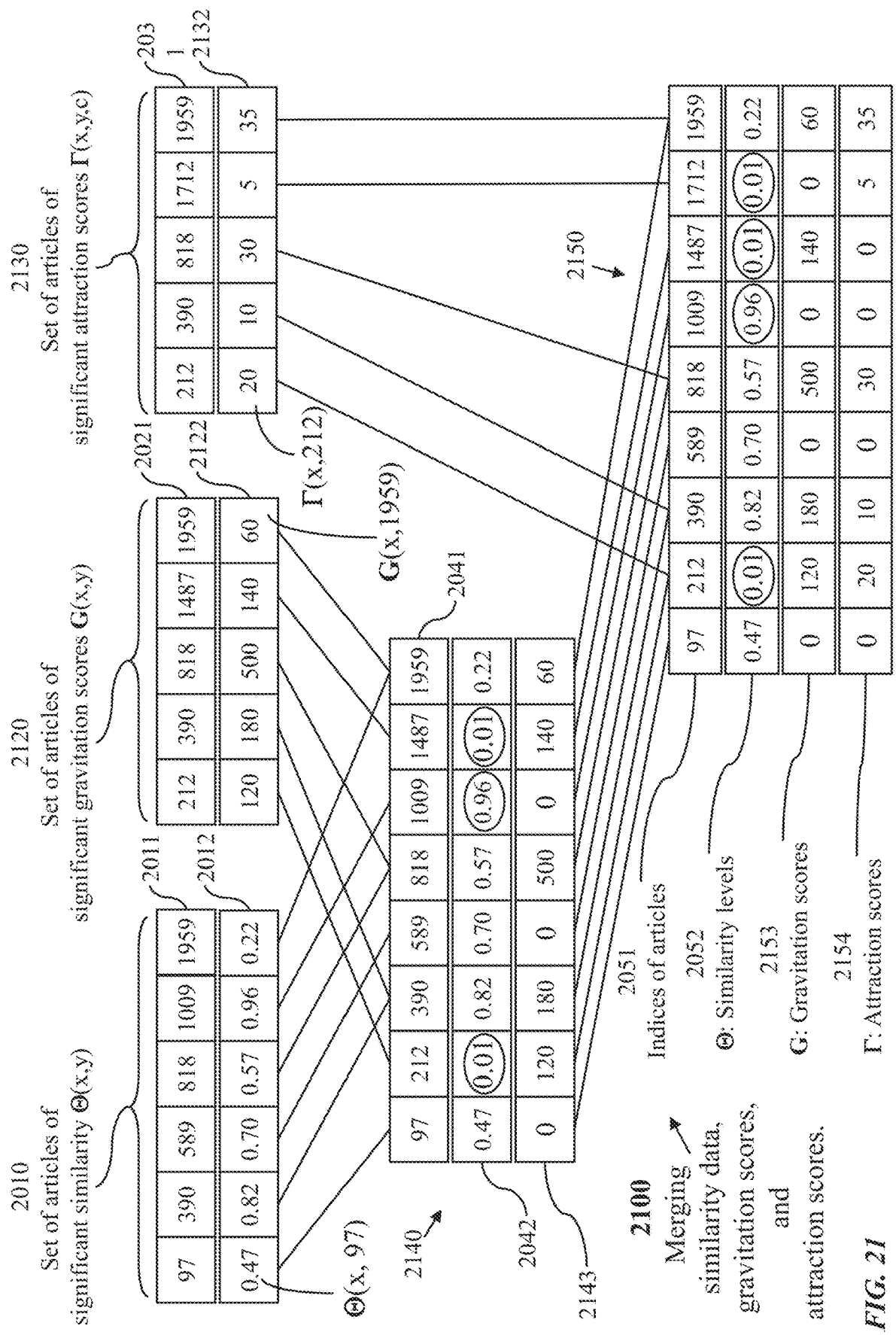
FIG. 21 illustrates processes similar to the processes of FIG. 20 with the gravitation levels replaced with gravitation scores and the attraction levels replaced with attraction scores.

FIG. 21 illustrates processes similar to the processes of FIG. 20 with the gravitation levels replaced with gravitation scores and the attraction levels replaced with attraction scores. The first set of articles, the second set of articles, and third set of articles for users of the specific cluster are merged indicating corresponding gravitation scores (array 2153) and corresponding attraction scores (array 2154). The use of gravitation scores and attraction scores instead of normalized gravitation levels and attraction levels is preferred since the scores are frequently updated.

words W(k). In step 2250, the article content-similarity level $\alpha(j, k)$ of article-j and article-k is determined according to one of known methods and stored in memory 1550 (FIG. 15). In step 2260, the article of index (k+1) is selected as the next target article for determining similarity to article-j. Step 2264 determines whether all target articles with respect to the reference article of index j have been considered. Step 2240 is revisited if another target article is to be considered; otherwise a subsequent reference article of index (j+1) is selected (step 2270). Step 2280 determines whether all reference articles have been considered. If another reference article is to be considered, step 2230 is revisited. Otherwise, the computation of all mutual article-content similarity levels is considered complete and a respective message 2290 is communicated to a parent process (not illustrated).

Figure 23:
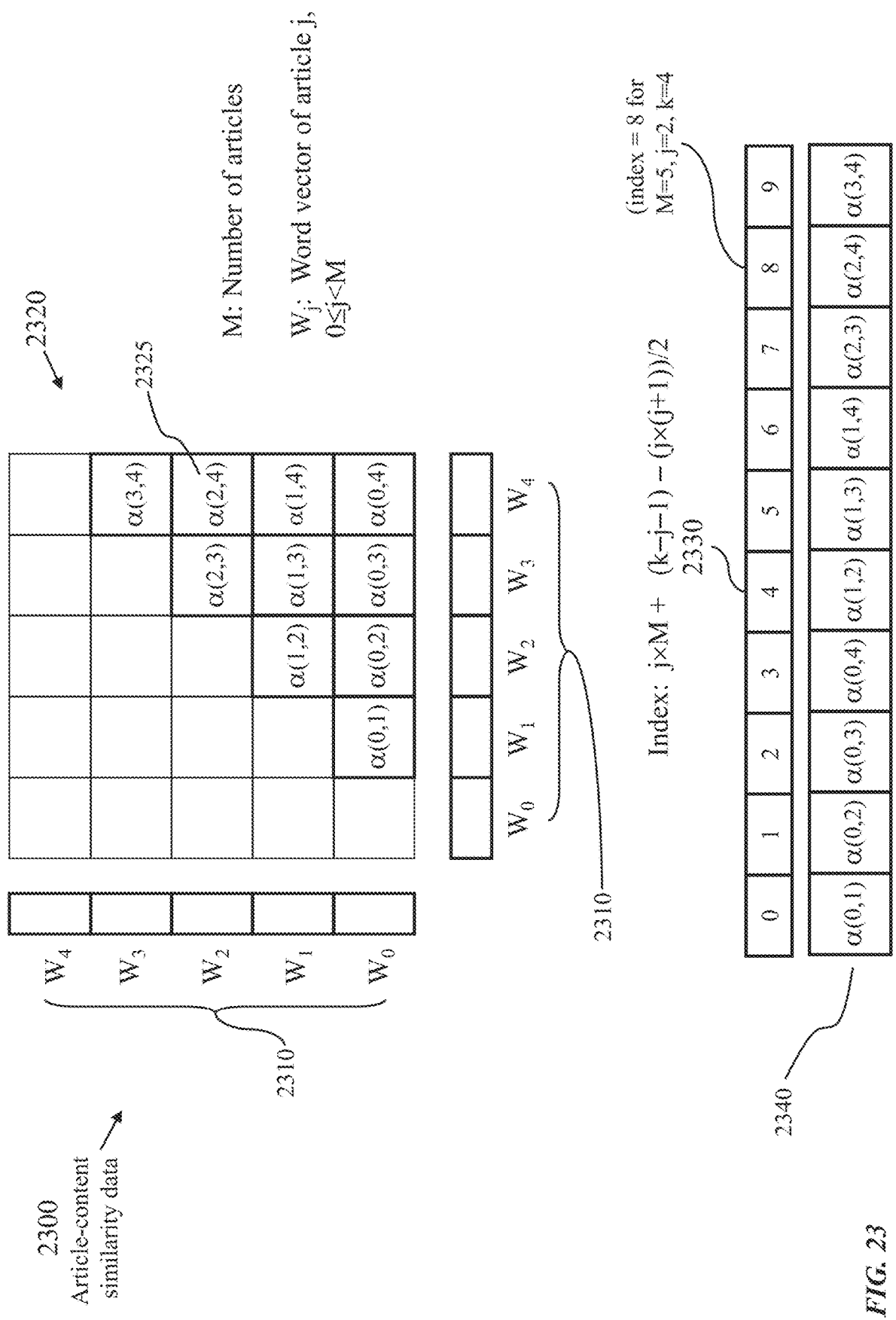
FIG. 23 illustrates a matrix of article-content similarity levels.

FIG. 23 illustrates exemplary article-content similarity data 2300 for a collection of M articles; M=5 in the example of FIG. 23. The contents of the M articles 2310 are denoted W(j), 0≤j<M. The content of an article may be represented as a set of words. The article-content similarity levels 2325, denoted α(j, k), 0≤j<M, 0≤k<M, for all pairs of articles may be organized in the form of a matrix 2320. The article-content similarity levels α(j, k) and α(k,j) are identical. Thus, only content-similarity levels corresponding to 1≤j< (M−1), k>j, need be stored. Naturally α(x, x)=1.0, 0≤j<M. Thus, the article-content similarity levels may occupy an array 2340 where an article-content similarity level α(j,k), k>j, may be stored in array 2340 at a location 2330 determined as {j×M+(k−j−1)−(j×(j+1))/2}.

Figure 24:
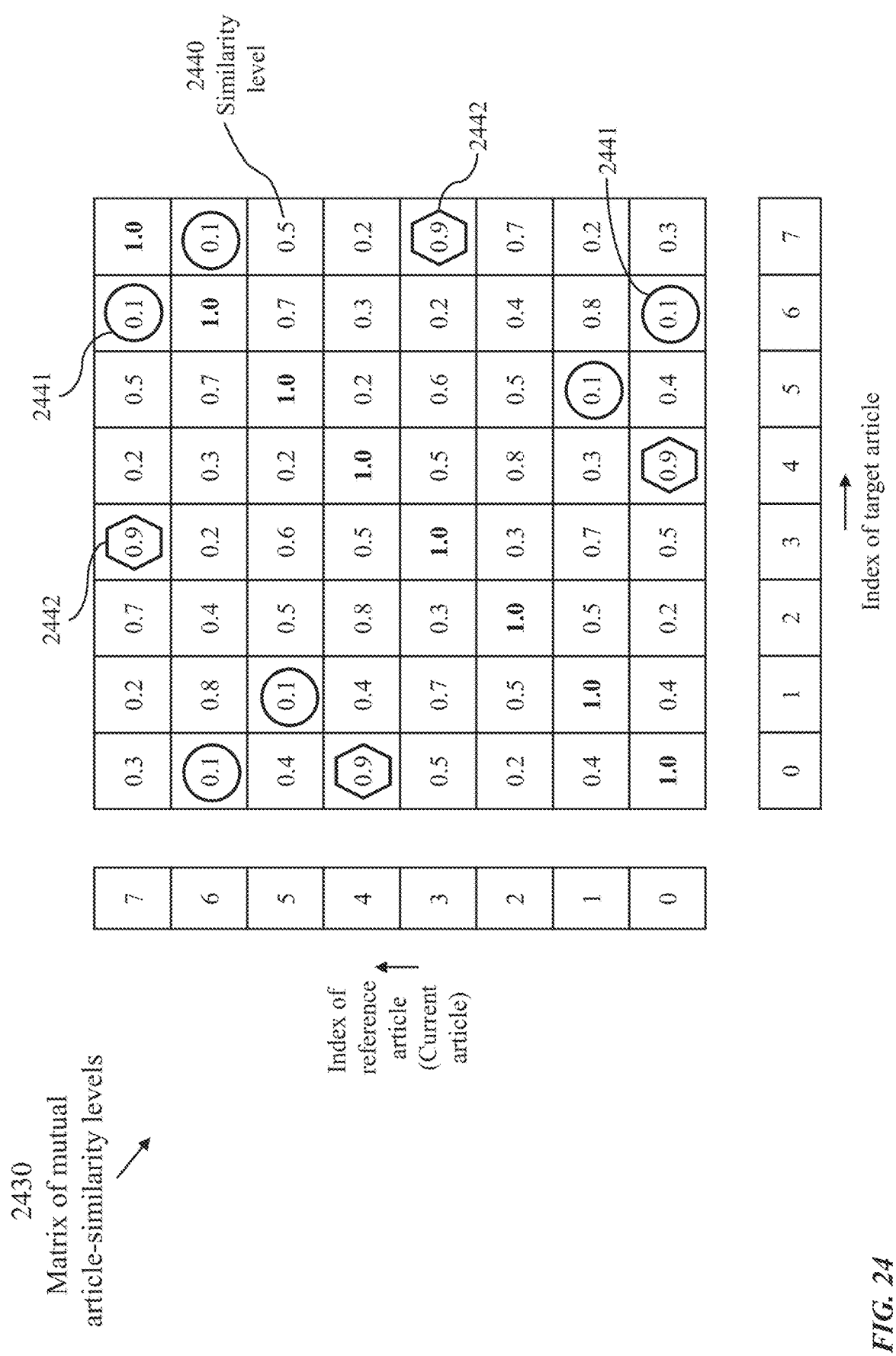
FIG. 24 illustrates a matrix of normalized affinity levels based on article-content similarity.

FIG. 24 illustrates an exemplary matrix 2430 of normalized mutual affinity levels 2440 based on article-content similarity for a collection of 8 articles (M=8). The mutual affinity levels α(j, k), are indicated for each pair of a reference article-j and a target article-k, 0≤j<M, 0≤k<M; α(k, j)=α(j, k), and α(j, j)=1.0. A content-similarity level α(j, k), reference 2441, considered to be too low (below a predefined lower bound) so that a user who just inspected article j would not be interested in article-k may be omitted. Likewise, a content-similarity level α(j, k), reference 2442, considered to be too high (above a predefined upper bound) so that a user who just inspected article j would not find different information in article-k may also be omitted. The omitted entries in matrix 2430 are encircled and need not be used in the process of recommending a new article to follow a current article.

Figure 25:
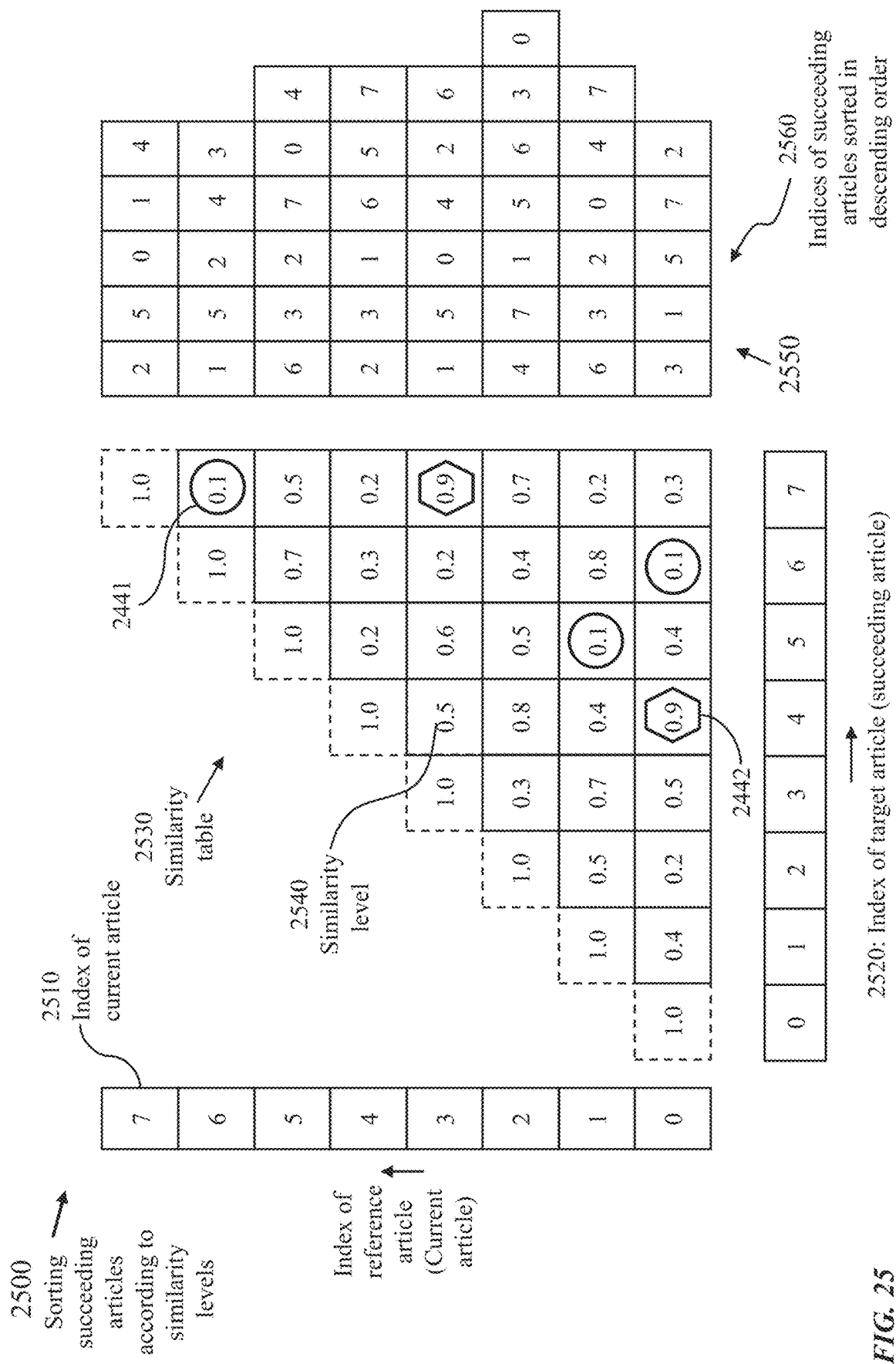
FIG. 25 illustrates sorting affinity levels based on article-content similarity, in accordance with an embodiment of the present invention.

FIG. 25 illustrates sorted affinity levels based on article-content similarity. Table 2530 indices content-similarity levels 2540 for pairs of reference articles (current articles) 2510 and target articles (succeeding article) 2520. The marked entries in the table are not used in further processing. Table 2550 indicates, for each reference article, indices of target articles each having a significant content-similarity level with respect to a respective reference article. The entries of each row of table 2550 are sorted according to corresponding content-similarity levels.

The target articles to follow reference article-0 are the articles of indices 1, 2, 3.5 and 7 which have corresponding content-similarity levels of 0.4, 0.2, 0.5, 0.4, and 0.3. Article-3 has the highest content-similarity to article-0 and article-2 has the least content-similarity level. The indices of target articles in table 2550 to follow reference article-0 are 3, 1, 5, 7, and 2 with corresponding content-similarity levels of 0.5, 0.4, 0.4, 0.3, and 0.2.

The target articles to follow reference article-4 are the articles of indices 1, 2, 3.5, 6 and 7 which have corresponding content-similarity levels of 0.4, 0.8, 0.5, 0.2, 0.3 and 0.2 (noting that α(j,k)=α(k,j)). Article-2 has the highest content-similarity to article-4 and article-7 (or article-5) has the least content-similarity level. The indices of target articles in table 2550 to follow reference article-4 are 2, 3, 1, 6, 5, 7 with corresponding content-similarity levels of 0.8, 0.5, 0.4, 0.3, 0.2 and 0.2.

Figure 26:
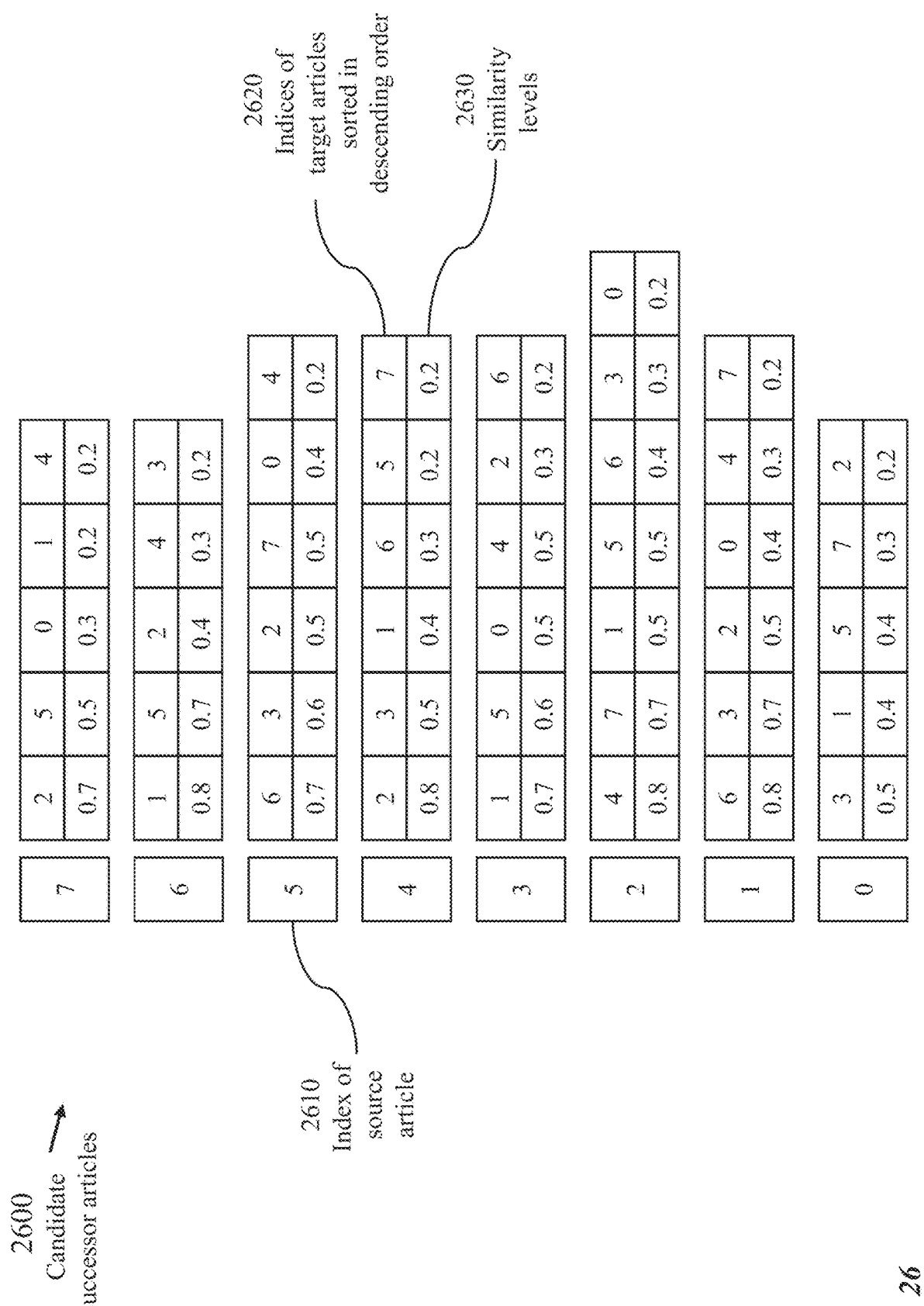
FIG. 26 illustrates, for each article, a selected subset of candidate successor articles according to article-content similarity data.

FIG. 26 illustrates, for each article, a selected subset of candidate successor articles according to article-content similarity data. Table 2600 indicates, for each reference article (current article) 2610 indices 2620 of a set of candidate successor articles sorted in descending order according to article-content similarity levels 2630 as described above with reference to FIG. 25. For a large number, M, of articles (M>1000, for example), it may be desirable to consider, for each reference article, only a predefine number of candidate successor articles. In the example of FIG. 26, only three candidate successor articles are considered.

Figure 27:
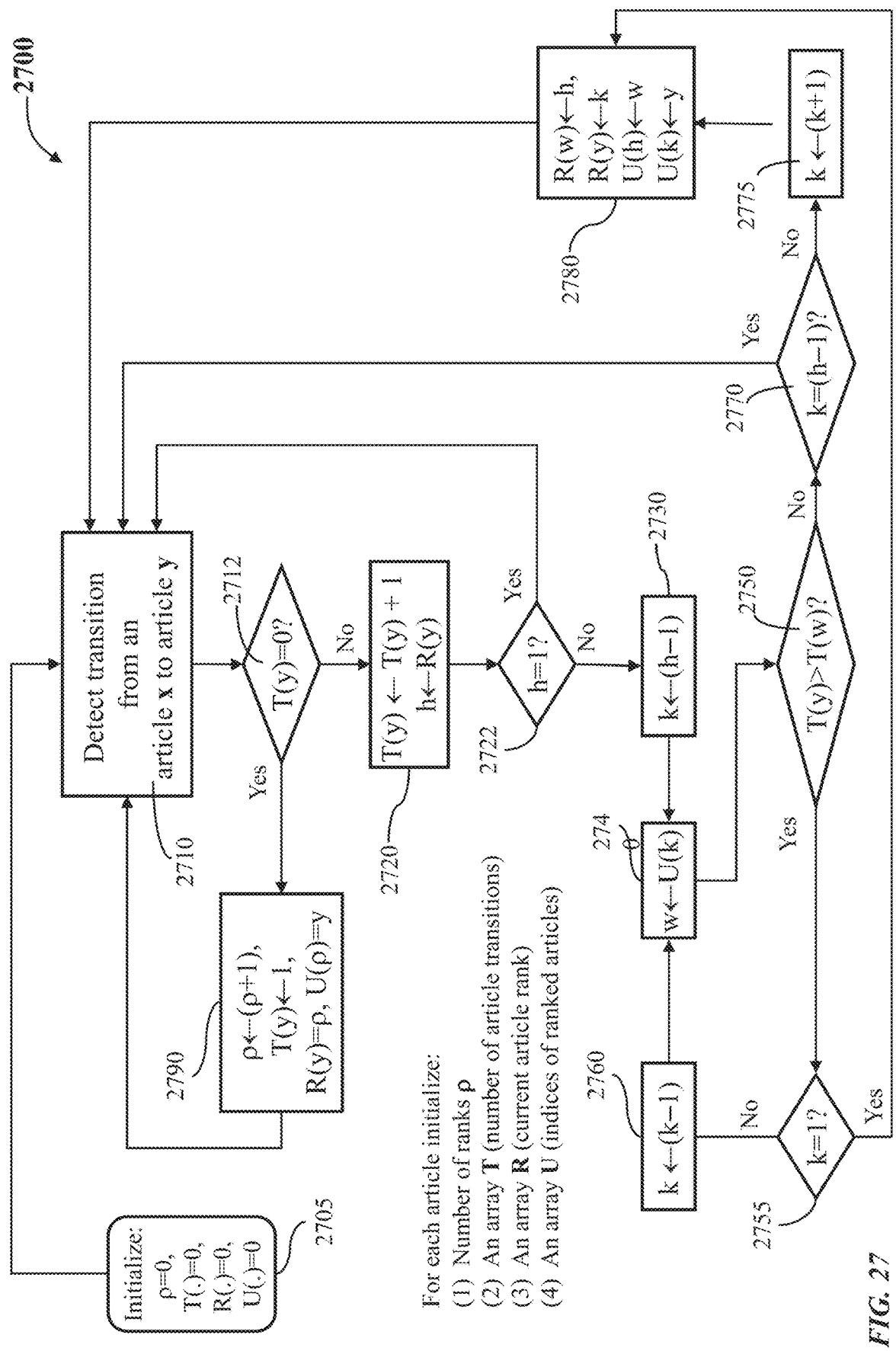
FIG. 27 illustrates processes of creating, updating, and sorting transition scores from a selected article to other articles of a collection of articles, in accordance with an embodiment of the present invention.

FIG. 27 illustrates a procedure 2700 of determining gravitation levels based on creating, updating, and sorting numbers of transitions from a selected article to other articles of a collection of articles. In the figure, ρ denotes the number of article ranks, T(y) denotes the number of transitions to an article y from a reference article, R(y) denotes a rank of article y with respect to the reference article, and U(r) denotes an index of an article of rank r, 0<r≤ρ. The processes 2700 are outlines below.

Process 2705 initializes p, array T, array Y, and array U to zero.

Process 2710 detects a user accessing an article of index y following visiting an article of index x.

Process 2712 determines whether article y has been accessed following article x.

Process 2720 updates array T to count an additional visit of article y following article x.

Process 2722 revisits process 2710 if the rank of article y is 1 (hence article y cannot be promoted).

Process 2730 indexes a better rank.

Process 2740 identifies an article w of a rank better than the rank h of article y.

Process 2750 determines whether article y has realized a better score than article w, i.e., whether T(y) is now greater than T(w); this condition is only reached if T(y)=T(w)+1.

Process 2755 triggers process 2780 if article w is of rank 1 or process 2760 otherwise.

Process 2760 selects another better rank (this would be needed if there are more than two articles having the same score as determined from array T).

Process 2770 determines whether to maintain current article ranks and return to process 2710 or promote article y to a better rank (process 2780).

Process 2775 revises rank of article to be promoted.

Process 2780 exchanges ranks of article y and article w.

Figure 28:
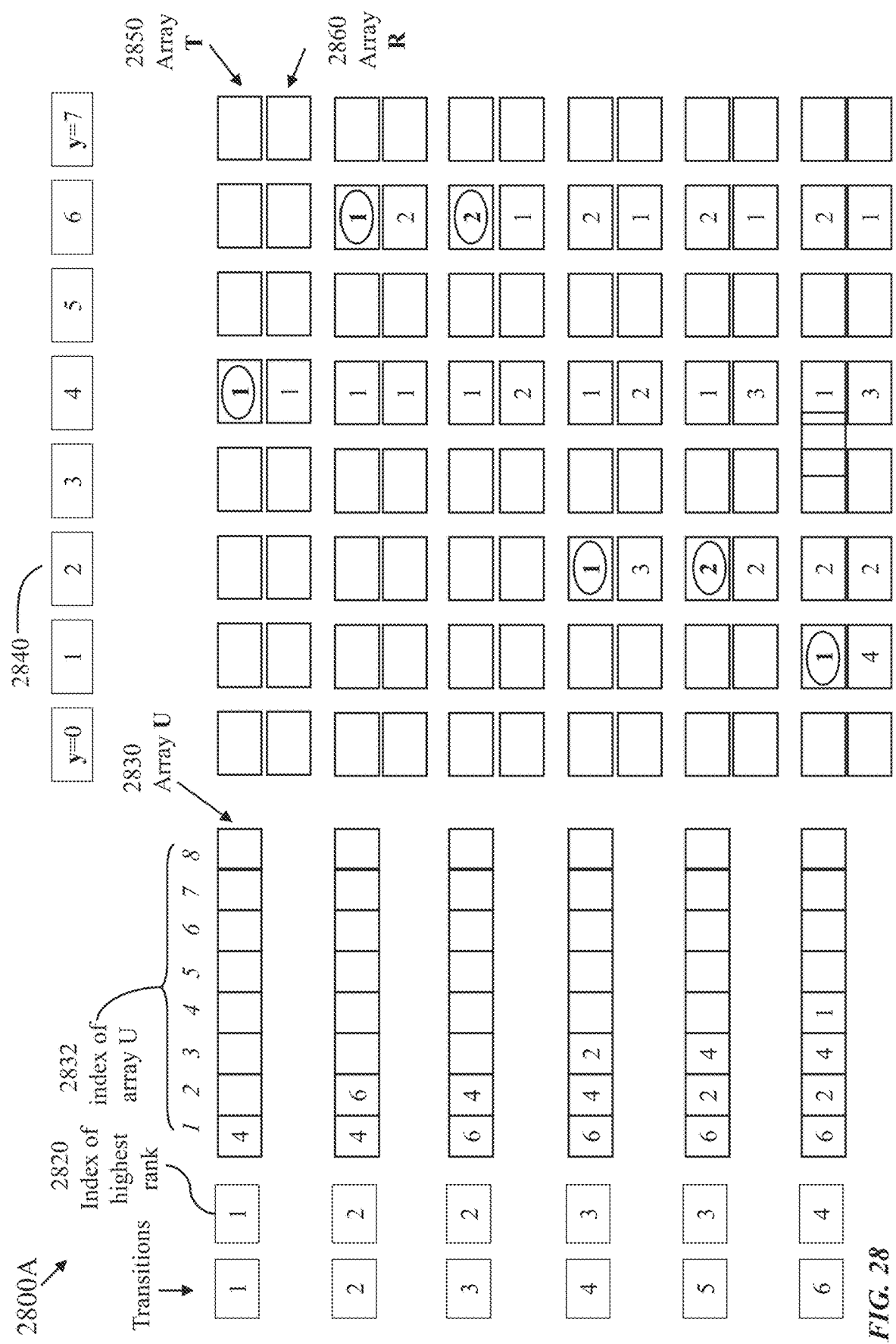
FIG. 28 illustrates exemplary results of the processes of FIG. 27.
Figure 29:
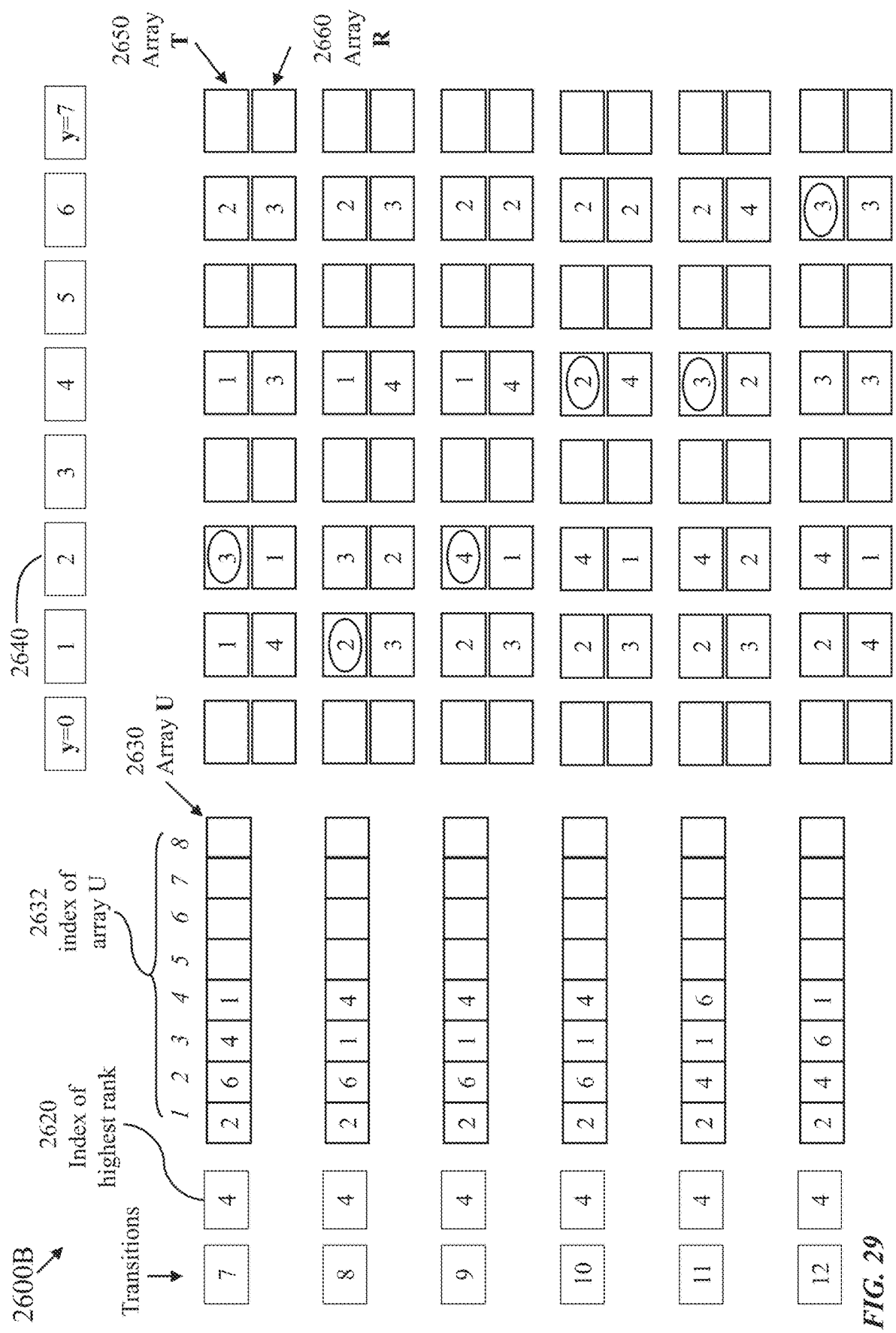
FIG. 29 illustrates further results of the processes of FIG. 27.

FIG. 28 illustrates exemplary results 2800 of determining gravitation levels for a collection of 8 articles (M=8) using the processes of FIG. 27. FIG. 28 illustrates transitions from reference article-0. Execution of the processes is illustrated for a small number, 12, of article transitions; processing according to FIG. 27 continues ad infinitum.

Upon detecting a transition from article x to any other article y of a specified collection of M articles, 0≤y<M, a respective score is updated. For a reference article of index x, 0≤x<M, a current highest rank ρ is initialized to equal 0, and each of the M entries of arrays T, R, and U is initialized to equal 0. Array T records a score of the number of transitions from article x to each other article; T(y) is a current number of transitions from article x to article y, 0≤y<M. Array R records a current rank of each article, excluding article x; R(y) is a current rank of article y with respect to article x. Array U records indices of ranked articles with respect to article x; U(1) is the index of the article of highest score, U(2) is the index of an article having a score less than or equal to the score of article U(1), and so on. FIG. 28 illustrates:

current largest rank 2820;

article rank 2830, which indexes array U storing indices of ranked articles; U(r) is the index of an article of rank r;

indices 2840 of articles;

array T, referenced as 2850, storing a score of each article y selected after article x; T(y) is the number of users selecting article y after article x; and array R, references as 2860, storing a rank of each article y selected after article x; R(y) is the rank of article y; R(y)≤ρ; arrays T and R are interleaved in FIG. 28.

Updates following five transitions are described below.

Transition 1:

A transition to article-4 is detected (y=4, process 2710). Since T(4)=0, process 2712 leads to process 2790 and process 2710 is revisited. In process 2790, ρ is increased to equal 1, T(4) is increased to 1, R(4) is set to equal 1, and U(1) is set to index 4.

Transition 2:

A transition to article-6 is detected (y=6, process 2710). Since T(6)=0, process 2712 leads to process 2790 and process 2710 is revisited. In process 2790, ρ is increased to equal 2, T(6) is increased to 1, R(6) is set to equal 2, and U(2) is set to index 6.

Transition 3:

A transition to article-6 is detected (y=6, process 2710). Since T(6)≠0, process 2712 leads to process 2720 in which T(6) is increased to 2. Since the rank of article-6 is not 1 (h=R(6)=2), there may be an opportunity to promote article 6. Thus, process 2722 leads to process 2730 to select the next better rank k; k=h−1=1. In 2740, the index w of the article of next better rank is identified as w=4 and process 2750 determines that the score of article-6 is greater than the score of article-4. Process 2755 determines that the sought better rank, k, is 1, i.e., the top rank. Thus process 2780 is activated to demote article-w to rank h=2 and promote article-6 to the top rank k=1. Process 2710 is then revisited.

Transition 4:

A transition to article-2 is detected (y-2, process 2710). Since T(2)=0, process 2712 leads to process 2790 and process 2710 is revisited. In process 2790, ρ is increased to equal 3, T(2) is increased to 1, R(2) is set to equal 3 (p=3), and U(3) is set to index 2.

Transition 5:

A transition to article-2 is detected (y=2, process 2710). Since T(2)≠0, process 2712 leads to process 2720 in which T(2) is increased to 2. Since the rank of article-1 is not 1 (h=R(2)=3), there may be an opportunity to promote article 2. Thus, process 2722 leads to process 2730 to select the next better rank k; k=h−1=2. In 2740, the index w of the article of next better rank is identified as w=4 and process 2750 determines that the score of article-2 is greater than the score of article-4. Process 2755 determines that the sought better rank, k, is 2, i.e., not the top rank. Thus process 2760 identifies an even higher rank k; k=1. In 2740, the index w of the article of rank k is identified as w=6 and process 2750 determines than T(2) is not greater than T(6). Thus, there is no hope for two promotions; process 2770 leads to process 2775 which resets the sought rank to rank 2 instead of rank 1.

Figure 30:
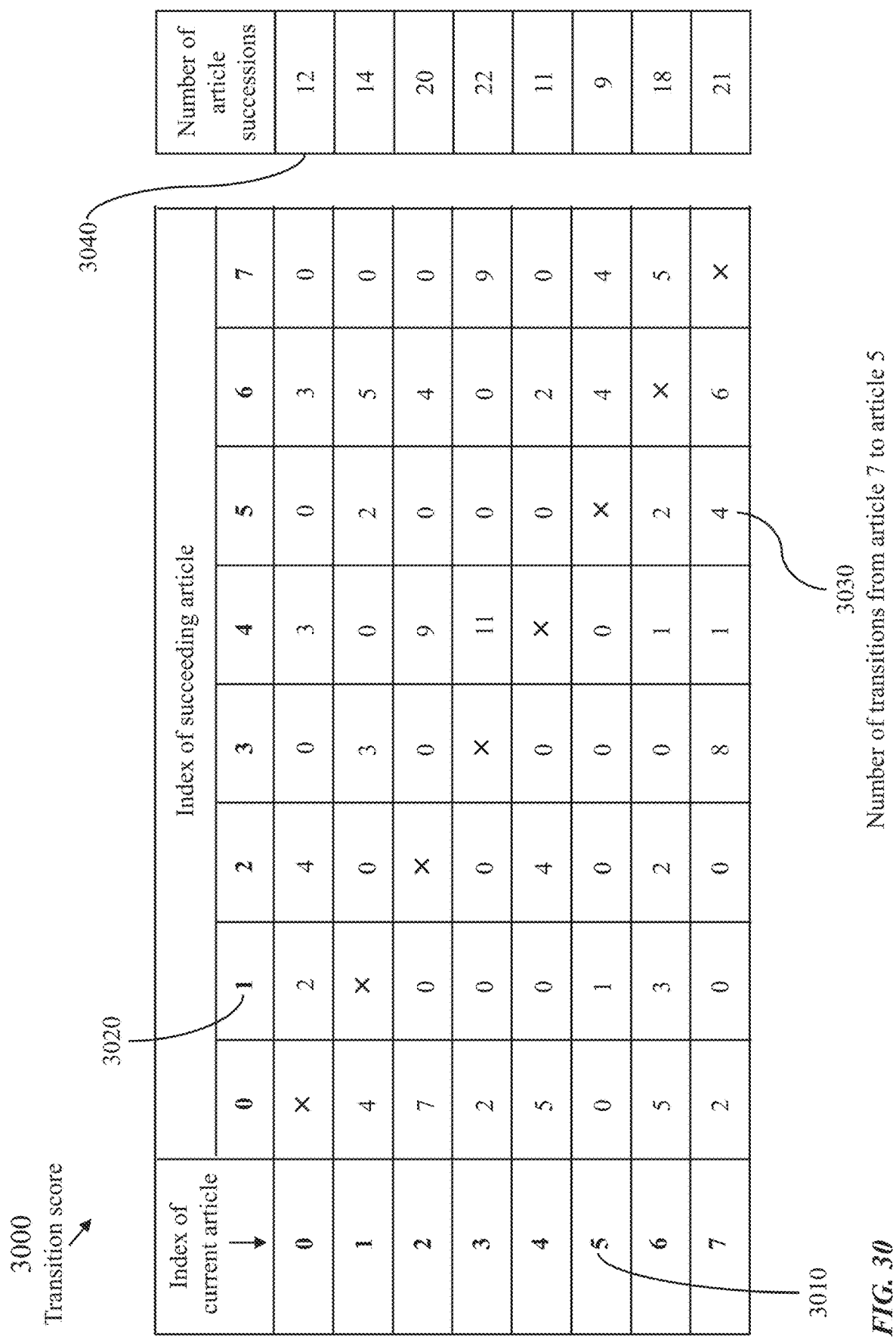
FIG. 30 illustrates an exemplary table indicating scores of transitions from each article of a collection of articles to each other article of the collection of articles.

FIG. 30 illustrates an exemplary table 3000 indicating numbers of transitions from each article of a collection of articles to each other article of the collection of articles. The table indicates a score 3030 of the number of transitions from each reference article (current article) of an index x (reference 3010) to each other article of index y (reference 3020); y≠x. The total number 3040 of transitions from each reference article is indicated in the right column. The number of transitions from an article x to an article y is the number of users selecting article y after inspecting article x; 0≤x<M; 0≤y<M, y≠x, M being the number of articles under consideration.

FIG. 31 illustrates a table 3100 of normalized article-succession scores corresponding to the table of FIG. 30. Each entry 3150 is the ratio of a respective number of users selecting a specific article after inspecting a reference article to the total number of users selecting any article after inspecting the reference article.

Preferably, Table 3000 rather than Table 3100 is used for quantifying the gravitation levels. The article-transition scores are recomputed frequently, hence re-normalizing unnecessarily increases the computational effort. If the gravitation level is the sole criterion for selecting a successor article, then only score comparison is needed. If the gravitation level is a component of a composite affinity level as illustrated in FIG. 9, then the inter-article score 3030 and the total reference-article score 3040 would be considered in determining a respective parameter (A or B, reference numeral 750).

Figure 32:
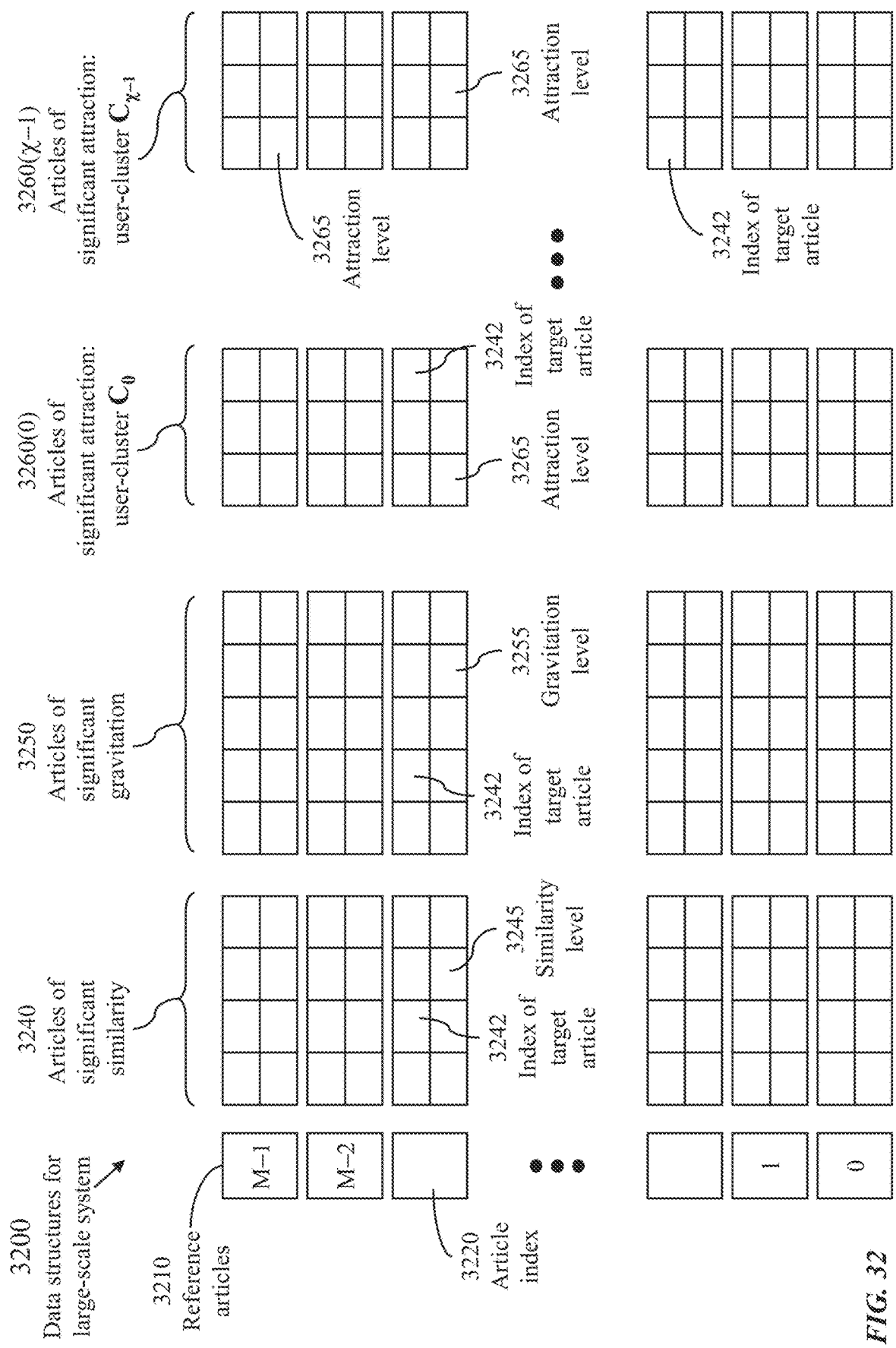
FIG. 32 illustrates data structures for content-similarity data and usage data for a large scale system.

FIG. 32 illustrates data structures 3200 appropriate for a large-scale system supporting a plurality 3210 of articles containing a relatively large number M of articles (several thousands for example). Data relevant to successor articles 3240 of significant similarity to respective reference articles are stored. For each reference article 3220, an index 3242 of a target article and a corresponding content similarity level 3245 to the reference article are stored.

Likewise, data relevant to successor articles 3250 of significant gravitation to respective reference articles are stored. For each reference article 3220, an index 3242 of a target article and a corresponding gravitation level 3255 to the reference article are stored.

Data relevant to successor articles 3260 of significant attraction to respective reference articles are stored for each user cluster. For each reference article 3220, an index 3242 of a target article and a corresponding gravitation level 3265 to the reference article are stored.

FIG. 33 illustrates article-gravitation scores, for reference article-x (x=5 in the example of FIG. 33), adjusted according to data age for a collection of eight articles 3320 indexed as article-0 to article-7.

Table 3302 indicates the number 3330 of transitions to each other article at different data ages 3310 (expressed in arbitrary units; days for example). The number 3330 of transitions to an article of index y is the number of users accessing article y after accessing reference article x. The total number 3340 of users selecting any article from a specified collection of articles after accessing reference article x is indicated in the right column.

Table 3304 indicates the number 3350 of transitions to each other article at different data ages 3310 (expressed in arbitrary units; days for example) where the number of transitions is adjusted to half the accumulated values when the data age reaches 100 days. This is done to give more weight to more recent data. The adjusted total number 3360 of users selecting any article from a specified collection of articles after accessing reference article x is indicated in the right column.

Comparing Tables 3302 and 3304, at the data age of 100 days, the scores in Table 3304 are reduced to half of their values. Thus new article transitions would have more influence in determining inter-article gravitation. For example, without score adjustment, the number of transitions from article-5 to article 3 is 180 and the number of transitions from article-5 to article-7 is 212. With score adjustment, the number of transitions from article-5 to article 3 is 150 and the number of transitions from article-5 to article-7 is 122.

Thus, if the selection of a favourite succeeding article is based on article-gravitation data only, article-7 would be recommended if the scores are not adjusted but article-3 would be recommended if the scores are adjusted at the 100-day age point. If the selection considers other criteria, such as article-content similarity, then a higher score of article-gravitation would still influence the recommendation.

FIG. 34 illustrates normalized article-gravitation levels corresponding to the article-gravitation scores of FIG. 33. Table 3402 depicts normalized article-gravitation score corresponding to Table 3302 and Table 3404 depicts normalized article-gravitation score with periodic adjustment corresponding to Table 3304. An entry 3430 of Table 3402 indicates a ratio of a number of users accessing article y after accessing reference article x to the total number of users selecting an article from a specified collection of articles after accessing reference article x. An entry 3450 of Table 3404 indicates a ratio of the age-adjusted number of users accessing article y after accessing reference article x to the age-adjusted total number of users selecting an article from a specified collection of articles after accessing reference article x. It is seen that the normalized article-gravitation score for article-3 increases from 0.25 to 0.296 while the normalized article-gravitation score for article-7 decreases from 0.294 to 0.241 due to the adjustment which gives more emphasis to more recent data.

As discussed above, it is preferable to use the article-gravitation scores rather than normalized article-gravitation levels.

Figure 35:
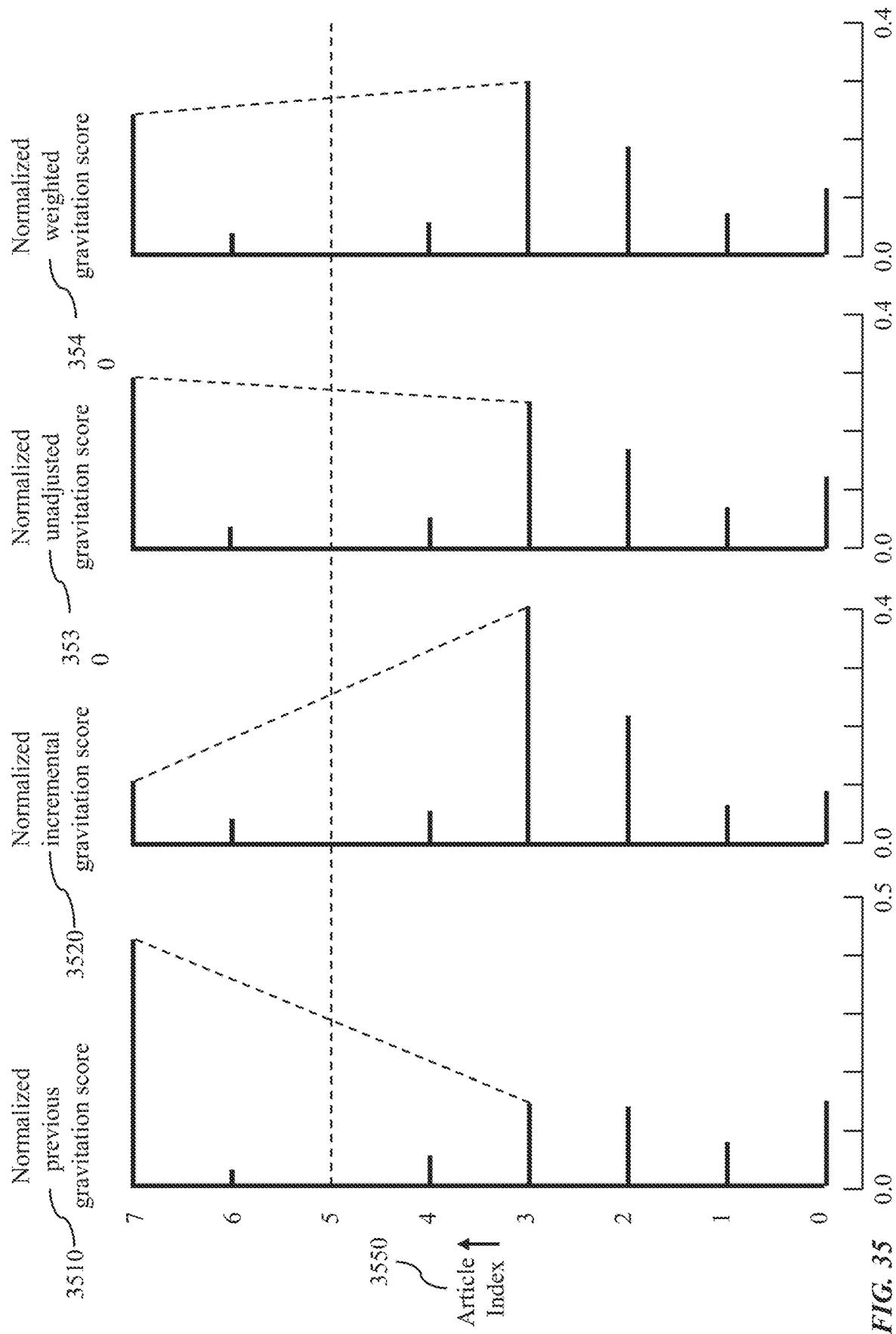
FIG. 35 illustrates the effect of adjusting article-gravitation scores on determining a preferred succeeding article.

FIG. 35 illustrates the effect of adjusting article-gravitation data on determining a preferred succeeding article. Referring to Table 3302, the article-succession scores with respect to article-5 at age 100 days are {62, 32, 58, 60, 22, X, 12, 180} to a total of 426. The article-succession scores at age 160 days are {89, 52, 123, 180, 39, X, 25, 212} to a total of 720.

The scores accumulated between the ages of 100 days and 160 days are:
{27, 20, 65, 120, 17, X, 13, 32} to a total of 294.
As indicated in Table 3402, the normalized scores at 100 days are
{0.146, 0.075, 0.136, 0.141, 0.052, X, 0.028, 0.442},
and the normalized scores at 160 days are
{0.124, 0.072, 0.171, 0.250, 0.054, X, 0.035, 0.294}.
The normalized increases of scores are
{0.092, 0.068, 0.221, 0.408, 0.058, X, 0.044, 0.109}.
When the scores at the age of 100 days is multiplied by an adjustment coefficient of 0.5, the adjusted scores at the age of 160 days become
{58, 36, 94, 150, 28, X, 19, 122}, to an adjusted total of 507.
The normalized adjusted scores at 160 days:
{0.114, 0.071, 0.185, 0.296, 0.055, X, 0.037, 0.241}
FIG. 35 illustrates, for articles 3550 succeeding article-5:
normalized gravitation levels 3510 of articles 0 to 7 at the data age of 100 days
normalized incremental gravitation levels 3520 between 100 days and 160 days;
normalized unadjusted gravitation levels 3530 at data age of 160 days; and
normalized age-adjusted gravitation levels 3540 at data age of 160 days.

FIG. 33 illustrates article-transition score adjustment based only on cyclic age, which is the time interval (in days for example) between the time of a current article transition and the time at which the score has been adjusted. It is important however to ensure that article-transition score be adjusted (reduced) only if the score is not less than a lower bound, denoted $\Sigma_{min}$ for the entire population of users or $S_{min}$ for a specific cluster of users. The article-transition score may also be adjusted, even if the cyclic age is less than a predefined age threshold T, if the score reaches an upper bound, denoted $\Sigma_{max}$ for the entire population of users or $S_{max}$ for a specific cluster of users.

Figure 36:
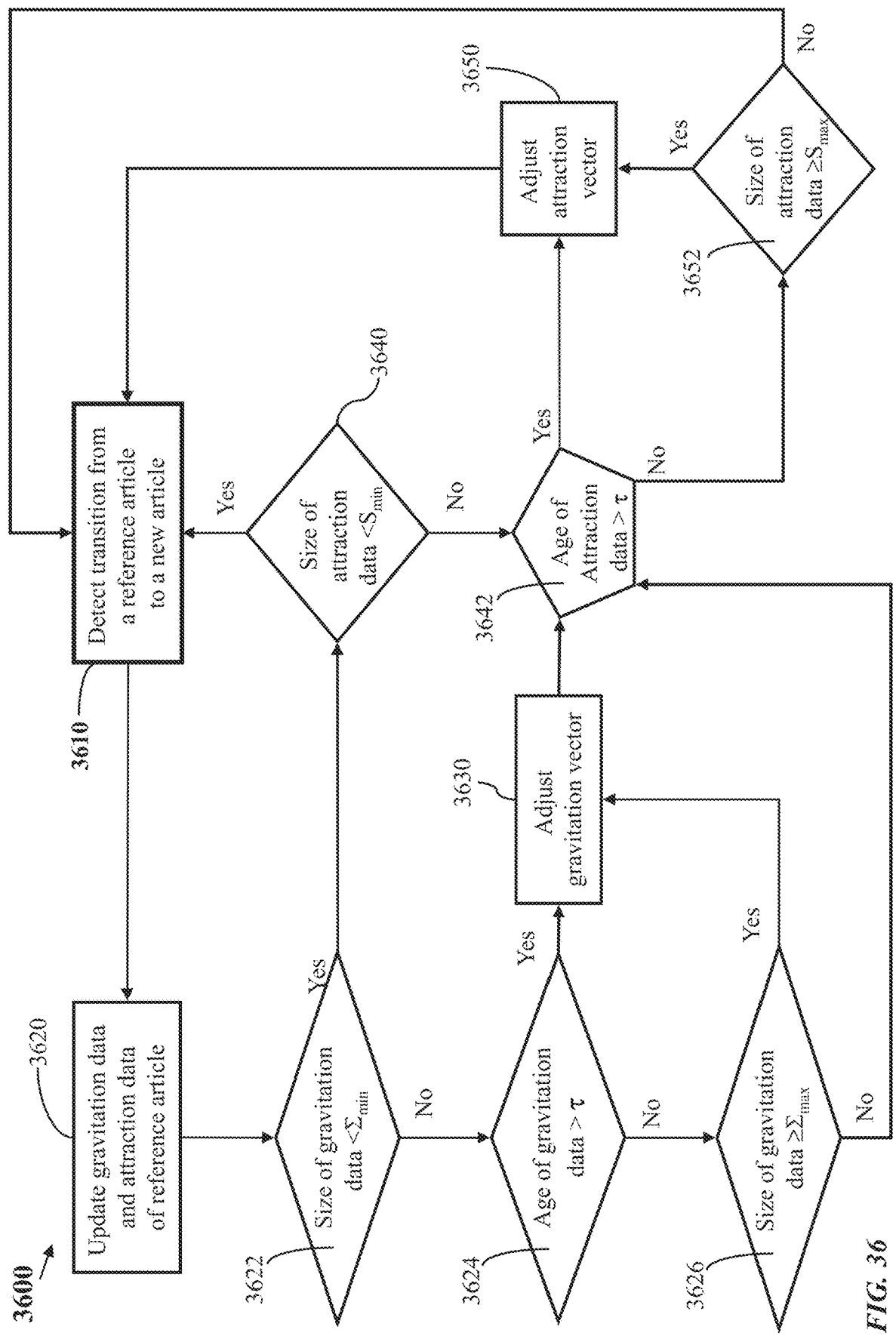
FIG. 36 illustrates a procedure of adjusting article-gravitation scores and article-attraction scores according to data age and total score of article transitions, in accordance with an embodiment of the present invention.

FIG. 36 illustrates a procedure 3600 for adjusting article-gravitation data and article-attraction data according to score lower bound, score upper bound, and cyclic age.

Process 3610 detects user selection of a new article following a specific (reference) article.

Process 3620 updates gravitation data and attraction data relevant to the reference article to account for selection of the new article.

Process 3622 compares size of gravitation data for a specific article with a predefined lower bound $\Sigma_{min}$ and branches to either process 3624 or process 3640 accordingly.

Process 3624 compares age of gravitation data with a predefined age threshold r and branches to either process 3626 or process 3630 accordingly.

Process 3626 compares size of gravitation data for a specific article with a predefined upper bound $\Sigma_{max}$ and branches to either process 3630 or process 3642 accordingly.

Process 3630 adjusts gravitation vector of the reference article.

Process 3640 compares the size of attraction data for the specific article with a lower bound $S_{min}$ defined for a cluster to which the user belongs and branches to either process 3610 or process 3642 accordingly.

Process 3642 compares age of attraction data with a respective predefined age threshold t and branches to either process 3650 or process 3652 accordingly.

Process 3650 adjusts attraction vector of the reference article according to a predefined adjustment coefficient.

Process 3652 compares size of attraction data for the specific article with an upper bound $S_{max}$ defined for the cluster to which the user belongs and branches to either process 3610 or process 3650 accordingly.

Figure 37:
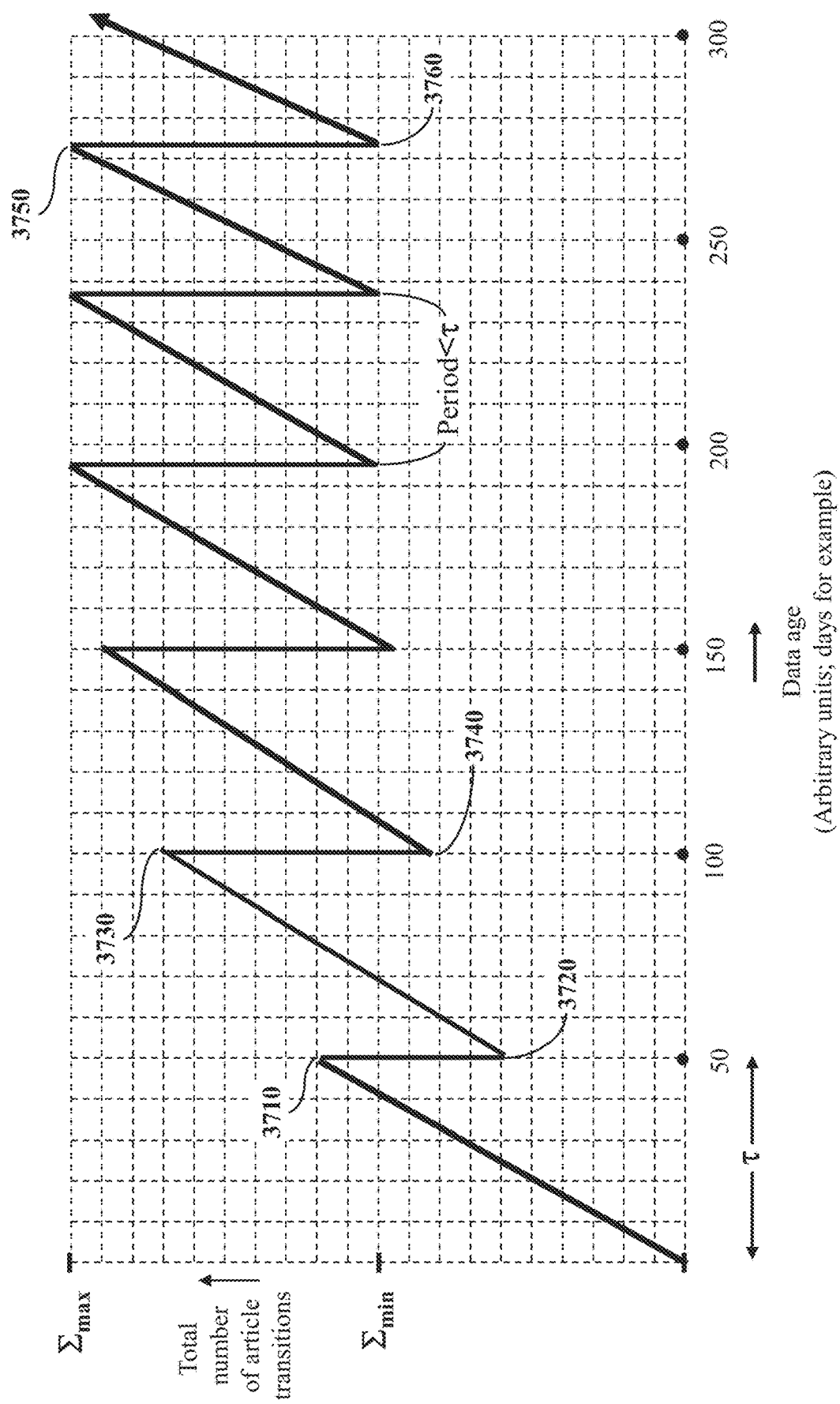
FIG. 37 illustrates an example of adjusting article-transition score according to cyclic age for a specified score lower bound and score upper bound, with an adjustment coefficient of 0.5.

FIG. 37 illustrates an example of adjusting article-transition score according to cyclic age threshold τ, for example about 50 days, for a specified $\Sigma_{min}$, $\Sigma_{max}$, with an adjustment coefficient of 0.5. It is understood that τ may be selected smaller or greater than 50 days, for example 30 days or 100 days, or from a few days to a year or more, depending on user preferences, type of articles to be processed, rate of accessing the articles by users, and also depending on the current relevance of articles to users.

The article gravitation scores G(x,y), 0≤x<M, 0≤y<M, y≠x, of all users may be individually adjusted to η×G(x,y), 0<η<1.0, at a predefined cyclic age τ if:
the total article-transition score G is within the interval $\{\Sigma_{min}, \Sigma_{max}\}$, i.e., if $\Sigma_{min} \le \sigma < \Sigma_{max}$; or
the total article-transition score $\sigma \ge \Sigma_{max}$ regardless of the cyclic age.

The same criteria apply to article attraction scores Γ(x,y, c).

FIG. 37 illustrates build-up of the total article-transition score where the score is zero at age 0. At age τ, the score 3710 exceeds $\Sigma_{min}$. Thus, each of the scores G(x,y), 0≤x<M, 0≤y<M, y≠x, is scaled by an adjustment coefficient η, selected to be 0.5. The total score is reduced to the value 3720 and the cyclic age is reset to zero. At cyclic age τ (absolute age of 100 days), the score grows to a value (reference 3730) exceeding $\Sigma_{min}$, thus, each of the scores G(x,y) is multiplied by the coefficient η=0.5 to a lower value (reference 3740) and the cyclic age is reset to zero. At a cyclic age that is less than τ (absolute age of 274 days), the score grows to a value (reference 3750) that equals $\Sigma_{max}$, thus, each of the scores G(x,y) is multiplied by the coefficient η=0.5 to a lower value (reference 3760).

Figure 38:
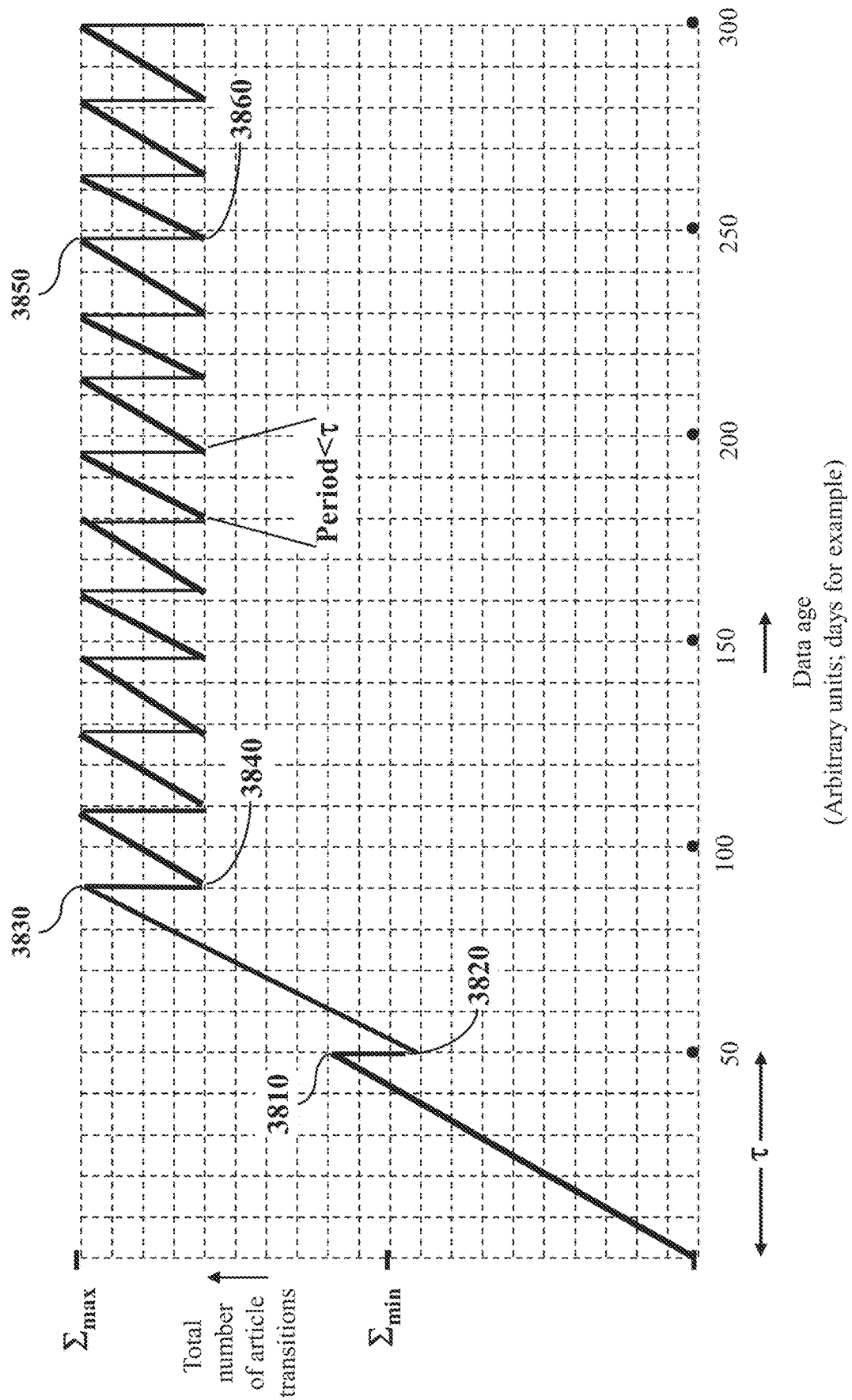
FIG. 38 illustrates an example of adjusting article-transition score according to cyclic age for a specified score lower bound and score upper bound, with an adjustment coefficient of 0.8.

FIG. 38 illustrates an example of adjusting article-transition score according to cyclic age for a specified $\Sigma_{min}$, $\Sigma_{max}$, with an adjustment coefficient η of 0.8.

At age τ, the score 3710 exceeds $\Sigma_{min}$. Thus, each of the scores G(x,y), 0≤x<M, 0≤y<M, y≠x, is scaled by an adjustment coefficient η=0.5. The total score is reduced to the value 3820 and the cyclic age is reset to zero. At cyclic age that is less than T (absolute age of 90 days), the score grows to a value (reference 3830) equal to $\Sigma_{max}$, thus, each of the scores G(x,y) is reduced by the coefficient η=0.8 to a lower value (reference 3840) and the cyclic age is reset to zero. At a cyclic age that is much less than τ (absolute age of 248 days), the score grows to a value (reference 3850) that equals $\Sigma_{max}$, thus, each of the scores G(x,y) is reduced by the coefficient η=0.8 to a lower value (reference 3860).

Comparing the score adjustment patterns of FIG. 37 and FIG. 38, it is seen that a higher adjustment coefficient results in increasing the frequency of score adjustments.

Figure 39:
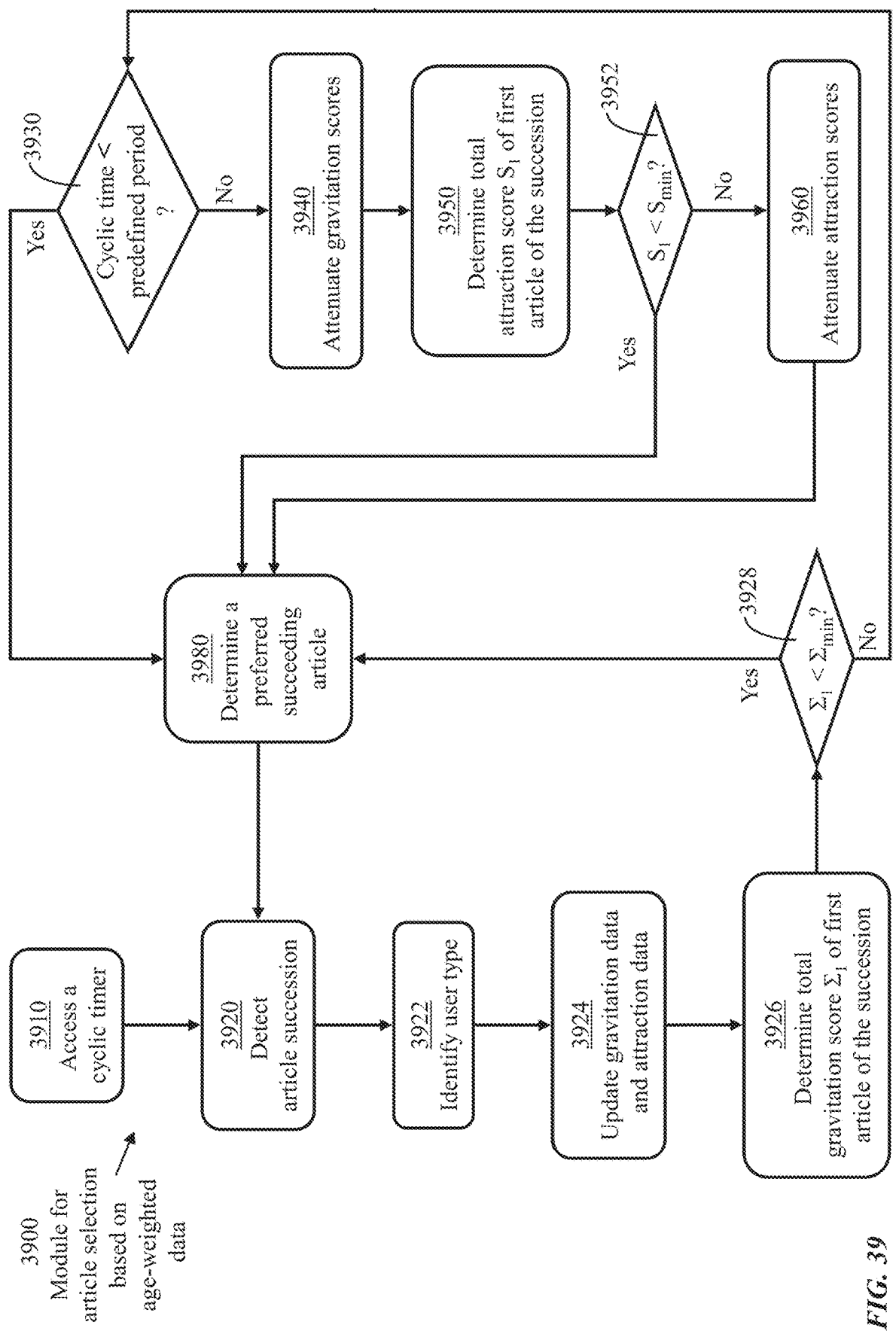
FIG. 39 illustrates a module for article selection based on age-weighted data, in accordance with an embodiment of the present invention.

FIG. 39 illustrates a module 3900 for determining a preferred article to succeed a current article based on age-weighted score of article successions. Process 3910 accesses a cyclic timer providing cyclic-time indications to enable tracking data age. Process 3920 of detects article succession where a user accesses a subsequent article following a current article. Process 3922 identifies type of a user effecting the article succession. The user type may be acquired through a network or determined according to a clustering process. Process 3924 updates gravitation scores and attraction scores to account for the detected succession. Process 3926 acquires a total gravitation score $\Sigma_1$ of the source article of the succession. If $\Sigma_1$ is less than a predefined lower bound $\Sigma_{min}$, process 3980 is activated (following step 3928) to determine a preferred succeeding article to be communicated to a respective user and process 3920 is revisited to detect another succession. Otherwise, if $\Sigma_1$ equals or exceeds the predefined lower bound $\Sigma_{min}$, a current cyclic time indication is compared with a predefined period (50 days for example) to determine if accumulated gravitation scores and attraction scores are due for adjustment (process 3930).

If the gravitation scores are not due for adjustment, process 3980 is activated and process 3920 is revisited. Otherwise, process of attenuating the gravitation scores of a reference article are attenuated (process 3940) by multiplying each pairwise gravitation score of a directed article pair by a predefined value applicable to gravitation scores. Process 3950 acquires a total attraction score $S_1$ of the source article of the succession based on user type. If $S_1$ is less than a predefined lower bound $S_{min}$, step 3952 branches to process 3980 then process 3920 is revisited. Otherwise, process 3960 is activated to attenuate scores of a reference article by multiplying each pairwise attraction score of a directed article pair by a predefined values which may be user-type specific. Thus, process 3980 determines a preferred succeeding article based on accumulated scores which may be age weighted.

Figure 40:
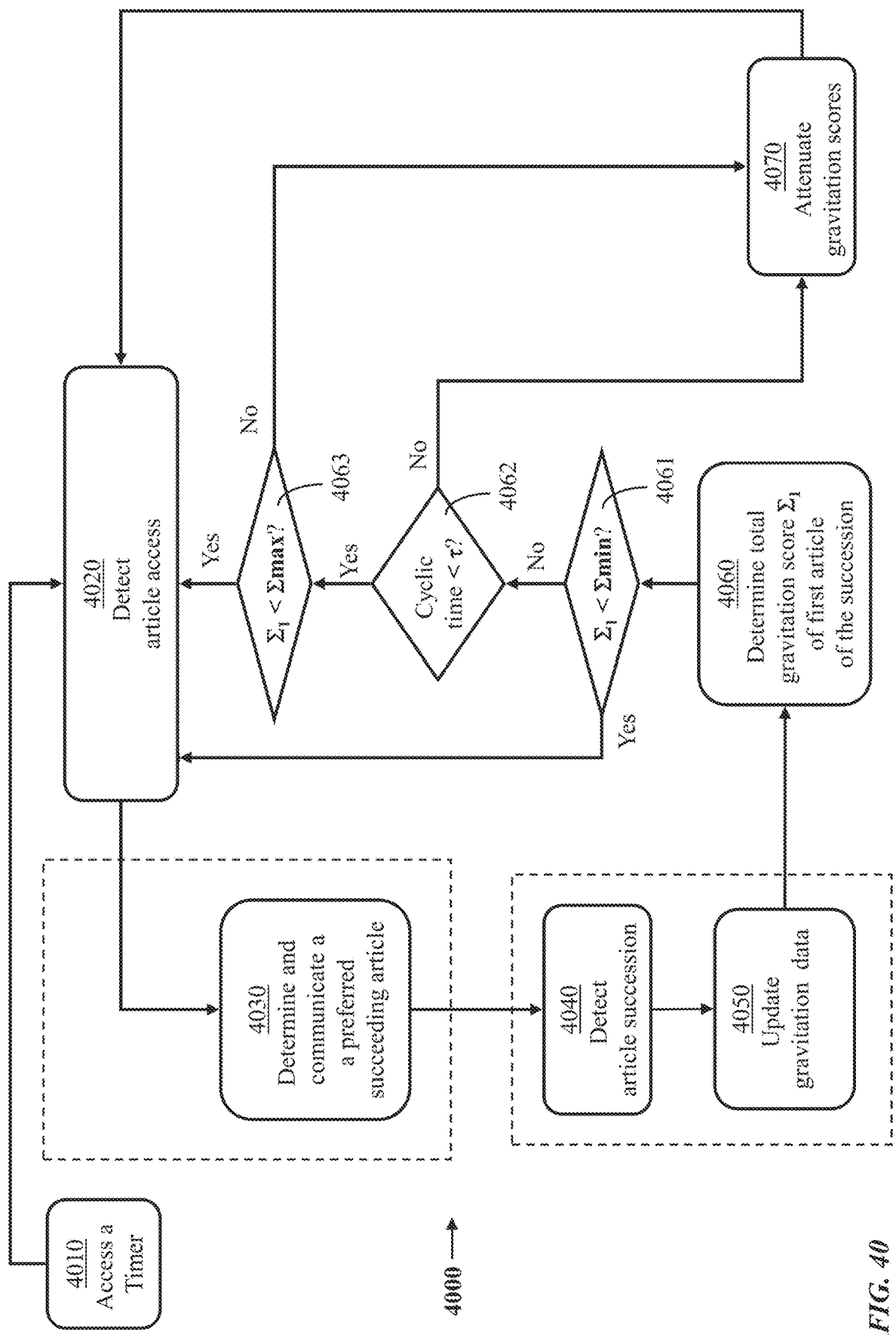
FIG. 40 illustrates a module 4000 for determining a preferred article to succeed a current article based on global age-weighted scores of article successions.

FIG. 40 illustrates a module 4000 for determining a preferred article to succeed a current article based on global age-weighted scores of article successions. The module implements processes of:
  Reading (4010) a current time indication;
  Detecting (4020) article access;
  Determining and communicating (4030) a preferred succeeding article;
  Detecting (4040) article succession;
  Updating (4050) gravitation data;
  Determining (4060) total gravitation score of first article of a succession;
  Comparing (4061) total gravitation score to a predefined lower bound;
  Comparing (4062) cyclic time to a predefined duration;
  Comparing (4063) total gravitation score to a predefined upper bound; and
  Attenuating (4070) gravitation scores.

Figure 41:
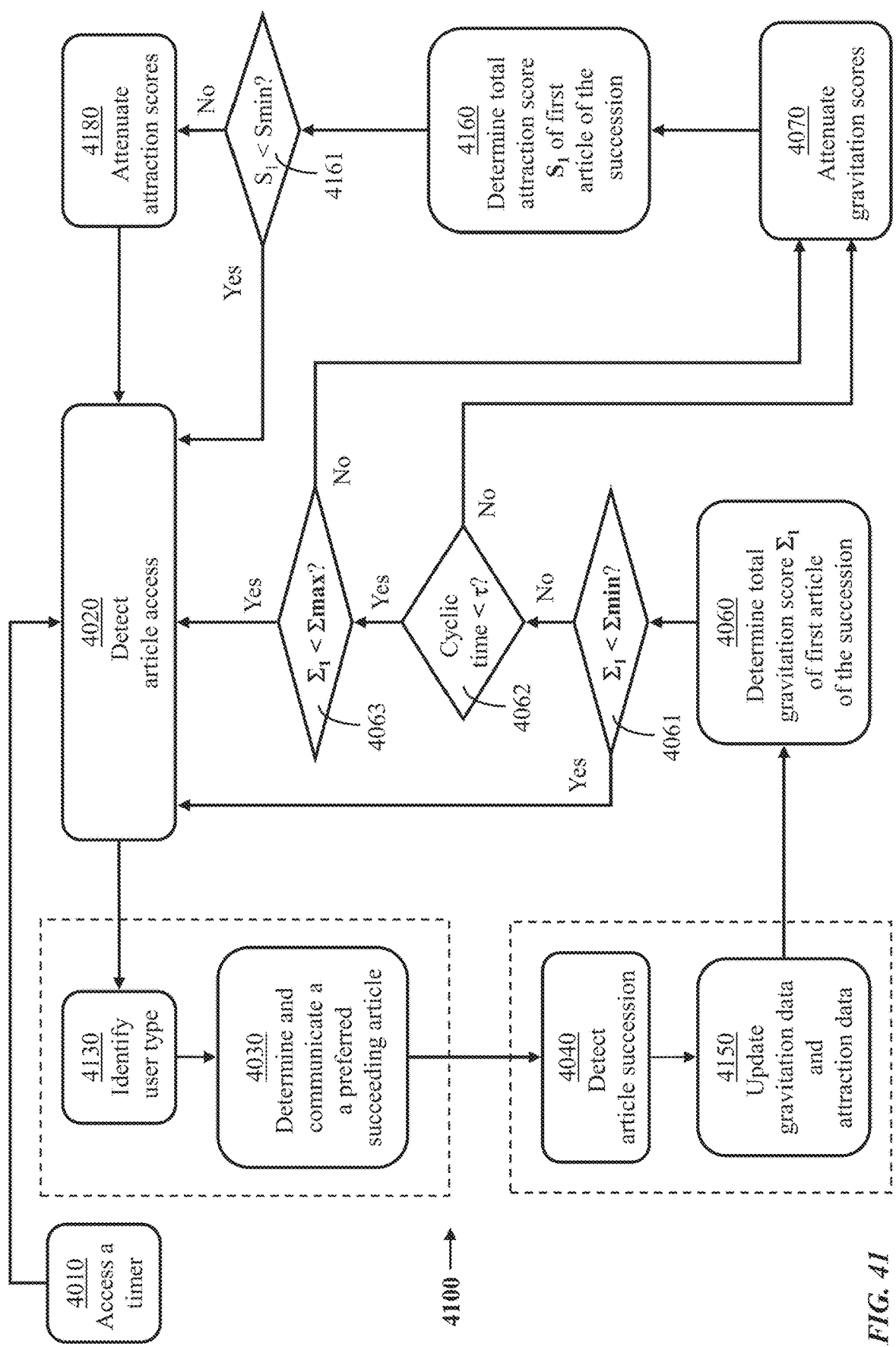
FIG. 41 illustrates a module 4100 for determining a preferred article to succeed a current article based on both global age-weighted scores and user-dependent age-weighted scores of article successions.

FIG. 41 illustrates a module 4100 for determining a preferred article to succeed a current article based on both global age-weighted scores and user-dependent age-weighted scores of article successions. Compared to module 4000, module 4100 implements the additional process of:
  Determining (4130) user-type;
  Updating (4150) both gravitation data (global data) and user-dependent data (attraction data);
  Determining (4160) total attraction score of first article of a succession; and
  Attenuating (4180) attraction scores.

Current usage measures may be attenuated at any time if the total usage measure exceeds a predefined upper bound. Attenuating usage measures may be effected by reducing the current measure according to a predefined multiplier or according to a function of a value of a current measure.

According to an embodiment, characteristics of a plurality of articles accessed through the social network or an Information Distribution System are acquired and the predefined duration after which attenuation may be applied may be selected to depend on characteristics of an article under consideration.

With a large-scale system, handling a relatively large number of articles, the processes illustrated in FIGS. 3, 10, 11, 21, 22, 27, and 36 become computationally intensive requiring the use of multiple hardware processors. A variety of processors, such as microprocessors, digital signal processors, and gate arrays, together with processor-readable media, which may include floppy disks, hard disks, optical disks, Flash ROMS, non-volatile ROM, and RAM, may be employed to implement the systems and apparatus described in the present application.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method, implemented at a computing system, of guiding content selection within an information distribution system, the method comprising:
acquiring pairwise similarity levels of a plurality of articles;
continually detecting access by individual users, of a plurality of users, to respective articles through the information distribution system, and for each individual user:
determining a complementing article to succeed a respective article based on:
said pairwise similarity levels; and
a gravitation measure of article-access transitions for each directed article pair emanating from said respective article, said gravitation measure being a count of article-access transitions effected by said plurality of users;
communicating an identifier of said complementing article to said each individual user;
detecting a specific directed article-access transition from said respective article to a subsequent article;
increasing a corresponding gravitation measure; and
adjusting said gravitation measure for said each directed article pair based on
a count of transitions from said respective article; and
a global cyclic age of said gravitation measure.

2. The method of claim 1 wherein said adjusting comprises attenuating said gravitation measure for said each directed article pair subject to at least one of:
a total number of transitions from said respective article exceeding a predefined value; and
said global cyclic age of said gravitation measure exceeding a predefined time period.

3. The method of claim 1 wherein said cyclic age of gravitational measure is determined as a time interval between a time instant of a current article-access transition and a most recent time instant at which the gravitation measure has been adjusted.

4. The method of claim 1 wherein said total number of transitions is a count of all transitions from the respective article to any other article of the plurality of articles.

5. The method of claim 1 wherein said adjusting comprises reducing said gravitation measure according to one of:

a predefined multiplier; and
a function of a value of said gravitation measure.

6. The method of claim 1 further comprising:
determining a composite affinity level of said respective article to each candidate article of a set of candidate articles of said plurality of articles as a weighted sum of:
a similarity level between said respective article and said each candidate article; and
a gravitation measure from said respective article to said each candidate article; and
selecting a candidate article of said set of candidate articles as said complementing article according to a respective composite affinity level.

7. The method of claim 1 further comprising:
obtaining a specific user type of said each individual user;
refining said determining said complementing article to be further based on an attraction measure of article-access transitions for said each directed article pair, said attraction measure being a count of article-access transitions effected by users of a same user type.

8. The method of claim 7 further comprising:
updating a corresponding attraction measure of said each directed article pair for said specific user type; and
adjusting said attraction measure for said each directed article pair for said specific user type subject to a number of transitions from said respective article for said specific user type exceeding a predefined lower bound.

9. The method of claim 7 wherein said obtaining comprises:
acquiring characteristics of individual users of said plurality of users;
segmenting said plurality of users into clusters based on said characteristics; and
assigning for each user a respective user type equivalent to an identifier a cluster to which the user belongs.

10. The method of claim 7 further comprising selecting a set of candidate articles, of said plurality of articles, to complement said respective article, with each candidate article satisfying at least one of:
a respective similarity level, between said respective article and said each candidate article, exceeding a predefined similarity lower-bound;
a respective gravitation measure, from said respective article to said each candidate article, exceeding a predefined gravitation lower bound; and
a respective attraction measure, from said respective article to said each candidate article for said specific user type, exceeding a predefined attraction lower bound.

11. The method of claim 10 further comprising:
determining a composite affinity level of said respective article to each candidate article of a set of candidate articles of said plurality of articles as a weighted sum of:
said respective similarity level;
said respective gravitation measure; and
said respective attraction measure;
ranking candidate articles of said set of candidate articles according to values of respective composite affinity levels; and
performing a process of weighted random selection of said complementing article from a prescribed number of candidate articles of highest ranking.

12. An apparatus for guiding content selection within an information distribution system comprising a pool of processors executing instructions organized into:
a tracking module configured to continually detect access by individual users, of a plurality of users, to respective articles of a plurality of articles through the information distribution system;
a recommendation module configured to:
determine a complementing article to succeed a particular article based on:
acquired pairwise similarity levels of said plurality of articles;
and
a gravitation measure of article-access transitions for each directed article pair emanating from said particular article, said gravitation measure being a count of article-access transitions effected by said plurality of users;
communicate an identifier of said complementing article to a specific user currently accessing said particular article;
a module for usage-data accruing configured to:
detect a directed article-access transition from said particular article to a subsequent article; and
increase a corresponding gravitation measure;
and
a module for usage-data weighting configured to adjust said gravitation measure for said each directed article pair based on
a count of transitions from said particular article; and
a global cyclic age of said gravitation measure.

13. The apparatus of claim 12 wherein said module for usage-data weighting attenuates said gravitation measure for said each directed article pair subject to at least one of:
a total number of transitions from said particular article exceeding a predefined value; and
said global cyclic age of said gravitation measure exceeding a predefined time period;
said total number of transitions being a count of all transitions from the particular article to any other article of the plurality of articles.

14. The apparatus of claim 13 wherein said module for usage-data weighting reduces said gravitation measure according to one of:
a predefined multiplier; and
a function of a value of said gravitation measure.

15. The apparatus of claim 12 wherein said module for usage-data weighting determines said cyclic age of gravitational measure as a time interval between a time instant of a current article-access transition and a most recent time instant at which the gravitation measure has been adjusted.

16. The apparatus of claim 12 wherein said recommendation module is further configured to:
determine a composite affinity level of said particular article to each candidate article of a set of candidate articles of said plurality of articles as a weighted sum of:
a similarity level between said particular article and said each candidate article; and
a gravitation measure from said particular article to said each candidate article; and
select a candidate article of said set of candidate articles as said complementing article according to a respective composite affinity level.

17. The apparatus of claim 12 wherein said recommendation module is further configured to:
obtain a specific user type of said specific user;
refine said determining said complementing article to be further based on an attraction measure of article-access transitions for said each directed article pair, said attraction measure being a count of article-access transitions effected by users of a same user type.

18. The apparatus of claim 17 wherein said recommendation module is further configured to:
update a corresponding attraction measure of said each directed article pair for said specific user type; and
adjust said attraction measure for said each directed article pair for said specific user type subject to a number of transitions from said particular article for said specific user type exceeding a predefined lower bound.

19. The apparatus of claim 17 wherein said recommendation module is further configured to select a set of candidate articles, of said plurality of articles, to complement said particular article, with each candidate article satisfying at least one of:
a respective similarity level, between said particular article and said each candidate article, exceeding a predefined similarity lower-bound;
a respective gravitation measure, from said particular article to said each candidate article, exceeding a predefined gravitation lower bound; and
a respective attraction measure, from said particular article to said each candidate article for said specific user type, exceeding a predefined attraction lower bound.

20. The apparatus of claim 19 wherein said recommendation module is further configured to:
determine a composite affinity level of said particular article to each candidate article of a set of candidate articles of said plurality of articles as a weighted sum of:
said respective similarity level;
said respective gravitation measure; and
said respective attraction measure;
rank candidate articles of said set of candidate articles according to values of respective composite affinity levels; and
perform a process of weighted random selection of said complementing article from a prescribed number of candidate articles of highest ranking.

* * * * *